United States Patent
Pershing

(10) Patent No.: US 10,515,414 B2
(45) Date of Patent: *Dec. 24, 2019

(54) SYSTEMS AND METHODS FOR PERFORMING A RISK MANAGEMENT ASSESSMENT OF A PROPERTY

(71) Applicant: Eagle View Technologies, Inc., Redmond, WA (US)

(72) Inventor: Chris Pershing, Redmond, WA (US)

(73) Assignee: Eagle View Technologies, Inc., Bellevue, WA (US)

(*) Notice: Subject to any disclaimer, the term of this patent is extended or adjusted under 35 U.S.C. 154(b) by 923 days.

This patent is subject to a terminal disclaimer.

(21) Appl. No.: 13/844,467

(22) Filed: Mar. 15, 2013

(65) Prior Publication Data
US 2013/0262029 A1 Oct. 3, 2013

Related U.S. Application Data

(63) Continuation-in-part of application No. 13/385,607, filed on Feb. 3, 2012, and a continuation-in-part of application No. 13/757,712, filed on Feb. 1, 2013, now Pat. No. 8,774,525, and a continuation-in-part of application No. PCT/US2013/023503, filed on Jan. 28, 2013, and a continuation-in-part of application No. 13/385,606, filed on Feb. 3, 2012, now Pat. No. 9,933,257, and a continuation-in-part of application No. 13/757,694, filed on Feb. 1, 2013, now Pat. No. 9,599,466, and a continuation-in-part of application No. PCT/US2013/023502, filed on Jan. 28, 2013.

(51) Int. Cl.
| | |
|---|---|
| *G01B 21/28* | (2006.01) |
| *G06Q 40/08* | (2012.01) |
| *G06Q 40/00* | (2012.01) |
| *G06Q 10/06* | (2012.01) |
| *G06Q 50/16* | (2012.01) |
| *C01B 21/28* | (2006.01) |

(52) U.S. Cl.
CPC ............. *G06Q 40/08* (2013.01); *C01B 21/28* (2013.01); *G01B 21/28* (2013.01); *G06Q 10/06* (2013.01); *G06Q 40/00* (2013.01); *G06Q 50/16* (2013.01)

(58) Field of Classification Search
CPC ........ G06Q 10/06; G06Q 40/08; G06Q 50/16; G01B 21/28; G06F 17/00
See application file for complete search history.

(56) References Cited

U.S. PATENT DOCUMENTS

| | | |
|---|---|---|
| 2,791,151 A | 5/1957 | Pennington |
| 3,617,016 A | 11/1971 | Bolsey |
| 4,096,670 A | 6/1978 | Fuller |
| 4,344,142 A | 8/1982 | Diehr, II et al. |
| 5,247,356 A | 9/1993 | Ciampa |
| 5,379,105 A | 1/1995 | Iki et al. |
| 5,596,494 A | 1/1997 | Kuo |
| 5,633,946 A | 5/1997 | Lachinski et al. |
| 5,633,995 A | 5/1997 | McClain |
| 5,983,010 A | 11/1999 | Murdock et al. |
| 6,323,885 B1 | 11/2001 | Wiese |
| 6,333,749 B1 | 12/2001 | Reinhardt et al. |
| 6,385,541 B1 | 5/2002 | Blumberg et al. |
| 6,396,491 B2 | 5/2002 | Watanabe et al. |
| 6,446,053 B1 | 9/2002 | Elliott |
| 6,496,184 B1 | 12/2002 | Freeman et al. |
| 6,636,803 B1 | 10/2003 | Hartz, Jr. et al. |
| 6,836,270 B2 | 12/2004 | Du |
| 6,980,690 B1 | 12/2005 | Taylor et al. |
| 7,003,400 B2 | 2/2006 | Bryant |
| 7,006,977 B1 | 2/2006 | Attra et al. |
| 7,133,551 B2 | 11/2006 | Chen et al. |
| 7,233,691 B2 | 6/2007 | Setterholm |
| 7,305,983 B1 | 12/2007 | Meder et al. |
| 7,324,666 B2 | 1/2008 | Zoken et al. |
| 7,327,880 B2 | 2/2008 | Tek |
| 7,333,963 B2 | 2/2008 | Widrow et al. |
| 7,343,268 B2 | 3/2008 | Kishikawa |
| 7,373,303 B2 | 5/2008 | Moore et al. |

(Continued)

FOREIGN PATENT DOCUMENTS

| | | |
|---|---|---|
| AU | 2008230031 B8 | 11/2009 |
| CA | 2191954 A1 | 12/1995 |

(Continued)

OTHER PUBLICATIONS

US 8,315,941 B2, 11/2012, Halper et al. (withdrawn)

(Continued)

*Primary Examiner* — Sujoy K Kundu
*Assistant Examiner* — L. Anderson
(74) *Attorney, Agent, or Firm* — Dunlap Codding, P.C.

(57) ABSTRACT

A system generates an estimated floor area measurement of a building based on the calculated estimated total roof area of the roof of the building. This is based on a correlation between the size of the building roof and the size of the building. Typically, the floor area of a single full floor of the building is roughly the size of the roof of the building if the roof were flat with no slope. This in effect is turning the roof into a floor to generate estimated floor area. With additional adjustments to area measurements to account for multiple floors, roof overhang, wall width, internal building features such as walls and staircases, and/or obstructed views of the building in the aerial image(s), etc., an even more accurate floor area estimation may be generated.

13 Claims, 37 Drawing Sheets

(56) References Cited

U.S. PATENT DOCUMENTS

| | | |
|---|---|---|
| 7,421,125 B1 | 9/2008 | Rees |
| 7,424,133 B2 | 9/2008 | Schultz et al. |
| 7,460,214 B2 | 12/2008 | Schiavi |
| 7,487,114 B2 | 2/2009 | Florance et al. |
| 7,500,391 B2 | 3/2009 | Woro |
| 7,509,241 B2 | 3/2009 | Guo et al. |
| 7,515,153 B2 | 4/2009 | Jin et al. |
| 7,519,206 B2 | 4/2009 | Mulet-Parada et al. |
| 7,570,785 B2 | 8/2009 | Breed |
| 7,583,275 B2 | 9/2009 | Neumann et al. |
| 7,629,985 B2 | 12/2009 | McArdle et al. |
| 7,639,842 B2 | 12/2009 | Kelle et al. |
| 7,664,690 B2 | 2/2010 | Dirnberger |
| 7,728,833 B2 | 6/2010 | Verma et al. |
| 7,752,018 B2 | 7/2010 | Rahmes et al. |
| 7,787,659 B2 | 8/2010 | Schultz et al. |
| 7,844,499 B2 | 11/2010 | Yahiro et al. |
| 7,869,944 B2 | 1/2011 | Deaton et al. |
| 7,873,238 B2 | 1/2011 | Schultz et al. |
| 7,991,226 B2 | 8/2011 | Schultz et al. |
| 7,995,799 B2 | 8/2011 | Schultz et al. |
| 7,995,862 B2 | 8/2011 | Tao et al. |
| 8,027,850 B1 | 9/2011 | Pietrzak |
| 8,051,089 B2 | 11/2011 | Gargi et al. |
| 8,068,643 B2 | 11/2011 | Schultz et al. |
| 8,078,436 B2 | 12/2011 | Pershing et al. |
| 8,081,798 B2 | 12/2011 | Paglieroni et al. |
| 8,081,841 B2 | 12/2011 | Schultz et al. |
| 8,131,514 B2 | 3/2012 | Royan et al. |
| 8,145,578 B2 | 3/2012 | Pershing et al. |
| 8,170,840 B2 | 5/2012 | Pershing |
| 8,204,341 B2 | 6/2012 | Schultz et al. |
| 8,209,152 B2 | 6/2012 | Pershing |
| 8,229,769 B1 | 7/2012 | Hopkins, III |
| 8,233,666 B2 | 7/2012 | Schultz et al. |
| 8,346,578 B1 | 1/2013 | Hopkins, III et al. |
| 8,352,332 B2 | 1/2013 | Pesicek |
| 8,385,672 B2 | 2/2013 | Giuffrida et al. |
| 8,386,378 B2 | 2/2013 | Halper et al. |
| 8,401,222 B2 | 3/2013 | Thornberry et al. |
| 8,417,061 B2 | 4/2013 | Kennedy |
| 8,471,854 B2 | 6/2013 | Kelley et al. |
| 8,358,918 B2 | 9/2013 | Pearcy et al. |
| 8,526,733 B2 | 9/2013 | Tilton |
| 8,774,525 B2 * | 7/2014 | Pershing ............... G06Q 10/06 382/100 |
| 8,825,454 B2 | 9/2014 | Pershing |
| 9,135,737 B2 | 9/2015 | Pershing |
| 9,396,583 B2 | 7/2016 | Barthelet et al. |
| 10,102,584 B1 | 10/2018 | Devereaux et al. |
| 2002/0101594 A1 | 8/2002 | Slatter |
| 2002/0143669 A1 | 10/2002 | Scheer |
| 2002/0154174 A1 | 10/2002 | Redlich et al. |
| 2003/0028393 A1 | 2/2003 | Coulston et al. |
| 2003/0103651 A1 | 6/2003 | Novak |
| 2003/0147553 A1 | 8/2003 | Chen et al. |
| 2003/0171957 A1 | 9/2003 | Watrous |
| 2003/0233310 A1 | 12/2003 | Stavrovski |
| 2005/0267657 A1 | 12/2005 | Devdhar |
| 2005/0288959 A1 | 12/2005 | Eraker et al. |
| 2006/0137736 A1 | 6/2006 | Nishitani et al. |
| 2006/0169775 A1 | 8/2006 | Gray et al. |
| 2006/0200311 A1 | 9/2006 | Arutunian et al. |
| 2006/0232605 A1 | 10/2006 | Imamura |
| 2006/0262112 A1 | 11/2006 | Shimada |
| 2006/0265287 A1 | 11/2006 | Kubo |
| 2007/0179757 A1 | 8/2007 | Simpson |
| 2007/0220174 A1 | 9/2007 | Abhyanker |
| 2008/0089610 A1 | 4/2008 | Tao et al. |
| 2008/0162380 A1 | 7/2008 | Suga et al. |
| 2008/0204570 A1 | 8/2008 | Schultz et al. |
| 2008/0208637 A1 | 8/2008 | McKay et al. |
| 2008/0221843 A1 | 9/2008 | Shenkar et al. |
| 2008/0231700 A1 | 9/2008 | Schultz et al. |
| 2008/0262789 A1 | 10/2008 | Pershing et al. |
| 2009/0067725 A1 | 3/2009 | Sasakawa et al. |
| 2009/0132436 A1* | 5/2009 | Pershing ............... G06Q 30/02 705/400 |
| 2009/0141020 A1 | 6/2009 | Freund et al. |
| 2009/0160856 A1 | 6/2009 | Hoguet |
| 2009/0265193 A1 | 10/2009 | Collins et al. |
| 2009/0304227 A1 | 12/2009 | Kennedy et al. |
| 2010/0034483 A1 | 2/2010 | Giuffrida et al. |
| 2010/0070309 A1 | 3/2010 | Deede et al. |
| 2010/0110074 A1 | 5/2010 | Pershing |
| 2010/0179787 A2 | 7/2010 | Pershing et al. |
| 2010/0241406 A1 | 9/2010 | Rahmes et al. |
| 2011/0086201 A1 | 4/2011 | Shiao et al. |
| 2011/0096083 A1 | 4/2011 | Schultz |
| 2011/0187713 A1 | 8/2011 | Pershing et al. |
| 2011/0205245 A1 | 8/2011 | Kennedy et al. |
| 2011/0216962 A1 | 9/2011 | Kim et al. |
| 2011/0282763 A1 | 11/2011 | Pesicek |
| 2011/0288816 A1 | 11/2011 | Thierman |
| 2012/0007982 A1 | 1/2012 | Giuffrida et al. |
| 2012/0035887 A1 | 2/2012 | Augenbraun et al. |
| 2012/0066187 A1 | 3/2012 | Pearcy et al. |
| 2012/0170797 A1 | 7/2012 | Pershing et al. |
| 2012/0191424 A1 | 7/2012 | Pershing et al. |
| 2012/0209782 A1 | 8/2012 | Pershing et al. |
| 2012/0223965 A1 | 9/2012 | Pershing |
| 2012/0224770 A1 | 9/2012 | Strassenburg-Kleciak |
| 2013/0155109 A1 | 6/2013 | Schultz et al. |
| 2013/0202157 A1 | 8/2013 | Pershing |
| 2013/0204575 A1 | 8/2013 | Pershing |
| 2013/0211790 A1 | 8/2013 | Loveland et al. |
| 2013/0216089 A1 | 8/2013 | Chen et al. |
| 2013/0226515 A1 | 8/2013 | Pershing |
| 2013/0304617 A1 | 11/2013 | Wilkinson et al. |
| 2013/0311240 A1 | 11/2013 | Pershing et al. |
| 2013/0346020 A1 | 12/2013 | Pershing |
| 2014/0046627 A1 | 2/2014 | Pershing |
| 2014/0279593 A1 | 9/2014 | Pershing |
| 2015/0370928 A1 | 12/2015 | Pershing |

FOREIGN PATENT DOCUMENTS

| | | |
|---|---|---|
| CN | 102194120 A | 9/2011 |
| DE | 198 57 667 A1 | 8/2000 |
| EP | 1 010 966 B1 | 10/2002 |
| EP | 1 619 610 A1 | 1/2006 |
| EP | 2 251 833 A2 | 11/2010 |
| WO | 00/29806 A2 | 5/2000 |
| WO | 2005/124276 A2 | 12/2005 |
| WO | 2006/040775 A2 | 4/2006 |
| WO | WO 2006/040775 | 4/2006 |
| WO | 2006/090132 A2 | 8/2006 |
| WO | 2011/094760 A2 | 8/2011 |

OTHER PUBLICATIONS

Investopedia.com, Floor Area Ratio—FAR, May 28, 2010, p. 1.*
Australian Office Action, dated Oct. 1, 2013, for Australian Application No. 2010219392, 4 pages.
Canadian Office Action, dated Sep. 24, 2013, for Canadian Application No. 2,641,373, 4 pages.
Ekman, "Price Estimation Tool," Office Action for U.S. Appl. No. 13/843,437, dated Aug. 14, 2013, 9 pages.
International Search Report for International Application No. PCT/US2013/023503, dated Apr. 30, 2013, 5 pages.
International Search Report and Written Opinion for International Application No. PCT/US2013/024523, dated Nov. 13, 2013, 15 pages.
KP Building Products, "Vinyl Siding Estimating and Installation Guide," 2007, 32 pages.
Pershing et al., "Aerial Roof Estimation System and Method," Amendment in Response to Office Action in Reexamination of U.S. Pat. No. 8,145,578 B2, Control No. 96/000,005, filed Oct. 25, 2013, 318 pages.
Pershing et al., "Aerial Roof Estimation System and Method," Amendment in Response to Office Action in Reexamination of U.S.

(56) References Cited

OTHER PUBLICATIONS

Pat. No. 8,078,436 B2, Control No. 96/000,004, filed Oct. 25, 2013, 229 pages.
Pershing, "Systems and Methods for Estimation of Building Floor Area," Office Action for U.S. Appl. No. 13/757,712, dated Jul. 18, 2013, 18 pages.
Pershing, "Systems and Methods for Estimation of Building Wall Area," Office Action for U.S. Appl. No. 13/757,694, dated Oct. 8, 2013, 15 pages.
Pershing, "Systems and Methods for Estimation of Building Floor Area," Notice of Allowance for U.S. Appl. No. 13/757,712, dated Nov. 25, 2013, 15 pages.
Pershing, "Systems and Methods for Estimation of Building Floor Area," Notice of Allowance for U.S. Appl. No. 13/757,712, dated Dec. 26, 2013, 18 pages.
Pershing, "Systems and Methods for Estimation of Building Wall Area," Office Action for U.S. Appl. No. 13/757,694, dated Jan. 15, 2014, 34 pages.
Pictometry, "Frequently Asked Questions," Dec. 2006, retrieved Apr. 9, 2011, from http://replay.waybackmachine.org/20050801231818/http://www.pictometry.com/faq.asp, 10 pages.
Sengü, "Extracting Semantic Building Models From Aerial Stereo Images and Convesion to Citygml," Thesis, Istanbul Technical University Institute of Science and Technology, May 2010, 138 pages.
Steuer, "Heigh Snakes: 3D Building Reconstruction from Aerial Image and Laser Scanner Data," Joint Urban Remote Sensing Event (JURSE 2011), Munich, Germany, Apr. 11-13, 2011, pp. 113-116.
Written Opinion for International Application No. PCT/US2013/023503, dated Apr. 30, 2013, 4 pages.
Written Opinion for International Application No. PCT/US2013/023502, dated Apr. 30, 2013, 3 pages.
YouTube, "Pictometry Online Webinar for MAIA Members," uploaded Apr. 8, 2011, retrieved from http://www.youtube.com/watch?v=RzAXK2avqQQ, 2 pages.
"3D Reconstruction," retrieved Oct. 25, 2013, from http://www8cs.umu.se/kurser/TDBD19/V705/reconstruct-4.pdf, 5 pages.
"8. Epipolar Geometry and the Fundamental Matrix," retrieved Oct. 25, 2013, from http://www.robtos.ox.ac.uk/~vgg/hzbook/hzbook1/HZepipolar.pdf, 25 pages.
"AeroDach® Online Roof Evaluation Standard Delivery Format and 3D Data File," Document Version 01.00.2002 with alleged publication in 2002, 21 pages.
"AeroDach® Online Dachauswertung: Standardlieferformat and 3D-Datensatz," Aerowest GMBH, Version 01.00.2002, 6 pages.
"Aerodach® Online Roof Analysis: Standard Delivery Format and 3D Dataset," AEROWESTGmbH, Version as of 00-01-2002, 6 pages.
"AppliCad Software and EagleView® Technologies Partner for Metal Roofing Contractors," EagleView Technologies and AppliCad Software, retrieved from blog.eagleview.com/?=614 on Feb. 1, 2012, 2 pages.
"Definitions of Surveying and Associated Terms," American Congress on Surveying and Mapping, reprinted 1989, p. 3, 2 pages.
"Glossary of the Mapping Sciences," American Society of Civil Engineering, ASCE Publications, 1994, pp. 9-10, 3 pages.
"Microsoft's MSN Virtual Earth: The Map is the Search Platform," Directions Magazine URL=http://www.directionsmag.com/article.php?article_id=873&trv=1, retrieved Feb. 6, 2009, 10 pages.
"Photo Tours Google," Web Search, retrieved Oct. 25, 2013, from http://www.google.com/search?q=photo+tours=google, 2 pages.
"Pictometry—In the News," URL=http://204.8.121.114/pressrelease%20archived/pressrelease_aec.asp, retrieved Feb. 6, 2009, 3 pages.
"Software; New Products," LexisNexis Roofing Contractor article 23(2):121(2), Jan. 3, 2006, 1 page.
"Sorcerer: Nobody builds roofs like this builds roofs," retrieved from URL=http://web.archive.org/web/2006021409237/http://www.applicad.com.au/product-features . . . on Mar. 29, 2012, 2 pages.
Aerodach, "Protokoll zur Dachauswertung," Oct. 19, 2010, 12 pages.
Aerowest GMBH, "AeroDach—das patentierte Dachaufmass," Jan. 1, 2006, retrieved from URL=http://web.archive.org/web/20060101021543/http://www.aerowest.de/aerodach.html on Mar. 25, 2012, 2 pages.
Aerowest GMBH, "Aerowest Pricelist of Geodata," Oct. 21, 2005, 2 pages.
Aerowest GMBH, "Geodata Service; AeroDach—Patented Roof Dimensions," Jan. 1, 2006, retrieved from URL=http://web.archive.org/web/20060101021543/http://www.aerowest.de/aerodach.html, on Mar. 25, 2012, 2 pages.
Aerowest GMBH. "Preisliste Geodaten Aerowest," Oct. 21, 2005, 1 page.
Agarwal et al., "Reconstructing Rome," *IEEE Computer* 43(6): 40-47, Jun. 2010.
Agarwal et al., "Building Rome in a Day," *Communications of the ACM* 54(10): 105-112, Oct. 2011.
Agarwala et al., "Interactive Digital Photomontage," ACM SIGGRAPH 2004, Los Angeles, CA, Aug. 2004, 9 pages.
Agarwala et al., "Panoramic Video Textures," SIGGRAPH 2005, Los Angeles, CA, Aug. 2005, 8 pages.
Appli-cad Australia, "Linear Nesting Reports," AppliCad Sample Reports, Jul. 18, 2000, 9 pages.
Appli-cad Australia, "Roof Magician: Especially suited to single, shake and tile roofing," Sample Reports, Jun. 24, 2004, 13 pages.
Appli-cad Australia, "Roof Wizard: Advanced Software for Roof Modeling and Estimating," Document Issue 1.0.0, Sep. 25, 2004, 10 pages.
Appli-cad Australia, "Roof Wizard: Especially suited to metal roofing," Generate Offcuts Reports, Mar. 9, 2005, 7 pages.
Appli-cad Australia, "Roof Wizard: Especially suited to metal roofing," Generate Offcuts Reports, Sep. 14, 2006, 7 pages.
Appli-cad Australia, "Roof Wizard: Especially suited to metal roofing," Sample Reports, Jul. 13, 2004, 24 pages.
Appli-cad Australia, "Roof Wizard: Especially suited to metal roofing," Sample Reports, Sep. 17, 2002, 12 pages.
Appli-cad Australia, "Sorcerer: Advanced Software for Roof Modeling and Estimating," Reference Guide Version 3, Sep. 8, 1999, 142 pages.
Appli-cad Australia, "Sorcerer: The complete solution for professional roof estimating," Demonstration Kit, Mar. 9, 2005, 15 pages.
AppliCad Roofing, sample report dated Jul. 30, 2007, 1 page.
Applicad Roofing, sample report dated Mar. 2, 2005, 28 pages.
AppliCad USA, "Linear Nesting Reports," AppliCad Sample Reports, Nov. 25, 1999, 9 pages.
Applicad webpage 2005 snip different color lines, 1 page.
AppliCad, "Example Output and Brochures," retrieved from URL=http://www.applicad.com/au/product-reports.html on Apr. 16, 2012, 2 pages.
AppliCad, "Product Overview—Sorcerer: Advanced Software for Roofing Modeling, Estimating, Presentation and Installation," Issue 5, Mar. 2, 2001, 15 pages.
AppliCad, "Roofing Software: Product Bulletin Section 1—Modeling the Roof," Dec. 20, 2005, retrieved from URL=htpp://web.archive.org/web/20021122204408/http://www.applicad.com.au/ on Apr. 16, 2012, 3 pages.
AppliCad, "Roofing Software: Product Bulletin Section 1—Modeling the Roof," Jan. 7, 2002, retrieved from URL=htpp://web.archive.org/web/20021122204408/http://www.applicad.com.au/ on Apr. 16, 2012, 3 pages.
AppliCad, "Roofing Software: Product Bulletin Section 2—Modifying the Model," Dec. 20, 2005, retrieved from URL=http://web.archive.org/web/20051210130430/http://www.applicad.com.au/ on Apr. 16, 2012, 2 pages.
AppliCad, "RoofScape: Advanced Software for Roof Modeling and Estimating," Learning Guide (English Units), Revision 1.1, Aug. 2007, 48 pages.
Atkinson, "Therory of Close Range Photogrammetry," Chapter 2, Section 1, Coordinate Transformations, retrieved Oct. 21, 2013, from http://www.lems.brown.edu/vision/people/leymarie/Refs/Photogrammetry/Atkinson90/C . . . , 5 pages.
Australian Office Action for Australian Application No. 2010201839, dated Apr. 14, 2011, 2 pages.

(56) References Cited

OTHER PUBLICATIONS

Autodesk, "Autodesk ImageModeler—Features," retrieved on Sep. 30, 2008, from http:///usa.autodesk.com/adsk/servlet/index?siteID=123112&id=115639 . . . , 1 page.
Automatic House Reconstruction, retrieved on Sep. 29, 2008, from http://www.vision.ee.ethz.ch/projects/Amobe_I/recons.html, 7 pages.
Azuma et al., "View-dependent refinement of multiresolution meshes with subdivision connectivity," *Proceedings of the Second International Conference on Computer Graphics, Virtual Reality, Visualization, and Interaction (Afigraph 2003)*, Capetown, South Africa, Feb. 2003, pp. 69-78.
Baillard et al., :Automatic reconstruction of piecewise planar models from multiple views, CVPR99, vol. 2, 1999, pp. 559-565, 7 pages.
Bazaraa et al., *Nonlinear Programming Theory and Algorithms*, Second Edition, John Wiley & Sons, Inc., New York, 1993, 330 pages.
Bhat et al., "A Perceptually-Motivated Optimization-Framework for Image and Video Processing," Computer Science & Engineering Technical Report, UW-CSE-08-06-02, University of Washington, Seattle, WA, Jun. 2008, 10 pages.
Bhat et al, "Fourier Analysis of the 2D Screened Poisson Equation for Gradient Domain Problems," ECCV 2008, 14 pages.
Bhat et al., "GradientShop: A Gradient-Domain Optimization Framework for Image and Video Filtering," ACM TOG 29(2), Mar. 2010, 14 pages.
Bhat et al., "Piecewise Image Registration in the Presence of Large Motions," CVPR 2006, New York, NY, Jun. 2006, 7 pages.
Bhat et al., "Using Photographs to Enhance Videos of a Static Scene," Eurographics Symposium on Rendering 2007, 12 pages.
Bignone et al., "Automatic Extraction of Generic House Roofs from High Resolution Aerial Imagery," *Proc. ECCV*, 1996, 12 pages.
Canadian Office Action, for Canadian Application No. 2,641,373, dated Jan. 9, 2012, 4 pages.
Capell et al., "A Multiresolution Framework for Dynamic Deformations," Computer Science & Engineering Technical Report, UW-CSE-02-04-02, University of Washington, Seattle, WA, Apr. 2002, 8 pages.
Chevrier et al., "Interactive 3D reconstruction for urban areas—An image based tool," *CAAD Futures*, 2001, 13 pages.
Chuang et al., "A Bayesian Approach to Digital Matting," IEEE Computer Vision and Pattern Recognition 2001, Kauai, Hawaii, Dec. 2001, 8 pages.
Chuang et al., "Animating Pictures with Stochastic Motion Textures," SIGGRAPH 2005, Los Angeles, CA, Aug. 2005, 8 pages.
Chuang et al., "Animating Pictures with Stochastic Motion Textures," Technical Report UW-CSE—Apr. 4, 2002, Aug. 2005, 7 pages.
Chuang et al., "Environment Matting Extensions: Towards Higher Accuracy and Real-Time Capture," SIGGRAPH 2000, New Orleans, LA, Jul. 24-28, 2000, 11 pages.
Chuang et al., "Environment Matting Extensions: Towards Higher Accuracy and Real-Time Capture," Tech Report, SIGGRAPH 2000, New Orleans, LA, Jul. 24-28, 2000, 10 pages.
Chuang et al., "Shadow Matting and Compositing," SIGGRAPH 2003, San Diego, CA, Jul. 2003, 7 pages.
Ciarcia et al., "Automated Roof Identification Systems and Methods," U.S. Appl. No. 12/590,131, filed Nov. 2, 2009, 74 pages.
Ciarcia et al., "Automated Roof Identification Systems and Methods," U.S. Appl. No. 12/590,131, Notice of Allowance, dated Aug. 26, 2013, 9 pages.
Ciarcia et al., "Automated Roof Identification Systems and Methods," Office Action dated Jan. 9, 2013, for U.S. Appl. No. 12/590,131, 14 pages.
Ciarcia, "Systems and Methods for Point-to-Point Registration Using Perspective Imagery From Independent Sources Without Image Acquisition Metadata," U.S. Appl. No. 13/646,466, filed Oct. 5, 2012, 41 pages.

Colburn et al., "Image-Based Remodeling," IEEE Transactions on Visualization and Computer Graphics, vol. 19, No. 1, Jan. 2013, 11 pages.
Curless et al., "Better Optical Triangulation Through Spacetime Analysis," Computer Systems Laboratory Technical Report CSL-TR-95-667, Stanford University, Stanford, CA, Apr. 1995, 12 pages.
Curless et al., "Computer model and 3D fax of Happy Buddha," retrieved Oct. 25, 2013, from http://www-graphics.stanford.edu/projects/faxing/happy/, 4 pages.
Curless et al., "A Volumetric Method for Building Complex Models from Range Images," SIGGRAPH '96, New Orleans, LA, Aug. 4-9, 1996, 10 pages.
Curless et al., "Better Optical Triangulation through Spacetime Analysis," 1995 $5^{th}$ International Conference on Computer Vision, Boston, MA, Jun. 20-23, 1995, 8 pages.
Curless, "New Methods for Surface Reconstruction from Range Images," Dissertation, Submitted to the Department of Electrical Engineering and the Committee of Graduate Studies of Stanford University, Jun. 1997, 209 pages.
Curless, "From Range Scans to 3D Models," *ACM SIGGRAPH Computer Graphics* 33(4): 38-41, 1999.
Debevec et al., "Modeling and Rendering Architecture from Photographs: A hybrid geometry—and image-based approach," *SIGGRAPH conference proceedings*, retrieved from www.cs.berkeley.edu/~malik/papers/debevecTM96.pdf., 1996, 10 pages.
Delaney, "Searching for Clients From Above—More Small Businesspeople Use Aerial Mapping Services to Scout Potential Customers," *The Wall Street Journal*, Jul. 31, 2007, retrieved on Feb. 25, 2010, from http://online.wsj.com/public/article/SB118584306224482891.html?mod=yahoo_free, 3 pages.
Drawing Jan. 31, 2012.
*Eagle View Tech.* v. *Aerialogics LLC*, Case No. 2:12-cv-00618-RAJ, Prior Art Presentation, Aug. 17, 2012, 61 pages.
ECE 390, Introduction to Optimization, Spring 2004, Introductory Course, retrieved Oct. 25, 2013, from http://liberzon.csl.illinois.edu/04ECE390.html, 1 page.
Falkner et al., *Aerial Mapping 2nd Edition*, Lewis Publishers (CRC Press LLC), 2002, "Chapter 11—Aerotriangulation," 23 pages.
Faugeras et al., "3-D reconstruction of Urban Scenes from Sequences of Images," Institut National De Recherche En Informatique Et En Automatique, No. 2572, Jun. 1995, 27 pages.
Faugeras, "What can be seen in three dimensions with an uncalibrated stereo rig?," *Computer Vision—ECCV '92*: 563-578, 1992. (18 pages).
Fisher et al., *Dictionary of Computer Vision and Image Processing*, John Wiley & Sons, Ltd., West Sussex, England, 2005, 182 pages.
Fritsch, "Introduction into Digital Aerotriangulation," Photogrammetric Week '95, Wichman Verlag, Heidelberg, 1995, pp. 165-171, 7 pages.
Furukawa et al., "Manhattan-world Stereo," CVPR 2009, Miami, Florida, Jun. 2009, 8 pages.
Furukawa et al., "Reconstructing Building Interiors from Images," ICCV 2009, Kyoto, Japan, Sep. 2009, 8 pages.
Furukawa et al, "Towards Internet-scale Multi-view Stereo," CVPR 2010, Jun. 2010, 8 pages.
Georgeiv et al., "Spatio-Angular Resolution Tradeoff in Integral Photography," Proceedings of Eurographics Symposium on Rendering, 2006, 10 pages.
Geospan Corporation, "Digital Geo-Referenced Oblique Aerial Imagery Solution EPP-REP No. 8444 5/13," GEO-NY0000868, 2007, 28 pages.
Goesele et al., "Multi-View Stereo for Community Photo Collections," Proceedings of ICCV 2007, Rio de Janeiro, Brazil, Oct. 2007, 8 pages.
Goesele et al., "Multi-View Stereo Revisited," CVPR 2006, New York, NY, Jun. 2006, 8 pages.
Goldman et al., "Interactive Video Object Annotation," Computer Science & Engineering Technical Report, UW-CSE-07-04-01, University of Washington, Seattle, WA, Apr. 2007, 7 pages.
Goldman et al., "Schematic Storyboarding for Video Editing and Visualization." SIGGRAPH 2006, Boston, MA, Aug. 2006, 10 pages.

(56) References Cited

OTHER PUBLICATIONS

Goldman et al., "Shape and Spatially-Varying BRDFs From Photometric Stereo," IEEE Transactions on Pattern Analysis and Machine Intelligence, vol. 32, No. 6, Jun. 2010, 12 pages.
Goldman et al., "Shape and Spatially-Varying BRDFs From Photometric Stereo," ICCV 2005, Beijing, China, Oct. 2005, 8 pages.
Goldman et al., "Video Object Annotation, Navigation, and Composition," UIST 2008, 10 pages.
Gonzalez et al., *Digital Image Processing*, Addison-Wesley Publishing Company, Inc., Reading, Massachusetts, 1993, 372 pages.
Gülch et al., "On the Performance of Semi-Automatic Building Extraction," In the International Archives of Photogrammetry and Remote Sensing, vol. 23, 8 pages, 1998.
Gupta et al., "Enhancing and Experiencing Spacetime Resolution with Videos and Stills," Computer Science & Engineering Technical Report, UW-CSE-04-08-01, University of Washington, Seattle, WA, Apr. 2008, 6 pages.
Gupta et al., "DuploTrack: A Real-time System for Authoring and Guiding Duplo Block Assembly," UIST 2012, Boston, MA, Oct. 2012, 13 pages.
Gupta et al., "Enhancing and Experiencing Spacetime Resolution with Video and Stills," ICCP 2009, San Francisco, CA, Apr. 2009, 9 pages.
Gupta et al., "Single Image Deblurring Using Motion Density Functions," ECCV 2010, Crete, Greece, Sep. 2010, 14 pages.
Hartley et al., "2.4 A Hierarchy of Transformations", Multiple View Geometry in Computer Vision, Cambridge University Press, Second Edition, 2003, 9 pages.
Hartley et al., "Appendix 6: Iterative Estimation Methods," Multiple View Geometry in Computer Vision, Cambridge University Press, Second Edition, 2003, 34 pages.
Hartley et al., "Invariant and Calibration-Free Methods in Scene Reconstruction and Object Recognition," Final Technical Report, Feb. 28, 1997, 266 pages.
Hartley et al., *Multiple View Geometry in Computer Vision*, Second Edition, Cambridge University Press, Cambridge, England, 2003, 672 pages.
Held et al., "3D Puppetry: A Kinect-based Interface for 3D Animation," UIST 2012, Boston, MA, Oct. 2012, 11 pages.
Henricsson et al., "3-D Building Reconstruction with ARUBA: A Qualitative and Quantitative Evaluation," Institute of Geodesy and Photogrammerty, Swiss Federal Institute of Technology, 2001, 13 pages.
Hudson, "Merging VRML Models: Extending the Use of Photomodeller," Thesis, in TCC 402, Presented to the Faculty of the School of Engineering and Applied Science, University of Virginia, Mar. 23, 1998, 23 pages.
International Preliminary Report on Patentability for International Application No. PCT/US2011/023408, dated Aug. 16, 2012, 7 pages.
International Search Report and Written Opinion for International Application No. PCT/US2013/023502, dated Apr. 30, 2013, 8 pages.
International Search Report for International Application No. PCT/US11/23408, dated Aug. 11, 2011, 2 pages.
Kolman, "Chapter 4, Linear Transformations and Matrices, 4.1: Definition and Examples," Elementary Linear Algebra, Second Edition, Macmillan Publishing Co,. Inc., 1997, 12 pages.
Krainin et al., "Autonomous Generation of Complete 3D Object Models Using Next Best View Manipulation Planning," ICRA 2011, Shanghai, China, May 2011, 7 pages.
Kushal et al., "Photo Tours," 3DimPVT, Oct. 2012, 8 pages.
Levoy et al., "The Digital Michelangelo Project: 3D Scanning of Large Statues," SIGGRAPH 2000, New Orleans, LA, Jul. 24-28, 2000, 14 pages.
Levoy, "The Digital Michelangelo Project," retrieved Oct. 25, 2013, from http://www-graphics.stanford.edu/projects/mich/, 10 pages.
Li et al., "Automated Generation of Interactive 3D Exploded View Diagrams," ACM Transactions on Graphics 27(3), SIGGRAPH 2007, Aug. 2007, 7 pages.

Li et al., "Interactive Cutaway Illustration of Complex 3D Models," ACM Transactions on Graphics 26(3), SIGGRAPH 2007, Aug. 2007, 11 pages.
Lueders, "Infringement Allegations by EagleView Technologies," Feb. 10, 2009, 3 pages.
Mahajan et al., "A Theory of Frequency Domain Invariants: Spherical Harmonic Identities for BRDF / Lighting Transfer and Image Consistency," IEEE Pattern Analysis and Machine Intelligence, 30(2), Feb. 2008, 14 pages.
Mahajan et al., "A Theory of Spherical Harmonic Identities for BRDF/Lighting Transfer and Image Consistency," ECCV 2006, Graz, Austria, May 2006, 14 pages.
Mann, "Roof with a view," *Contract Journal* 431(6552):29, Nov. 23, 2005, 2 pages.
Mikhail et al., *Introduction to Modern Photogrammetry*, John Wiley & Sons, Inc., New York, 2001, 247 pages.
Miller et al., "Miller's Guide to Framing and Roofing," McGraw Hill, New York, pp. 131-136 and 162-163, 2005, 9 pages.
Minialoff, "Introduction to Computer Aided Design," Apr. 2000, 4 pages.
Noronha et al., "Detection and Modeling of Buildings from Multiple Aerial Images," Institute for Robotics and Intelligent Systems, University of Southern California, Nov. 27, 2001, 32 pages.
Noronha et al., "Detection and Modeling of Buildings from Multiple Aerial Images," *IEEE Transactions on Pattern Analysis and Machine Intelligence* 23(5):501-518, 2001, 32 pages.
Office Action in Reexamination of U.S. Pat. No. 8,078,436 B2, Supplemental Reexamination Patent, dated Jul. 25, 2013, 72 pages.
Office Action in Reexamination of U.S. Pat. No. 8,145,578 B2, Supplemental Reexamination Patent, dated Jul. 25, 2013, 24 pages.
Pershing et al., "Aerial Roof Estimation System and Method," Notice of Allowance dated Feb. 3, 2012, for U.S. Appl. No. 12/148,439, 35 pages.
Pershing et al., "Aerial Roof Estimation System and Method," Office Action dated Apr. 25, 2011, for U.S. Appl. No. 12/148,439, 52 pages.
Pershing et al., "Aerial Roof Estimation System and Method," Office Action dated Aug. 16, 2010, for U.S. Appl. No. 12/148,439, 47 pages.
Pershing et al., "Aerial Roof Estimation System and Method," Office Action dated Aug. 25, 2011, for U.S. Appl. No. 12/148,439, 77 pages.
Pershing et al., "Aerial Roof Estimation System and Method," Office Action dated Oct. 10, 2012, for U.S. Appl. No. 13/371,271, 7 pages.
Pershing et al., "Aerial Roof Estimation System and Method," Notice of Allowance dated Jul. 29, 2013, for U.S. Appl. No. 13/371,271, 15 pages.
Pershing et al., "Aerial Roof Estimation System and Method," U.S. Appl. No. 60/925,072, filed Apr. 17, 2007, 16 pages.
Pershing et al., "Aerial Roof Estimation System and Methods," Office Action dated Aug. 28, 2012, for U.S. Appl. No. 13/287,954, 12 pages.
Pershing et al., "Aerial Roof Estimation System and Methods," Office Action dated May 22, 2013, for U.S. Appl. No. 13/287,954, 25 pages.
Pershing et al., "Aerial Roof Estimation Systems and Methods," Notice of Allowance dated Oct. 14, 2011, for U.S. Appl. No. 12/253,092, 30 pages.
Pershing et al., "Aerial Roof Estimation Systems and Methods," Office Action dated May 10, 2011, for U.S. Appl. No. 12/253,092, 26 pages.
Pershing et al., "Automated Techniques for Roof Estimation," U.S. Appl. No. 61/197,072, filed Oct. 31, 2008, 32 pages.
Pershing et al., "Geometric Correction of Rough Wireframe Models Derived From Photographs," U.S. Appl. No. 61/300,414, filed Feb. 1, 2010, 22 pages.
Pershing, "Concurrent Display Systems Anf Methods for Aerial Roof Estimation," Notice of Allowance dated Feb. 16, 2012, for U.S. Appl. No. 12/467,250, 19 pages.
Pershing, "Concurrent Display Systems Anf Methods for Aerial Roof Estimation," Office Action dated Sep. 7, 2011, for U.S. Appl. No. 12/467,250, 14 pages.

(56) References Cited

OTHER PUBLICATIONS

Pershing, "Concurrent Display Systems and Methods for Aerial Roof Estimation," Office Action dated Aug. 28, 2012, for U.S. Appl. No. 13/474,504, 8 pages.
Pershing, "Concurrent Display Systems and Methods for Aerial Roof Estimation," Office Action dated Jun. 19, 2013, for U.S. Appl. No. 13/474,504, 14 pages.
Pershing, "Pitch Determination Systems and Methods for Aerial Roof Estimation," Notice of Allowance dated Feb. 16, 2012, for U.S. Appl. No. 12/467,244, 20 pages.
Pershing, "Pitch Determination Systems and Methods for Aerial Roof Estimation," Office Action for U.S. Appl. No. 13/438,288, dated Aug. 24, 2012, 8 pages.
Pershing, "Pitch Determination Systems and Methods for Aerial Roof Estimation," Office Action dated May 21, 2013, for U.S. Appl. No. 13/438,288, 11 pages.
Pershing, "Pitch Determination Systems and Methods for Aerial Roof Estimation," Office Action dated Aug. 26, 2011, for U.S. Appl. No. 12/467,244, 17 pages.
Pershing, "Systems and Methods for Estimation of Building Floor Area," U.S. Appl. No. 13/385,607, filed Feb. 3, 2012, 41 pages.
Pershing, "Systems and Methods for Estimation of Building Floor Area," U.S. Appl. No. 13/757,712, filed Feb. 1, 2013, 95 pages.
Pershing, "Systems and Methods for Estimation of Building Wall Area," U.S. Appl. No. 13/757,694, filed Feb. 1, 2013, 96 pages.
Pershing, "User Interface Techniques for Roof Estimation," U.S. Appl. No. 61/197,904, filed Oct. 31, 2008, 62 pages.
PhotoModeler, "Measuring & Modeling the Real World," retrieved Sep. 30, 2008, from http://www.photomodeler.com/products/photomodeler.htm, 2 pages.
Pictometry Online, "Government" Oct. 7, 2008, retrieved Aug. 10, 2011, from http://web.archive.org/web/20081007111115/http:/www.pictometry.com/government/prod . . . , 3 pages.
Pictometry, "Electronics Field Study™ Getting Started Guide," Version 2.7, Jul. 2007, 15 pages.
Pictometry, "FAQs," Sep. 22, 2008, retrieved on Aug. 10, 2011, from http://www.web.archive.org/web/20080922013233/http://www.pictometry.com/about_us/faqs.sht . . . , 3 pages.
Pictometry.com, "Frequently Asked Questions," May 24, 2005, retrieved Mar. 28, 2012, from URL=http://web.archive.org/web/20050524205653/http://pictometry.com/faq.asp, 9 pages.
Pictometry.com, "Frequently Asked Questions," retrieved on Apr. 9, 2011, from http://replay.waybackmachine.org/20050801231818/http:///www.pictometry.com/faq.asp, 10 pages.
Pictometry.com, "Frequently Asked Questions," retrieved on Aug. 1, 2005, from http://replay.waybackmachine.org/20050801231818/http:///www.pictometry.com/faq.asp, 10 pages.
Pictometry.com, "Frequently Asked Questions," retrieved on Feb. 10, 2012, from http://replay.waybackmachine.org/20050801231818/http:///www.pictometry.com/faq.asp, 6 pages.
Pictometry.com, "Pictometry Announces Software and Web-based Solution for Engineers, Architects, and Planners," Press Release, Jan. 22, 2004, 3 pages.
Poullis et al., "Photogrammetric Modeling and Image-Based Rendering for Rapid Virtual Environment Creation," http://handle.dtic.mil/100.2/ADA433420, 1998, 7 pages.
Precigeo.com, "Welcome to precigeoRoof," URL=http://web.archive.org/web/20070106063144/roof.precigeo.com, retrieved Apr. 30, 2009, 1 page.
Precigeo.com, "Welcome to precigeo™," "Welcome to precigeoRoof," "Why precigeoRoof," "How precigeoRoof Works," "How precigeoRoof Can Help Me," all retrieved on Feb. 26, 2010, from http://web.archive.org/, pp. 1-5; "Why precigeoRisk Works" and :Welcome to precigeoRisk, retrieved on Aug. 14, 2010, from http://web.archive.org, pp. 6-11, 11 pages total.
Precigeo.com, "Welcome to precigeo™," URL=http://web.archive.org/20080110074814/http://www.precigeo.com, retrieved Feb. 17, 2009, 1 page.
Precigo.com, "How precigeoRoof Works," URL=http://web.archive.org/web/20070107012311/roofprecigeo.com/how-precigeo-roof-works.htm, retrieved Apr. 30, 2009, 2 pages.
Reddy et al., "Frequency-Space Decomposition and Acquisition of Light Transport under Spatially Varying Illumination," ECCV 2012, Florence, Italy, Oct. 2012, 15 pages.
RoofCAD, "Satellite Takeoff Tutorial-Pitched Roof," Jan. 31, 2012, 25 pages.
Scholze et al., "A Probabilistic Approach to building Roof Reconstruction Using Semantic Labeling," *Pattern Recognition 2449/2002*, Springer Berlin/Heidelberg, 2002, 8 pages.
Schutzberg et al., "Microsoft's MSN Virtual Earth: The Map is the Search Platform," *Directions Magazine*, retrieved Feb. 6, 2009, from http://www.directionsmag.com/article.php?article_id=873&try=1, 10 pages.
Seitz et al., "A Comparison and Evaluation of Multi-view Stereo Reconstruction Algorithms," CVPR 2006, New York, NY, Jun. 2006, 8 pages.
Shan et al., "Refractive Height Fields from Single and Multiple Images," CVPR 2012, Providence, RI, Jun. 2012, 8 pages.
Shan et al., "Refractive Height Fields from Single and Multiple Images," CVPR 2012, Providence, RI, Jun. 2012, poster, 1 page.
Sorcerer software screenshot, modified on Sep. 6, 2012, 1 page.
University of Washington, College of Arts & Sciences, Mathematics, Course Offerings, Autumn Quarter 2013 and Winter Quarter 2014, retrieved Oct. 25, 2013, from http://www.washington.edu/students/crscat/math.html, 16 pages.
U.S. Appl. No. 60/425,275, filed Nov. 8, 2002, 32 pages.
Wattenberg et al., "Area, Volume, and Torque in Three Dimensions," retrieved on Sep. 24, 2013, from http://www.math.montana.edu/frankw/ccp/multiworld/twothree/atv/learn.htm, 14 pages.
Weeks et al., "A Real-Time, Multichannel System with Parallel Digital Signal Processors," *Proceedings of IEEE International Conference on Acoustics, Speech and Signal Processing (ICASSP 1990)* 3: 1787-1790, Apr. 1990.
Wolf, *Elements of Photogrammetry*, McGraw-Hill Kogakusha, 1974, "Chapter Fourteen: Aerotriangulation; 41-1 Introduction," pp. 351-352, 3 pages.
Wood et al., "Surface Light Fields for 3D Photography," SIGGRAPH 2000, New Orleans, LA, Jul. 24-28, 2000, 10 pages.
Written Opinion for International Application No. PCT/US11/23408, dated Aug. 11, 2011, 5 pages.
Wu et al., "Multicore Bundle Adjustment," CVPR 2011, Colorado Springs, CO, Jun. 2011, 8 pages.
Wu et al., "Schematic Surface Reconstruction," CVPR 2012, Providence, RI, Jun. 2012, 1 page.
www.archive.org Web site showing alleged archive of PhotoModeler Web Site http://www.photomodeler.com/pmpro08.html from Feb. 9, 2006 (retrieved Oct. 21, 2013), 4 pages.
www.archive.org Web site showing alleged archive of German Aerowest Web Site http://aerowest.de/ from Feb. 6, 2006 (retrieved Sep. 20, 2012) and translated to English, 61 pages.
www.archive.org Web site showing alleged archive of German AeroDach Web Site http://www.areodach.de from Jun. 13, 2004 (retrieved Sep. 20, 2012) and translations to English, 21 pages.
YouTube, "Pictometry Online Demo," retrieved on Feb. 6, 2006, from http://www.youtube.com/watch?v=jURSKo0OD0, 1 page.
Zhang et al., "Rapid Shape Acquisition Using Color Structured Light and Multi-Pass Dynamic Programming," International Symposium on 3D Data Processing Visualization and Transmission, Padova, Italy, Jun. 2002, 13 pages.
Zhang et al., "Shape and Motion Under Varying Illumination: Unifying Structure from Motion, Photometric Stereo, and Multiview Stereo," ICCV 2003, Nice, France, Oct. 2003, 8 pages.
Zhang et al., "Spacetime Stereo: Shape Recovery for Dynamic Scenes," CVPR 2003, Madison, Wisconsin, Jun. 2003, 8 pages.
Zheng et al., "A Consistent Segmentation Approach to Image-based Rendering," Technical Report CSE-09-03-02, 2002, 8 pages.
Zheng et al., "Parallax Photography: Creating 3D Cinematic Effects form Stills," Proceedings of Graphics Interface 2009, Kelowna, BC, CA, May 2009, 8 pages.

(56) References Cited

OTHER PUBLICATIONS

Ziegler et al., "3D Reconstruction Using Labeled Image Regions," Mitsubishi Research Laboratories, http://www.merl.com, Jun. 2003, 14 pages.
Zongker et al., "Environment Matting and Compositing," SIGGRAPH '99, Los Angeles, CA, Aug. 9-13, 1999, 10 pages.
Autodesk, Inc., "AutoCAD 2011: User's Guide," Feb. 2010, retrieved from http://docs.autodesk.com/ACD/2011/ENU/pdfs/acad_aug.pdf, on Dec. 15, 2014, 2280 pages.
Australian Examination Report, dated Dec. 18, 2014, for corresponding Australian Patent Application No. 2013205518, 8 pages.
John Doe Roofing, "Premium Roof and Walls Report," Oct. 8, 2012, Eagle View Technologies, Inc., Report 1234567, retrieved from http://web.archive.org/web/20121116170417/http://www.eagleview.com/portals/0/portalcontent/SR-2400%20Prem&Wall.pdf, on Dec. 15, 2014, 18 pages.
Lam et al., "Task 2.2 12—CMU Report 02: Identification and Analysis of Interoperability Gaps between Nbims/Open Standards and Building Performance Simulation Tools," Feb. 2012, Carnegie Mellon University, Greater Philadelphia Innovation Cluster for Energy—Efficient Buildings, retrieved from http://www.andrew.cmu.edu/user/okaraguz/TechnicalWritingSamples/Interoperability_Identification.pdf, on Dec. 15, 2014, 25 pages.
Pershing et al., "Aerial Roof Estimation System and Method," Amendment filed Mar. 11, 2013, for U.S. Appl. No. 13/371,271, 34 pages.
Dorninger et al., "A Comprehensive Automated 3D Approach for Building Extraction, Reconstruction, and Regularization from Airbourne Laser Scanning Point Clouds," *Sensors* 8:7323-7343, 2008.
Forlani et al., "Building Reconstruction and Visualization from LIDAR data," The International Archive of the Photogrammetry, *Remote Sensing and Spatial Information Sciences XXXIV*:151-156, Part 5/W12, 2003.
International Search Report and Written Opinion of the International Searching Authority, dated Jul. 8, 2014, for International Application No. PCT/US14/25030, 11 pages.
Pershing et al., "Systems and Methods for Estimation of Building Wall Area," Office Action, dated May 20, 2014, for U.S. Appl. No. 13/385,606, 47 pages.
Brolafountaine, Generating exterior walls from roofs in Sketch (Part 1)—Xactimate 27—sent May 6, 2015, Video.
Charaniya et al., "3D Urban Reconstruction from Aerial LiDAR data," Computer Science, University of California, Santa Cruz, pp. 1-43, IEEE, 2004.
NoviDesign, "Drawing 3D Roofs with AutoCAD Architecture," Uploaded on Dec. 14, 2010, retrieved from https://www.youtube.com/watch?v=0huJUPfK4w0, YouTube Video.
Pershing et al., "Systems and Methods for Estimation of Building Wall Area and Producing a Wall Estimation Report," U.S. Appl. No. 13/844,684, Non Final Action dated Dec. 1, 2015, 19 pages.
Pershing, "Systems and Methods for Estimation of Building Floor Area," U.S. Appl. No. 13/385,607, Final Rejection dated Nov. 17, 2015, 17 pages.
Pershing, "Systems and Methods for Estimation of Building Wall Area," U.S. Appl. No. 13/757,694, Final Rejection dated Nov. 9, 2015, 14 pages.
Pershing, "Systems and Methods for Estimation of Building Wall Area," U.S. Appl. No. 13/385,606, Final Rejection dated Nov. 3, 2015, 33 pages.
Patent Examination Report No. 3, dated Sep. 13, 2016, for Australian Application No. 2013205518, 3 pages.
USPTO Decision on Appeal regarding U.S. Appl. No. 13/385,606 dated Jun. 19, 2017.
U.S. Appl. No. 14/204,142, Office Action Summary dated Dec. 20, 2016, 77 pages.
U.S. Appl. No. 13/844,684, Office Action Summary dated Feb. 8, 2017, 24 pages.
USPTO Office Action regarding U.S. Appl. No. 13/844,684 dated Sep. 18, 2017.
Response to Office Action regarding U.S. Appl. No. 13/385,607 dated Nov. 6, 2017.
Response to Office Action regarding U.S. Appl. No. 13/385,606 dated Nov. 6, 2017.
Olsen et al., What We Know about Demand Surge: Brief Summary, May 2011, Natural Hazards Review, vol. 12, 63-69 (Year: 2011).
Eagle View Technologies, Inc., Response to Office Action regarding U.S. Appl. No. 13/844,684 dated Mar. 15, 2018.
USPTO, Office Action regarding U.S. Appl. No. 13/385,607, dated Feb. 23, 2018.
Eagle View Technologies, Inc., Response to Office Action regarding U.S. Appl. No. 13/385,607 dated Aug. 23, 2018.
USPTO, Office Action regarding U.S. Appl. No. 13/844,684, dated Sep. 20, 2018.
Australian Patent Office, Examination Report regarding Australian Application No. AU 2017232194, dated Oct. 17, 2018.
Australian Patent Office, Examination Report regarding Australian Application No. AU 2014235296, dated Jan. 30, 2019.
Canadian Patent Office, Office Action regarding Canadian Application No. CA 2,862,868, dated Oct. 18, 2018.
United States Patent Office, Office Action regarding U.S. Appl. No. 13/844,684, dated Sep. 20, 2018.
Doringer et al., "A Comprehensive Automated 3D Approach for Building Extraction, Reconstruction, and Regularization from Airborne Laser Scanning Point Clouds," Sensors, 2008, 8, pp. 7323-7343.
United States Patent Office, Office Action regarding U.S. Appl. No. 13/385,607, dated Oct. 4, 2018.
United States Patent Office, Office Action regarding U.S. Appl. No. 13/385,607, dated Apr. 25, 2019.
Eagle View Technologies, Inc., Response to USPTO Sep. 20, 2018 Office Action regarding U.S. Appl. No. 13/844,684, dated Mar. 15, 2019.
Canadian Patent Office, Office Action regarding Canadian Application No. CA 2,862,970, dated Nov. 2, 2018.
Eagle View Technologies, Inc., Response to Office Action regarding Canadian Application No. CA 2,862,970, dated May 2, 2019.
Eagle View Technologies, Inc., Response to Office Action regarding Canadian Application No. CA 2,862,868, dated Apr. 18, 2019.
United States Patent Office, Final Office Action regarding U.S. Appl. No. 13/844,684, dated Jun. 27, 2019.
Canadian Patent Office, Office Action regarding Canadian Application No. CA 2,862,870, dated Jul. 12, 2019.
YouTube, "Pictometry Online Demo," DVD, Feb. 25, 2010.
Hatter, "How do I figure Square Footage for Painting the Outside of a House?" Dec. 2, 2010, retrieved from http://web.archive.org/web/20101202033520/http://homeguides.sfgate.com/figure-square-footage-painting-outside-house-8721.html, on Apr. 26, 2015, 2 pages.
Pershing, "Systems and Methods for Estimation of Building Wall Area," Office Action, dated May 6, 2015, for U.S. Appl. No. 13/385,606, 20 pages.
Wikihow, "How to Calculate Amount of Paint to Paint a Room," Jul. 11, 2011, retrieved from http://web.archive.org/web/201107110709/http://www.wikihow.com/Calculate-Amount-of-paint-to-paint-a-room, on Apr. 9, 2015, 2 pages.

\* cited by examiner

PROPERTY RISK MANAGEMENT REPORT
Custom Residential Report
Report Date: ** <Date.
Property: 123 Main St., Anytown, WA 98xxx
Policy #: N/A
PREPARED FOR:
John Doe
EagleLuke Technologies
1234 First St.
Northerntown, WA 98xxx
*Fig. 22*

 Property Risk Management Report — 728

123 Main St., Anytown, WA 98xxx     <Date>

REPORT DETAILS

| | |
|---|---|
| Report: | 5635553 |
| Policy: | N/A |
| Renewal Date: | N/A |
| Date of Photo: | 12/13/2006 |
| Geocode: | 40.2119742, 93.8694994 |

BUILDING SUMMARY

| | |
|---|---|
| Year Built: | 1983 |
| Number of Stories: | 2 |
| Estimated Living Area: | 1,965 sq. ft. |
| Garage (Attached): | 484 sq. ft. |

REPORT CONTENTS

Report Images................................................ 2
Living Area Diagram........................................ 5
Structural & Property Observations................. 7

PREPARED FOR:
EagleLuke Technologies

PAGE 1

*Fig. 23*

Property Risk Management Report
123 Main St, Anytown, WA 98xxx     <Date>
REPORT IMAGES     Report #: 5635553
Geocode: 40.2119742,
93.8694994
The following aerial images show different angles of this structure for your reference. Additional images may have been used in the creation of this report and not included in this final document.
Area View
PAGE 2
*Fig. 24*

Property Risk Management Report
123 Main St., Anytown, WA 98xxx <Date>
REPORT IMAGES
Report #: 5635653
Geocode: 40.2119742,
93.8694984
The following aerial images show different angles of this structure for your reference. Additional images may have been used in the creation of this report and not included in this final document.
North View
South View
PAGE 3
*Fig. 25*

Property Risk Management Report
123 Main St., Anytown, WA 98xxx <Date>
REPORT IMAGES
Report #: 5635553
Geocode: 40.2119742, 93.8694994
The following aerial images show different angles of this structure for your reference. Additional images may have been used in the creation of this report and not included in this final document.
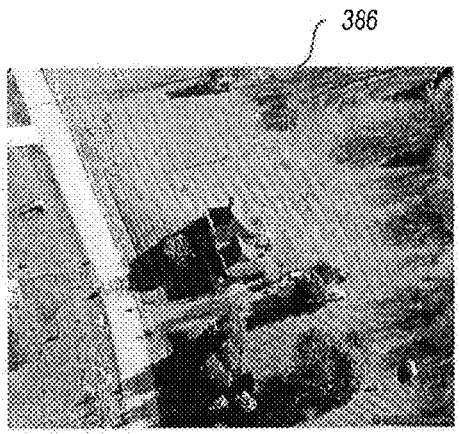
East View
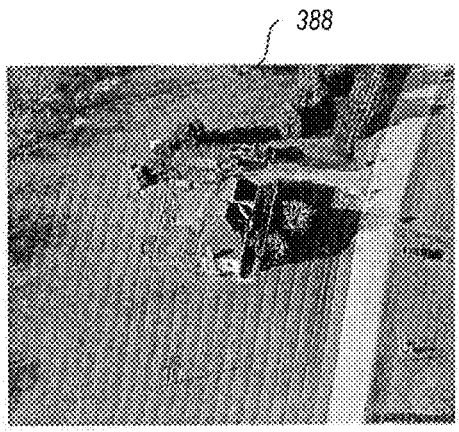
West View
PAGE 4
*Fig. 26*

 Property Risk Management Report

STRUCTURAL & PROPERTY OBSERVATIONS

123 Main St, Anytown, WA 98xxx  <Date>

Report #: 5635553
Geocode: 40.2119742, 93.8694994

CONFIDENCE RATING: ■ ■ ■ ■ — 410

4 – Very High: Straightforward construction, often single story, easily-defined garage, quality images.
3 – High: Potential for minor discrepancies, like vaulted ceilings on two stories home, or minor tree coverage.
2 – Medium: Very complex construction with multiple stories often combined with poor or incomplete image sets.
1 – Low: Very poor or incomplete images.

STRUCTURAL OBSERVATIONS

| Field | Value |
|---|---|
| Year Built: | 1983 |
| Number of Stories: | 2 |
| Number of Family Structure: | Single Family |
| Structure Footprint: | 1,539 sq. ft. |
| Corners: | 6 |
| Estimated Total Living Area: | 1,965 sq. ft. |
| Garage Area: | 484 sq. ft. |
| Garage Type: | Attached |
| Deck Area: | 449 sq. ft. |
| Patio Area: | 0 sq. ft. |
| Porch Area: | 0 sq. ft. |
| Estimated Roof Pitch: | 6-9 |
| Roof Shape: | Hip/Gable |
| Number of Chimneys: | 1 |
| Outbuilding Count: | 0 |
| Outbuilding Total Area: | 0 sq. ft. |
| Basement Area: | 1,012 sq. ft. |
| Finished Basement Area: | 1,012 sq. ft. |
| Basement Type: | Full |
| Basement Description: | Finished |

For more information, please see our *Glossary of Terms*.

PROPERTY OBSERVATIONS

| Field | Value |
|---|---|
| Building Permit: | No |
| EagleView Roof Report: | No |
| EagleView Wall Report: | No |
| Dist. to Commercial Exposure: | 436 ft. |
| Distance to Steep Slope: | 117 ft. |
| Distance to Water Hazard: | 0 ft. |
| Distance to Vegetation: | 161 ft. |
| Type of Vegetation: | Tree |
| Cross-Sell Identification: | Motorcycles |
| Slope on Property: | No |
| Trampoline: | No |
| Swimming Pool/Hot Tub: | No |
| Responding Fire Station: | Leavenworth County Fire Department District 1 Station 1 |
| Responding Fire Station Type: | Combination |
| Responding Fire Station Dist.: | 4-5 Miles |
| Owner Occupied: | N/A |

*Fig. 29*

SYSTEMS AND METHODS FOR PERFORMING A RISK MANAGEMENT ASSESSMENT OF A PROPERTY

BACKGROUND

Technical Field

This invention is in the field of building size estimation, and in particular, building floor area estimation.

Description of the Related Art

Building floor area is used throughout the construction, real estate, insurance and finance industries. For example, the square footage measurement of a building is used as a main factor in quickly determining the market value of real estate, estimating costs of materials to repair or replace flooring and make other improvements or modifications to the entire building. Thus, accurate floor area measurements are instrumental in these calculations. Current methods of measuring floor area often involve a person having to visit the building and manually measure particular dimensions within the building, or by referring to original plans or blueprints of the building. Manually measuring the dimensions for verification of building floor area is costly and original plans for the building may be unavailable or out of date. Therefore, accurate methods for estimating and verifying floor area, and for using such floor area estimation and verification in the construction, real estate, insurance and finance industries, which avoid these drawbacks are desirable.

SUMMARY OF THE INVENTION

A subset of building floor area, referred to as total living area (TLA) is used by insurance underwriters (Underwriters) as one component of assessing whether to insure a property, what kind of insurance to provide and at what premium rate. Underwriters also factor in overall condition of the property to be insured which includes, among other things, a visual assessment of the number of buildings such as detached garages and barns on the property; building features such as roofs, chimneys, siding, skylights, windows and doors; items on the property such as recreational vehicles, abandoned cars, and animal pens; and distances from the property to features such as steep ground slopes, water hazards, greenbelt areas, and fire hydrants. In addition, Underwriters may also factor in data from government records pertaining to the property and buildings on it. Current methods of acquiring this information often involve a person having to visit the property and manually measure and inspect the property, or having to visit a location to view original plans or blueprints of the building. Manually measuring total living area (TLA) and manually evaluating property condition is costly, particularly given the high demand for underwriting new policies or reassessing old policies. Therefore accurate methods for estimating TLA and evaluating property conditions that avoid these drawbacks are desirable.

In one embodiment, a floor area measurement system receives a first and a second aerial image of the building, each of the aerial images providing a different view of the roof of the building. The system correlates the first aerial image with the second aerial image to generate a three-dimensional model of the roof that includes a plurality of planar roof sections that each have a corresponding slope, area, and edges. An adjusted roof model is generated by adjusting a slope of the planar roof sections in the three dimensional model of the roof to substantially zero. This may be performed in a variety of manners, including, in one embodiment, removing particular roof features from the model that would not be present in a flat roof, namely a roof with zero slope. For example, one step is to remove ridge lines or other features distinguishing individual planar roof sections resulting in a virtual fusing of the individual roof sections in the model into one flat roof. This may be performed instead of or in addition to adjusting a slope parameter or variable of each roof section within the roof model to zero. In other embodiments, this step may be performed with just one initial aerial image of the building showing a substantially orthogonal view of the building since roof pitch need not be determined and can be assumed to be zero.

The system generates the estimated floor area measurement of the building based on the calculated estimated total roof area of the roof after the roof model has been adjusted. This is based on a correlation between the size of the building roof and the size of the building. Typically, the floor area of a single full floor of the building is roughly the size of the roof of the building if the roof were assumed to be flat, namely a slope of zero. This will turn the roof into another floor in the virtual space. With additional adjustments to the roof area measurements to account for multiple floors, roof overhang, wall width, internal building features such as walls and staircases, and/or obstructed views of the building in the aerial image(s), etc., an even more accurate floor area estimation is generated.

In one embodiment, a floor area measurement estimation system may be a system integrated with a roof estimation system or other system that provides roof measurements. In other embodiments, the roof area measurements may be provided by an external source, system or entity, or may be input manually by an operator of the floor area measurement estimation system. Various received roof measurements may often correspond closely to external dimensions of the building such as the width and length of the building and/or lengths of exterior walls or sections of exterior walls of the building. In another embodiment, the output of the floor area measurement may take the form of an electronic or printed report that includes, but is not limited to geocoding information of the property, images of the property from one or more views, diagrams showing the area and dimensions of living area on different floors.

One embodiment is a computing system for generating an estimated floor area measurement, the computing system comprising: a memory; a floor area measurement estimation module that is stored on the memory and that is configured, when executed, to: receive one or more aerial images of a roof of a building including a substantially top-down image of the roof; and generate, based at least in part on the received aerial images, an estimated floor area measurement of the building.

One embodiment is a computer-implemented method for generating an estimated floor area measurement, the method comprising: receiving one or more aerial images of a roof of a building including a substantially top-down image of the roof; using the substantially top-down image of the roof to calculate an estimated total roof area of the roof assuming each section of the roof has no slope; and generating the estimated floor area measurement of the building based on the calculated estimate total roof area of the roof.

One embodiment is a computer-readable medium whose contents enable a computing system to generate an estimated floor area measurement, by performing a method comprising: receiving one or more aerial images of a roof of a building including a substantially top-down image; using the substantially top-down image to calculate an estimated total roof area of the roof assuming each section of the roof has no slope; using the one or more aerial images of the roof to determine the number of floors of the building that are under the roof; and generating, based at least in part on the estimated total roof area measurement and the number of floors that are under the roof, an estimated floor area measurement of the building.

One embodiment is a computing system for generating a risk management report, the computer system comprising: a memory; a risk management report module that is stored on the memory and that is configured, when executed, to: receive features and conditions data about a property; receive risk management criteria for the property; and generate, based at least in part on the received features and conditions data and risk management criteria, a risk management report for the property.

One embodiment is a computer-implemented method for generating a risk management report, the method comprising: receiving features and conditions data about a property; receiving risk management criteria for the property; and generating, based at least in part on the received features and conditions data and risk management criteria, a risk management report for the property.

One embodiment is a computer-readable medium whose contents enable a computing system to generate an estimated floor area measurement, by performing a method comprising: receiving features and conditions data about a property; receiving risk management criteria for the property; and generating, based at least in part on the received features and conditions data and risk management criteria, a risk management report for the property.

One embodiment is a computing system for generating a risk management report, the computing system comprising: a memory; a risk management report module that is stored on the memory and that is configured, when executed, to: receive features and conditions data about a property; receive risk management criteria for the property; receive one or more aerial images of a roof of a building on the property including a substantially top-down image of the roof; generate, based at least in part on the received aerial images, an estimated floor area measurement of the building; and generate, based at least in part on the received features and conditions data, estimated floor area measurement of the building and risk management criteria, a risk management report for the property.

One embodiment is a computer-implemented method for generating a risk management report, the method comprising: receiving features and conditions data about a property; receiving risk management criteria for the property; receiving one or more aerial images of a roof of a building on the property including a substantially top-down image; using the substantially top-down image of the roof to calculate an estimated total roof area of the roof assuming each section of the roof has no slope; using the one or more aerial images of the roof to determine the number of floors of the building that are under the roof; generating, based at least in part on the estimated total roof area measurement and the number of floors that are under the roof, an estimated floor area measurement of the building; and generating, based at least in part on the received features and conditions data, estimated floor area measurement of the building and risk management criteria, a risk management report for the property.

A computer-readable medium whose contents enable a computing system to generate an estimated floor area measurement, by performing a method comprising: receiving features and conditions data about a property; receiving risk management criteria for the property; receiving one or more aerial images of a roof of a building on the property including a substantially top-down image; using the substantially top-down image of the roof to calculate an estimated total roof area of the roof assuming each section of the roof has no slope; using the one or more aerial images of the roof to determine the number of floors of the building that are under the roof; and generating, based at least in part on the received features and conditions data, estimated floor area measurement of the building and risk management criteria, a risk management report for the property.

In another embodiment, the output of the floor area measurement may take the form of an electronic or printed report that includes, but is not limited to geocoding information of the property, images of the property from one or more views, diagrams showing the area and dimensions of living area on different floors, number of stories.

The output of the overall property condition evaluation includes structural observations such as type of structure, corners, estimated roof pitch, roof shape, structure footprint, basement area and basement type; and property observations, such as whether there is building permit, roof or wall report available, distances to commercial exposures or natural hazards, and/or other property observations.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 22 is an example page of a report that provides floor area and property assessment data, such as that estimated in the method of FIGS. 1A-1I, according to one non-limiting illustrated embodiment.

FIG. 23 is an example page of a report to provide floor area and property risk assessment data, including report details and building summary, such as that estimated in the method of FIGS. 1A-1I, according to one non-limiting illustrated embodiment.

FIG. 24 is an example page of a report to provide floor area and property risk assessment data, including report images, such as that described in the method of FIGS. 1A-1I, according to one non-limiting illustrated embodiment.

FIG. 25 is an example page of a report to provide floor area and property risk assessment data, including multiple aerial angles of the property, such as that described in the method of FIGS. 1A-1I, according to one non-limiting illustrated embodiment.

FIG. 26 is an example page of a report to provide floor area and property risk assessment data, including multiple aerial angle images, such as that described in the method of FIGS. 1A-1I, according to one non-limiting illustrated embodiment.

FIG. 29 is an example page of a report to provide floor area and property assessment data, including structural observations, property observations, and confidence rating of the floor area and property assessment data, such as that described in the method of FIGS. 1A-1I, according to one non-limiting illustrated embodiment.

DETAILED DESCRIPTION

Figure 1A:
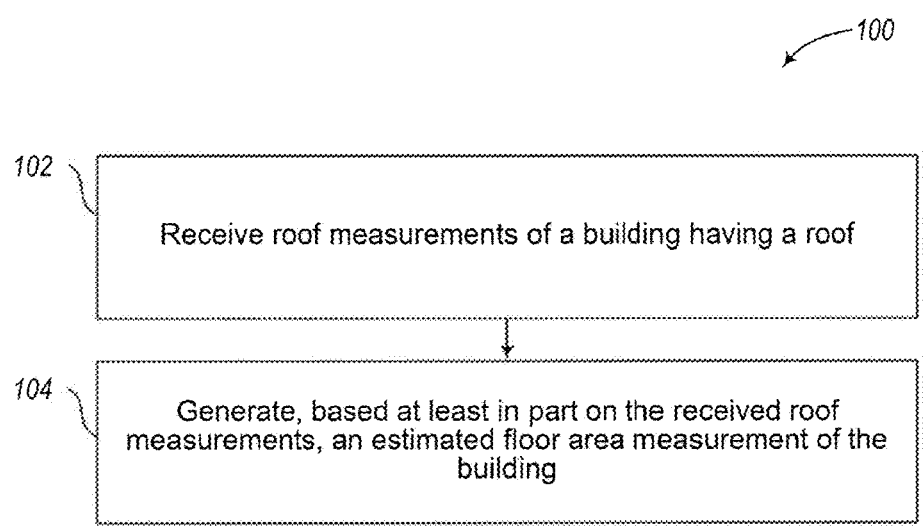
FIG. 1A is a flow diagram showing an example method of generating an estimated floor area measurement, according to one non-limiting illustrated embodiment.

FIG. 1A is a flow diagram showing an example method 100 of generating an estimated floor area measurement, according to one non-limiting illustrated embodiment.

While each of the steps shown in FIG. 1A contributes to the overall solution, each can be used independently or in various combinations to yield improvements in estimating floor area measurements as discussed below. Below is an overview of each step in the process, which will be followed by a more detailed discussion of each step.

At 102, the process receives roof measurements of a building having a roof. These measurements may be estimated or actual dimensional and/or area measurements of the roof such as one or more of: roof edge lengths, ridge lengths, gable lengths, hip lengths, valley lengths, roof section pitch, roof area measurements, planar roof section area measurements, planar roof section dimension measurements, etc. These roof measurements may be generated internally by a component of a system that estimates floor area measurements (i.e., a floor area measurement estimation system) and received from such an internal component, or may be generated and received from an external component or entity separate from the floor area measurement estimation system. In some embodiments, the external component is located remotely from the floor area measurement estimation system.

For example, in some embodiments, the floor area measurement estimation system may be a system integrated with a roof estimation system or other system that provides roof measurements. In other embodiments, the roof area measurements may be provided by an external source, system or entity, or may be input manually by an operator of the floor area measurement estimation system. Various received roof measurements may often correspond closely to external dimensions of the building such as the width and length of the building and/or lengths of exterior walls or sections of exterior walls of the building.

At 104, the process generates, based at least in part on the received roof measurements, an estimated floor area measurement of the building. For example, the received roof measurements may include roof edge measurements of the roof. In such an embodiment, a floor area measurement estimation module of the floor area measurement estimation system is configured to generate, based at least in part on the received roof measurements, an estimated floor area measurement. In some embodiments, the received roof measurements may include roof area measurements. In some embodiments, the floor area measurement estimation module of the floor area measurement estimation system is configured to generate, based at least in part on the received roof area measurements, an estimated floor area measurement. For example, the roof measurements may be generated by the roof estimation system described in U.S. Pat. No. 8,078,436 issued Dec. 13, 2011, and entitled AERIAL ROOF ESTIMATION SYSTEMS AND METHODS, U.S. Pat. No. 8,209,152 issued Jun. 26, 2012, and entitled CONCURRENT DISPLAY SYSTEMS AND METHODS FOR AERIAL ROOF ESTIMATION, which are each incorporated herein by reference in their entireties and such a roof estimation system may be integrated with the floor area measurement estimation system, or various components of the floor area measurement estimation system described herein. Also, features of embodiments described herein may be combined with one or more other features of estimating measurements of structures, including those systems and methods described in U.S. patent application Ser. No. 13/757,694, filed Feb. 1, 2013 entitled SYSTEMS AND METHODS FOR ESTIMATION OF BUILDING WALL AREA which is incorporated herein by reference in its entirety.

In many such embodiments, one or more of the roof measurements are based on aerial photographs of the building via manual or automated analysis of roof features, such as by using the roof estimation system or modules described in one or more of U.S. patent application Ser. No. 12/148,439 filed on Apr. 17, 2008 and entitled AERIAL ROOF ESTIMATION SYSTEM AND METHOD, U.S. Pat. No. 8,078,436 issued Dec. 13, 2011, and entitled AERIAL ROOF ESTIMATION SYSTEMS AND METHODS, U.S. patent application Ser. No. 12/467,244 filed May 15, 2009 and entitled PITCH DETERMINATION SYSTEMS AND METHODS FOR AERIAL ROOF ESTIMATION, U.S. patent application Ser. No. 12/467,250 filed May 15, 2009 and entitled CONCURRENT DISPLAY SYSTEMS AND METHODS FOR AERIAL ROOF ESTIMATION, U.S. patent application Ser. No. 13/019,228 filed Feb. 1, 2011 and entitled GEOMETRIC CORRECTION OF ROUGH WIREFRAME MODELS DERIVED FROM PHOTOGRAPHS and U.S. Provisional Patent Application Ser. No. 61/594,956 filed Feb. 3, 2012 and entitled SYSTEMS AND METHODS FOR ESTIMATION OF BUILDING WALL AREA. In some alternative embodiments, such measurements may be made by an operator or an automated system actually or virtually outlining, drawing and/or otherwise detecting the perimeter of the roof on, or based on, an aerial image of the roof to indicate an initial estimated floor shape or foot print, and providing such data as input used by the system for estimating floor area described herein which would otherwise use the roof edge measurements from a two or three dimensional model of the roof. For example, such outlining or drawing the perimeter on the roof may be performed within a graphical user interface displaying the image of the roof such as that shown in FIGS. 10-15 below. Thus, utilizing some embodiments described herein, one may estimate floor area measurements of a building merely using one or more aerial photographs of the building, with little or no additional information initially needed.

Figure 1B:
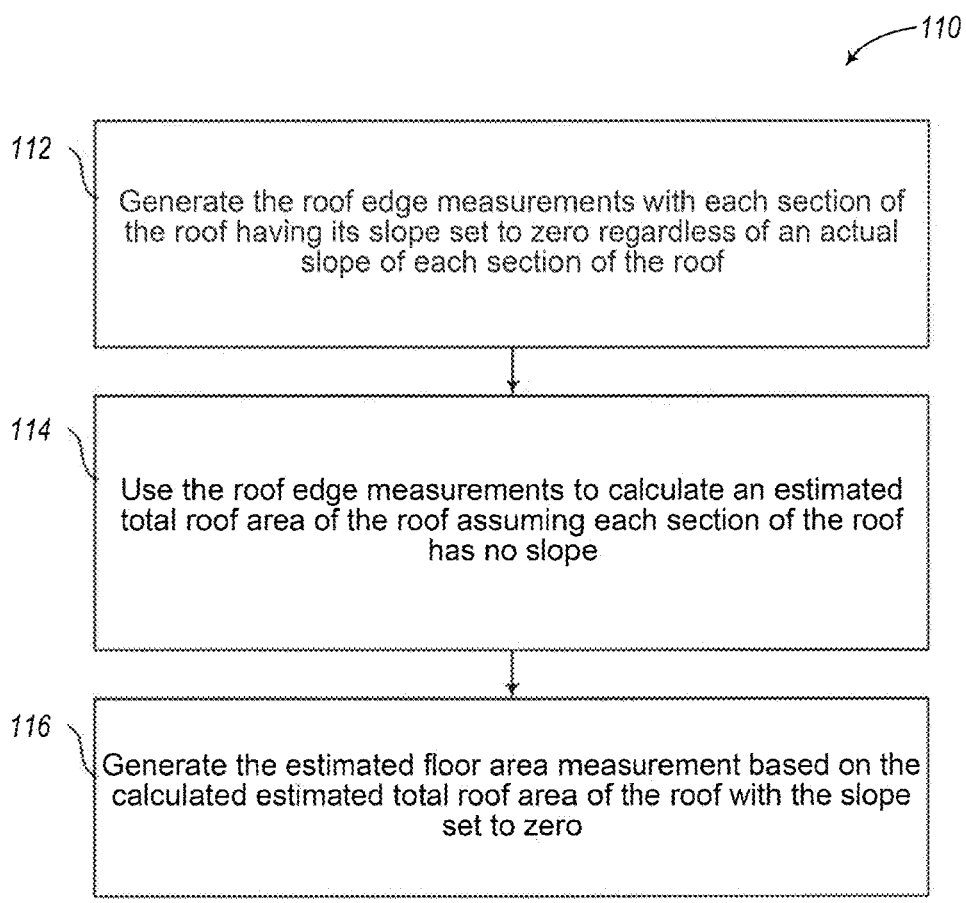
FIG. 1B is a flow diagram showing a method that may be included as part of the generating floor area measurement step of the method shown in FIG. 1A, according to one non-limiting illustrated embodiment.

FIG. 1B is a flow diagram showing a method 110 that may be included as part of the generating floor area measurement step of the method shown in FIG. 1A, according to one non-limiting illustrated embodiment.

While each of the steps shown in FIG. 1B contributes to the overall solution, each can be used independently or in various combinations to yield improvements in estimating floor area measurements as discussed below.

At 112, the process generates roof edge measurements based on initial roof edge measurements included in the received roof measurements, assuming each section of the roof has no slope regardless of an actual slope of each section of the roof. For example, if the two edges of the gable of a pitched roof are 20 feet and the gable has a pitch angle of 90 degrees, then instead of two edges of 20 feet, the process generates a single roof edge of sqrt(800)~28.3 feet. The process generates roof edge measurements as if the entire roof was flat.

At 114, the process uses the roof edge measurements to calculate an estimated total roof area of the roof assuming each section of the roof has no slope. Thus, the process generates roof area measurements as if the entire roof was flat.

In embodiments in which a roof estimation system is integrated with the floor area measurement system, the floor area measurement system first receives a first and a second aerial image of the building, each of the aerial images providing a different view of the roof of the building. The system correlates the first aerial image with the second aerial image to generate a three-dimensional model of the roof that includes a plurality of planar roof sections that each have a corresponding slope, area, and edges. In this embodiment, an adjusted roof model is generated by adjusting a slope of the planar roof sections in the three dimensional model of the roof to substantially zero. This may be performed in a variety of manners, including, for example, removing particular roof features from the model that would not be present in a roof with a slope of zero. The planar roof sections in the model become one large flat roof section. For example, the system will remove ridge lines, valleys or other features distinguishing individual planar roof sections. This creates the effect of having fused all roof sections together which can be termed as fusing them in a virtual software computer sense. This may be also performed instead of or in addition to by just adjusting a slope parameter or variable of each roof section within the roof model to zero. In other embodiments, this step may be performed with just one initial aerial image of the building showing a substantially orthogonal view of the building since roof pitch need not be determined and can be assumed to be zero.

At 116, the process generates the estimated floor area measurement based on the calculated estimated total roof area of the roof. This is based on a correlation between the size of the building roof and the size of the building. Typically, the floor area of a single full floor of the building is roughly the size of the roof of the building if the roof were flat with no slope (i.e., virtually turning the roof into another floor). With additional adjustments to the roof area measurements described below (e.g., with respect to FIG. 1C) to account for multiple floors, roof overhang, wall width, internal building features such as walls and staircases, and/or obstructed views of the building in the aerial image (s), etc., an even more accurate floor area estimation is generated.

In other embodiments, the received roof measurements may instead or additionally include at least one of: a plurality of dimensional measurements of a two-dimensional outline of the roof from a top plan view of the roof and an area of the two-dimensional outline of the roof from the top plan view of the roof. In such instances, the dimensions of the two-dimensional outline of the roof from a top plan view of the roof may be used as the roof edge measurements on which to base the estimated floor area. However, these dimensional measurements of a two-dimensional outline of the roof need not be referred to as "roof edge measurements" or "roof measurements" to fall within the scope of the embodiments described herein.

Figure 1C:
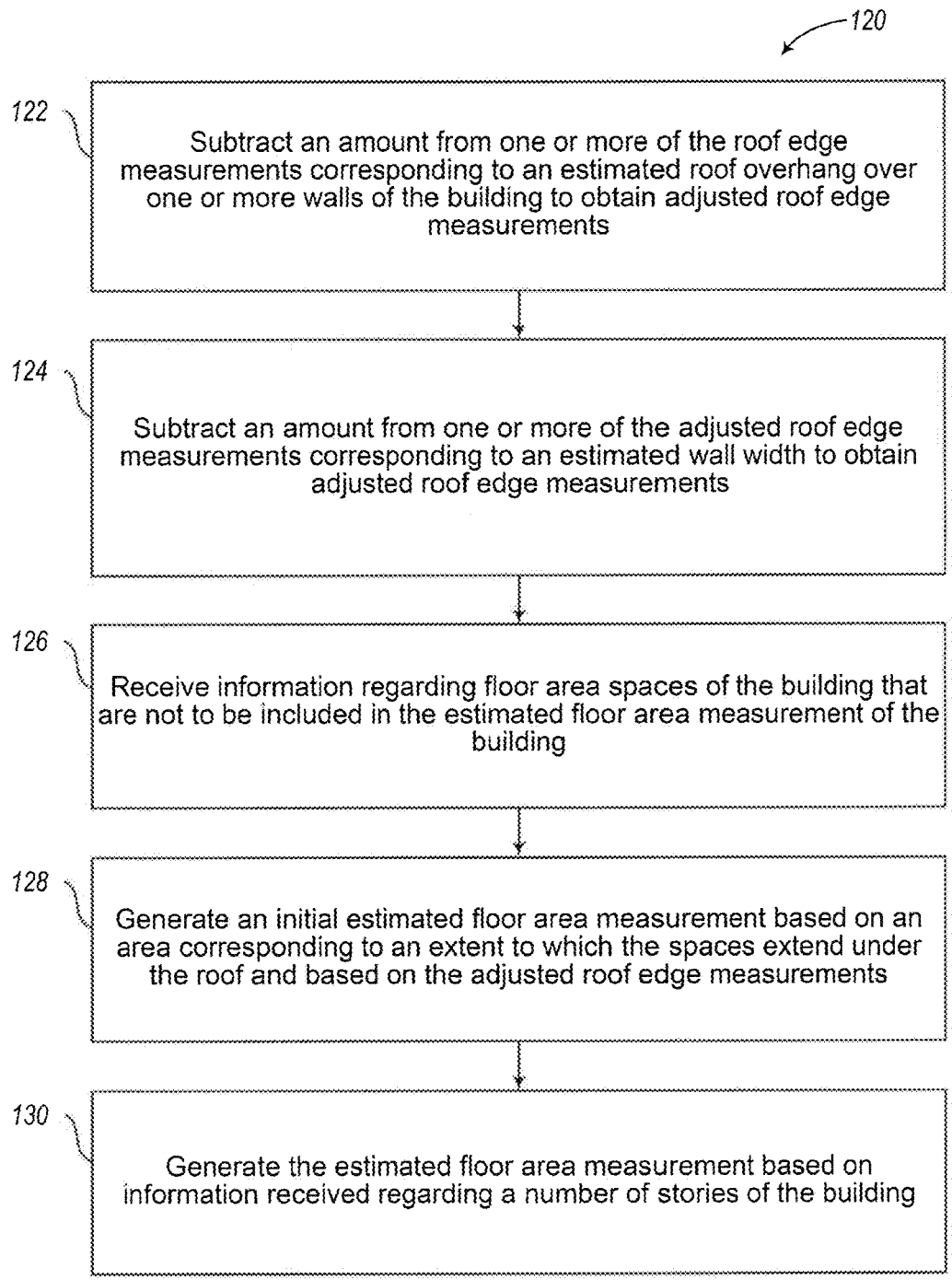
FIG. 1C is a flow diagram showing a method that may be included as part of the generating total roof area step of the method shown in FIG. 1B, according to one non-limiting illustrated embodiment.

FIG. 1C is a flow diagram showing a method 120 that may be included as part of the generating total roof area step of the method shown in FIG. 1B, according to one non-limiting illustrated embodiment. While each of the steps shown in FIG. 1C contributes to the overall solution, each can be used independently or in various combinations to yield improvements in estimating floor area measurements as discussed herein.

At 122, the process subtracts an amount from one or more of the roof edge measurements corresponding to an estimated roof overhang over one or more walls of the building to obtain adjusted roof edge measurements. For example, each roof edge measurement may be reduced by 6 inches to 18 inches corresponding to an estimated roof overhang, which is selectable by a user of the floor area measurement estimation system. This can be considered to be eroding the length in a virtual sense by some amount. However, any variety of other lengths or ranges of lengths may be used including, for example a zero length or those of standard or typical roof overhang lengths.

At 124 the process subtracts an amount from one or more of the adjusted roof edge measurements corresponding to an estimated wall width to obtain adjusted roof edge measurements. For example, each roof edge measurement may be reduced by 6 inches to 18 inches corresponding to an estimated wall width, which is selectable by a user of the floor area measurement estimation system. However, other lengths or ranges of lengths may be used (e.g., those of standard or typical wall widths).

At 126 the process receives information regarding floor area spaces of the building that are not to be included in the estimated floor area measurement of the building. For example, these areas may be areas of the building that are not used for living inside the building or areas outside the building including, but not limited to: garages; attics; unfinished rooms above the garage or other locations; covered balconies; patios, decks or porches, unfinished basements; crawl spaces; etc. This information may be received from an external system, source or entity; input by a user (e.g., identified or marked by a user on an image or drawing of the building displayed within a graphical user interface of the system); and/or identified by the system via analysis of an image of the building. In some embodiments, adjustments to exclude areas not to be included in the living area calculation may be made by reducing the total area of the building by a certain percentage factor. This reduction would estimate non-living area taken up by interior walls, stairs, and other similar features. This percentage factor reduction may be based on statistical analysis of buildings with similar design, historical measurements of the building, or partial measurements of the building. The percentage factor reduction may also be estimated by the building owner, occupier, or contractor.

At 128 the process generates an initial estimated floor area measurement based on an area corresponding to an extent to which the spaces that are not to be included in the estimated floor area measurement extend under the roof and based on the adjusted roof edge measurements. For example, the roof edge measurements may be used to calculate an estimated roof area with assumed slope of zero. Then, areas corresponding to an extent to which such spaces extend under the roof may be subtracted from the estimated roof area. This also may be performed in response to a user marking or otherwise identifying such areas on an image or drawing of the building displayed within a graphical user interface of the system. In some embodiments, the entire process of generating an initial estimated floor area is automated by the system recognizing these particular features in one or more images of the building through image analysis that utilizes typical characteristics of such features as viewed from the various angles of those in the one or more images of the building.

At 130, the process generates the estimated floor area measurement based on information received regarding a number of stories or floors of the building. For example, the floor area measurement estimation system may receive information regarding how many stories the building has and regarding one or more sections of the roof below which one or more of the stories extends. The system may then generate the estimated floor area measurement based on a total area of the one or more sections of the roof under which each of the stories extends and based on the generated estimated total roof area of the roof. This total area of the one or more sections of the roof under which each of the stories extends may be calculated using the adjusted roof edge measurements and then adjusted according to various other features of the building indentified in the an image of the building or otherwise received by the system. These various other features of the building indicate one or more sections of the roof below which one or more of the stories extends. Such features identify split level homes, homes with lofts, vaulted ceilings, etc.

In some embodiments, the system may be used to identify the footprint area based on identifying points at the level of the ground around the base of the building. This may be done by using one or more aerial images to select the points at various intervals where the ground meets the structure of the building, for example where the ground comes into contact with the foundation of the building. This method may be used to produce a polygon that is determined by the base of the building. In other embodiments, the points identified at the base of the building may be used to create a three-dimensional model of the building at the ground level, and use this model to estimate the buildings footprint area at ground level. Once this is done, a user may then use different oblique aerial images to determine the number of floors in the building, and therefore determine an accurate area estimate of the building. In some embodiments, this process of creating a three-dimensional building model at ground level, and/or determining the footprint area of the building may be automated using visual analysis or graphics analysis techniques applied to the aerial images.

The system may determine how many stories the building has using a second aerial image of the building representing a view from a different angle than the substantially orthogonal view of the top of the building such that the building height and other features related to how many stories the building has may at least be partially seen. This determination may be performed in response to a user inputting a value representing the number of stories or by the user marking or otherwise identifying such areas corresponding to the different stories on an image or drawing of the building displayed within the graphical user interface of the system. A number of different techniques may be used to identify the stories in a building. For example, a user may looking for eave lines to identify a ceiling of a story, or identifying features such as windows, decks, toward dormers that indicate a floor. In addition, the user may assume a standard room height for each story, for example 8 feet, and working either from the top of the building down, or starting at the base of the building and working up estimate the number of stories. Using multiple techniques may result in a more accurate story estimate.

The shape and perimeter of each building story may be annotated on a drawing or image of the building displayed in the graphical user interface and manipulated by a user of the system collectively and/or individually to make the adjustments described herein. The adjustments will indicate one or more sections of the roof below which one or more of the stories laterally extends. The estimated total floor area of the building is then calculated by adding the areas of each identified floor together to get the total area. The resulting changes in estimated total floor area are generated by the floor area estimation system and displayed on the drawing or image of the building displayed in the graphical user interface.

In some embodiments, the entire process of generating an initial estimated floor area is automated by the system recognizing these particular building features (e.g., building stories, floors, etc.) in one or more images of the building through image analysis that utilizes typical characteristics of such features as viewed from the various angles of those in the one or more images.

Examples of using the estimated floor area of a structure (e.g., a building) and/or the processes and systems to generate estimated floor area described herein include using such estimated floor area, processes and/or systems as part of generating estimates for and/or data for generating estimates or assessments regarding insurance coverage for the structure or real estate including the structure, property risk assessment, and/or construction and repair of the structure. For example these estimates and/or assessments include, but not limited to, estimates and/or assessments regarding: the overall value of a structure; the overall value of real estate including the structure; cost of replacing or repairing the structure; insurance rates or premiums for insuring the structure; determining, predicting and/or calculating costs of replacing or repairing the structure pursuant to processing or paying insurance claims regarding the structure; processing insurance claims regarding the structure; managing risk with respect to the structure becoming or being damaged and/or risk with respect to insuring and/or paying existing or potential insurance claims on the structure; etc.

Figure 1D:
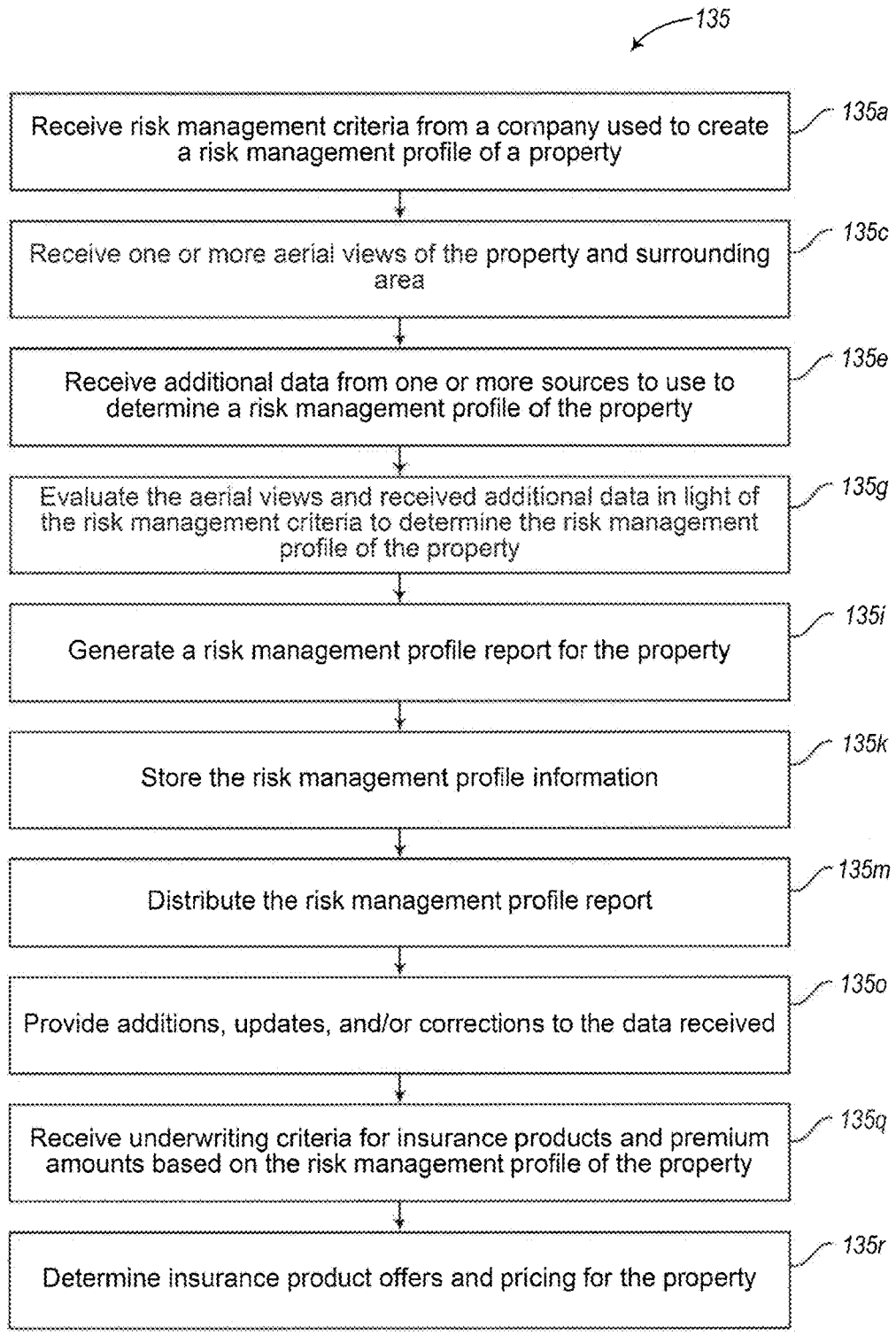
FIG. 1D is a flow diagram showing an example method of generating a risk management report and determining insurance product offers, which in some instances may use the floor area measurements or methods for generating the floor area measurements described herein, according to one non-limiting illustrated embodiment.

For example, FIG. 1D is a flow diagram showing method 135 of generating a risk management report, which in some instances may use the floor area measurements or methods for generating the floor area measurements described herein, according to one non-limiting illustrated embodiment.

While each of the steps shown in FIG. 1D contributes to the overall solution, each can be used independently or in various combinations to also yield improvements in producing a risk management report as discussed below. Below is an overview of each step in the process, which will be followed by a more detailed discussion of each step.

At 135*a*, the process receives risk management criteria from an entity, wherein the risk management criteria are used to create a risk management profile of a particular property. For example, an insurance company may have risk management criteria that it uses to evaluate a property to create a risk management profile of the property. This permits an insurance company to manage the risk with respect to the structure on the property or other features of the property becoming or being damaged and/or risk with respect to insuring and/or paying existing or potential insurance claims on the property. This profile can be used, for example, to determine which insurance products and at what premiums it will offer the owner. The risk management criteria may include but is not limited to conditions of aspects of buildings on the property, density and size of vegetation on the property, property terrain features such as steepness of slope or water features, and nearness to commercial areas or fire stations.

At 135*c*, the process receives one or more aerial views of the property and surrounding area. In some embodiments, these aerial views may include top-down, substantially orthogonal views, or oblique views showing the property and buildings at an angle. In some embodiments these aerial views may be used to evaluate the features and conditions of the property.

In some instances, the resolution of these aerial views, or other images taken of the property, is detailed enough to allow visual analysis of specific features such that a user viewing the image, or a computer based process of analyzing the image, can determine conditions that previously could only be discovered through an on-site visit to the property. For example, differences in shading on a roof may indicate excessive or uneven weathering of the roof that may require earlier repair. Another example is to view the cupping of shingles or evidence of missing shingles that indicate a repair is needed. Differences in the texture roof may also indicate a recent repair or patch that has been done, or that loss or other debris is collecting on the roof. This information will allow a user, for example, to determine whether a roof has not been properly maintained, or is near the end of its life more accurately from these images, resulting in fewer on-site property visits.

These higher resolution images may be acquired from a number of sources, including enhanced satellite images, enhanced images acquired from airplane over-flights, or images acquired from drones.

In addition, multiple images of the property captured at multiple times may also be used to assess condition. For example, a 2002 picture of a garage roof that shows damage may be compared with a 2007 picture of the same roof that shows a tree landed on the same spot as the previous damage. This information would be useful in determining the amount of loss attributable only to the tree damage.

At 135*e*, the process receives additional data from one or more sources. These sources may include, but are not limited to, insurance companies, government entities, contractors, and the like. The sources may also include systems that have generated roof estimations, wall estimations, or floor estimations.

At 135*g*, the process evaluates the received aerial views and received additional data using the risk management criteria to determine the risk management profile of the property. In some embodiments, this evaluation involves a human operator viewing the aerial images and the additional data to answer questions about the property that correspond to risk management criteria used to assess the risk management profile of the property. In this instance, the human operator is in the role of an evaluator who is providing additional information about the property value and the risks involved by viewing one or more aerial images of the property. In other embodiments, these questions may also be asked to property owners, property occupants, and to owners or occupants of surrounding properties. These questions may also be asked to related or concerned parties with respect to the property, for example police, public utility workers, maintenance workers, lenders, previous owners, and the like.

There may be commonly used questions associated with certain risk management criteria that all insurance companies will want answered. For example, these questions may include age of the property, total living area, distance to a fire hydrant, and the like. There will also be questions unique to an individual insurance company that may, for example, use enhanced actuarial models for the property it ensures. In addition, there will be questions asked that are based on the geographic region or location of the property. For example, these questions may include detailed information on the construction and securing of a building roof in areas known for tornadoes, or detailed questions on drainage systems for buildings in areas known for heavy rain or flooding.

In other embodiments, this evaluation involves graphical image processing, data management, and/or statistical methods to answer the questions. For example, where high-resolution imagery described above may not be available for a property, statistical methods applied lower-resolution imagery may be preferable to incurring the cost to send a person on-site. One example of this method includes analyzing multiple lower-resolution images of the same facet of the building taken at the same time but at different angles for texturing differences that may reveal more information than either image would alone.

Statistical methods may be used on images captured outside the visible spectrum. For example, using ultraviolet images of a building may reveal how worn a roof is depending on the roof's ultraviolet reflective properties. Similarly, statistical analysis on infrared images may be used to detect water damage, or areas of a roof with higher water content in the materials based on different rates of absorption of infrared by water. Also, infrared images may be used to create heat-loss profiles for a neighborhood, allowing comparisons among the buildings that may indicate the beginning of a roof failure.

Other statistical methods may be used to understand the condition of a property include the age of the home, the age of the neighborhood, whether the home is used as a rental, and other factors to estimate property condition. At 135*i*, the process generates a risk management profile report for the property based on the evaluation completed in the previous step.

At 135*k*, the process stores the risk management profile information. In some embodiments, this information is stored along with profiles of other properties to be used for various purposes such as property risk history.

At 135*m*, the process distributes the risk management profile report. In some embodiments, the report is sent to the insurance company, the insurance agent, the property owner, or other entity that uses the risk profile to make decisions concerning the property.

At 135o, the process provides additions, updates, and/or corrections to the data received. In some embodiments, the evaluation process which uses property data from many sources may uncover errors or other problems which the source of the data may wish to know about and correct. For example, a building's total living area as determined by an operator using current aerial views may not match the total living area documented in county tax records. In one embodiment, the process will allow data that is collected and verified for a risk management profile to be shared with a government agency. In this way the government agency, for example the county in which the property resides, can maintain current records for the property data it uses for its operations. For example, whether the current building area is correct, whether there is a change in the use of land which may be indicated by clearing a forest, erecting outbuildings, paving the lot, and the like. The county may wish to update their records in order to determine a fair tax valuation for the property, or adjust services to the property such as waste disposal. In some embodiments, discrepancies discovered in data that exceed a tolerance threshold may generate an automatic notification to the government. In another embodiment, the data may be directly updated by the process by sending the data directly to government databases, either county or state.

In other embodiments, this data may be shared directly with one or more insurance companies, either by notifying the company that their data is out of date, or by directly updating the insurance company's database. The insurance company will use changes in the data to determine whether changes in features and conditions of the property are significant enough to require reevaluation of other insurance products associated with the property, At 135q, the process receives underwriting criteria from insurance companies that describes the insurance products and premium amounts the company offers based on the features and risk management profile of a property. In one embodiment, the criteria determines the features or combination of features on the property that will cause it to the insurable, and provides the formulas that use the conditions of features on the property to determine insurance premium cost.

The risk management profile of the property is determined by combining the results of the questions asked, the data analyzed and the statistical methods used. If the risk management profile can be determined remotely with a high degree of accuracy, it may not be necessary to incur the cost of sending an agent or inspector for an on-site property visit.

The principle determiner for the premium amount charged for an insurance policy on a structure is the structure's replacement cost. If the estimate of replacement cost is based on inaccurate data, the customer may not be offered sufficient coverage for the structure. In result of a total loss, the insurance payments will not be sufficient to rebuild the structure, which will result in a highly dissatisfied customer. On the other hand, the customer will be dissatisfied if replacement cost is overestimated, resulting in higher premiums than the customer could have paid. At 135r, the process determines the insurance products to offer and the pricing of the products for the property. In one embodiment, certain features and conditions of the property will be associated with certain insurance products. For example, if a residential property also has one or more commercial buildings on it, than a commercial insurance product may be appropriate. In another example, if the residential property has an RV parked in the yard, offering an auto insurance product that covers the RV may be appropriate. In another embodiment, criteria involving conditions of features on the property may determine the premium amounts offered for a particular policy. For example, if the condition of the roof of a residential building appears excessively worn or damaged, the premiums for ensuring that building will be higher than if the roof was not damaged.

Figure 1E:
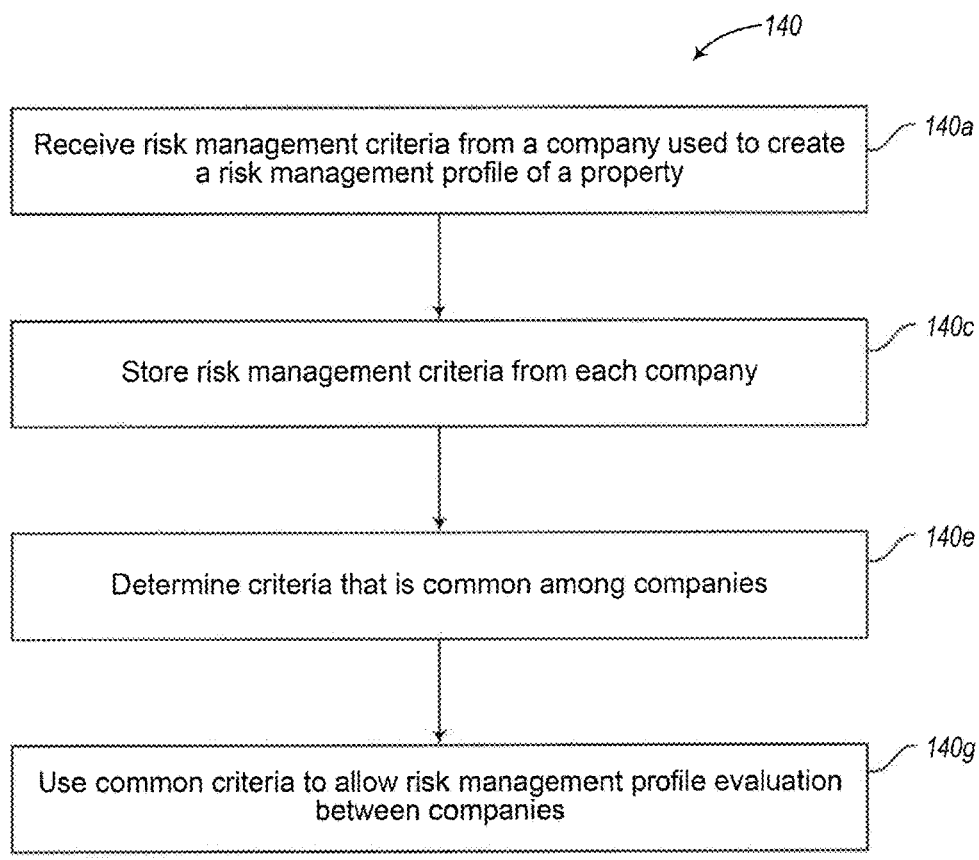
FIG. 1E is a flow diagram showing a method that may be included as a part of the receive risk management criteria step of the method shown in FIG. 1D, according to one non-limiting illustrated embodiment.

FIG. 1E is a flow diagram showing an example method 140 of receiving risk management criteria used to create a risk management profile of a property step of the method shown in FIG. 1D, according to one non-limiting illustrated embodiment. While each of the steps shown in FIG. 1E contributes to the overall solution, each can be used independently or in various combinations to yield improvements in receiving risk management criteria from an entity as discussed below.

At 140a, the process receives risk management criteria from an entity used to create a risk management profile of a property. In one embodiment, the criteria are used to evaluate features of the property to create a risk management profile of the property. Features of the property may include but are not limited to buildings, vegetation, terrain, distance to water, distance to commercial areas, and distance to a fire station. Features of a building may include but are not limited to year built, number of stories, style of roof, floor area, and number of windows. In addition, the criteria may also describe various conditions of the features of a property. In one or more embodiments, the criteria may be received as a data file that may be imported into an evaluation system.

At 140c, the process stores the risk management criteria received from each company. In one embodiment, the criteria from each company are stored in a database and used during the evaluation process, described below, when the property risk assessment profile is being created.

At 140e, the process determines the criteria elements that are common among companies. In one embodiment, elements are reviewed by an operator to determine the common elements. In another embodiment elements are compared electronically.

At 140g, the process uses the common criteria elements to allow risk management profile evaluation comparison among companies. In one embodiment, this allows the evaluation process, described below, to efficiently produce risk management profile reports for a number of insurance companies.

Figure 1F:
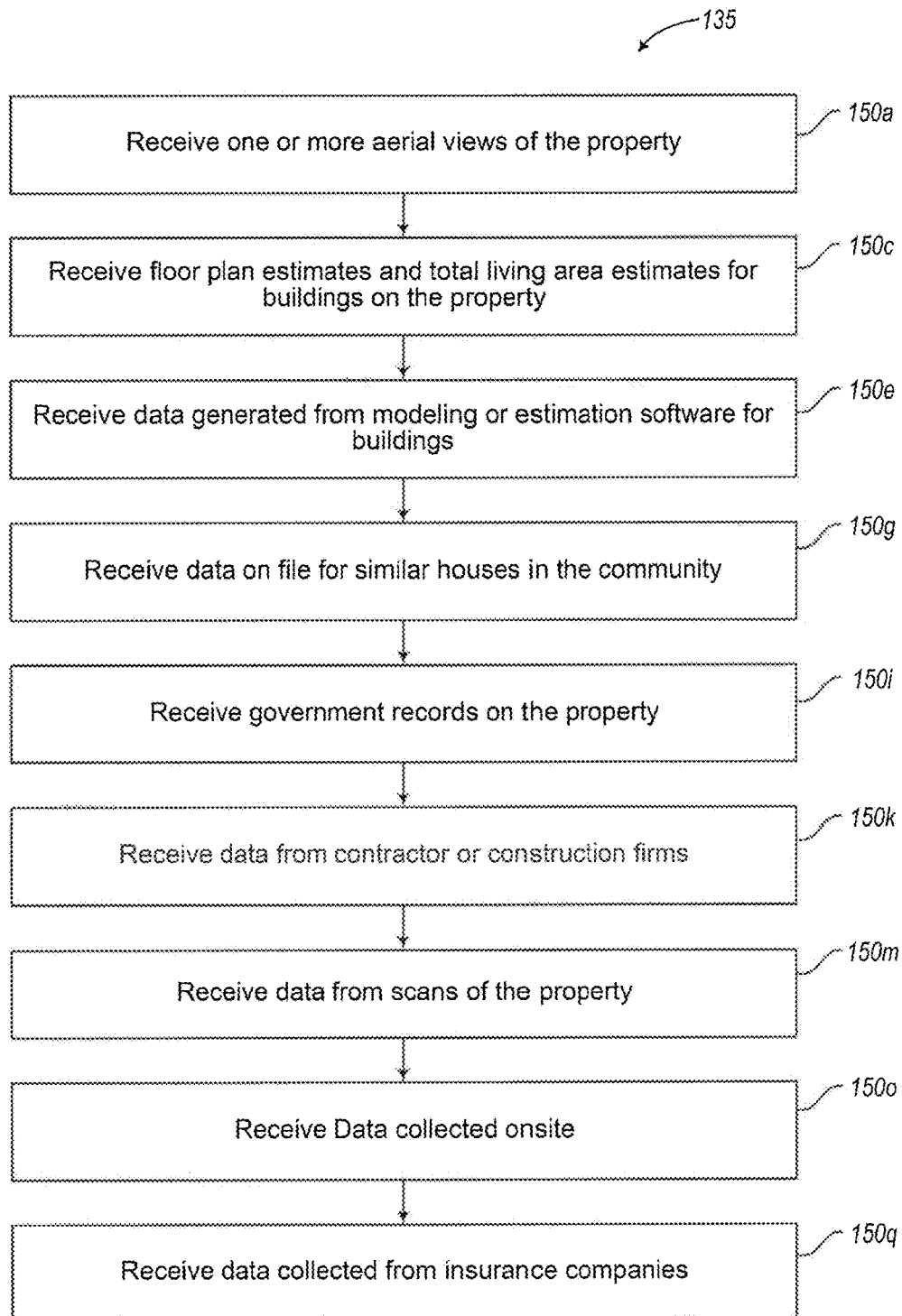
FIG. 1F is a flow diagram showing a method that may be included as a part of the receive additional data from one or more sources step of the method shown in FIG. 1D, according to one non-limiting illustrated embodiment.

FIG. 1F is a flow diagram showing an example method 150 of receiving additional data from one or more sources to used to determine a risk management profile step of the method shown in FIG. 1D, according to one non-limiting illustrated embodiment. While each of the steps shown in FIG. 1F contributes to the overall solution, each can be used independently or in various combinations to yield improvements in receiving additional data from one or more sources as discussed below.

At 150a, the process receives one or more aerial views of the property. In one or more embodiments, these aerial views may include a top-down, or substantially orthogonal view of the property, and/or oblique views of the property taken at angles from different directions. For example, an oblique aerial view of the property may be taken at a 45° angle from the north, and another taken at a 50° angle from the west. In one embodiment, these aerial views are provided in a digital format.

At 150c, the process receives floorplan estimates and total living area estimates for buildings on the property. In one embodiment, these estimates are received from the roof estimation system or a floor area measurement system described herein. In another embodiment the estimates may come from county records.

At 150e, the process receives data generated from modeling or estimation software for buildings. In one or more embodiments, this data may be generated by a roof estimation systems, wall estimation systems, 3D modeling systems, CAD systems, or the like.

At 150g, the process receives data on file for similar houses in the community. In one or more embodiments, this data may include the date the neighborhood was developed, the average age of houses, typical improvements done to property, and the like.

At 150i, the process receives government records on the property. In one or more embodiments, these records may include but are not limited to information received from county or city building departments, which include building plans, building permit information, as-built information and the like. The records may also include government tax records that include estimated total living area of buildings on the property. One embodiment therefore provides for the aggregating of city and county property records, deeds, tax assessments, with insurance company information, together with a series of photographic images of the home taken at distinct times from a plane or satellite.

At 150K, the process receives data from contractor or construction firms. In one or more embodiments, this may include but is not limited to blueprints, as-built information, landscape elevations, and repair information.

At 150m, the process receives data from scans of the property. In one or more embodiments, these scans may include but are not limited to infrared scans, thermal imaging scans, and the like.

At 150o, the process receives property data collected on-site. In one or more embodiments, this data includes but is not limited to visual information on property features, for example external and internal property features of buildings. Examples of external features are the condition of walls, roofs, chimneys, skylights, porches, patio, decks, garages, and other exterior features. Example of internal features are the conditions of walls, ceilings, floors, carpeting, windows, fixtures, skylights, and other interior features.

Conditions of other property features may include but are not limited to terrain, vegetation, water hazards, trampolines, hot tubs, swimming pools, outbuildings, automobiles, or other outside features relevant to determine a risk management profile. Of particular interest will be above ground swimming pools. In some instances, these may hold a great deal of water, for example a pool of about 4'-5' high and 12'-15' in diameter holds many thousands of gallons. Such a pool not only increases the risk of personal injury to those who live on and visit a property, but also increase the risk of flood damage to the home owner and close neighbors. The photographic images will show, for example, if a home owner has placed a large above ground pool very close to his home or immediately adjacent his property line and close to a neighbor's home. If, at some later time, the pool were to leak or burst, such a placement may cause significant property damage to the owner's home by flooding basement, washing out a foundation or the like. It may also present a risk to a neighbor's home for the same reason. This is just one example of risk management factors that could be taken into account by an insurance carrier in setting a premium or deciding whether to agree to insure the property.

In some embodiments, this visual information may be captured using an image or video recording device by the property owner or one or more other individuals evaluating the property. In some embodiments, the data collected may include but is not limited to interviews with property owners, tenants, or one or more neighbors.

In other embodiments, data collected may include data from chemical samples, odor detectors, radiation detectors, radon detectors, moisture detectors, RFI detectors and the like.

In one or more embodiments, additional data required during the evaluation process, described below, may be requested from one or more individuals who are evaluating the property.

At 150q, the process receives data collected from insurance companies. In one or more embodiments, this data may include but is not limited to existing photographs of the property, descriptions and measurements of features on the property, insurance claims history of the property and the like. In addition this data may include insurance data available for buildings or property near the property being evaluated. A preferred source of data are aerial images taken by planes and satellites at distinct time intervals over a period of time.

Figure 1G:
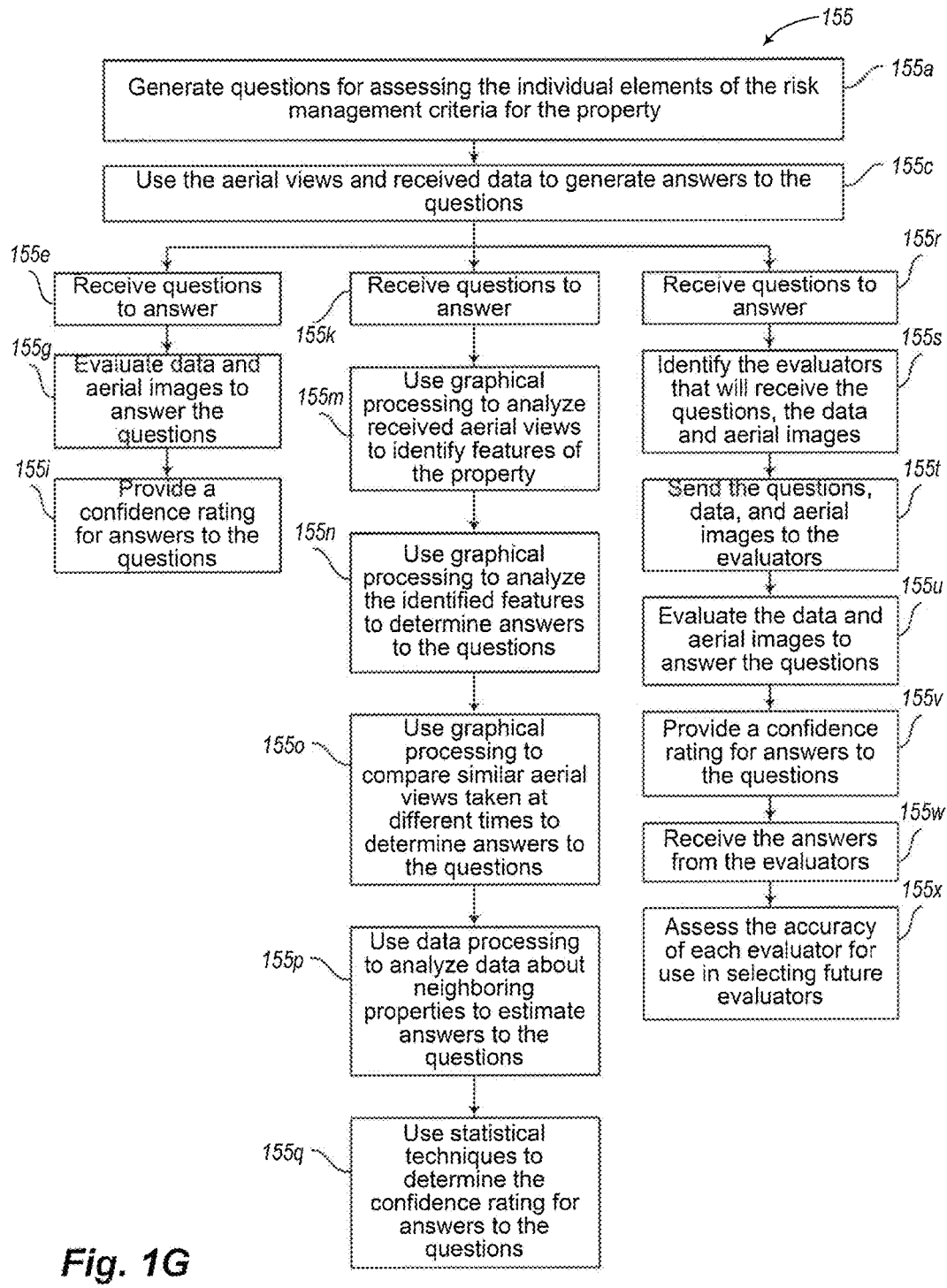
FIG. 1G is a flow diagram showing a method that may be included as a part of the evaluate the aerial views and received additional data in light of the risk management criteria step of the method shown in FIG. 1D, according to one non-limiting illustrated embodiment.

FIG. 1G is a flow diagram showing a method 155 that may be included as a part of the evaluate the aerial views and received data in light of risk management criteria step of the method shown in FIG. 1D, according to one non-limiting illustrated embodiment. While each of the steps shown in FIG. 1G contributes to the overall solution, each can be used independently or in various combinations to yield improvements in evaluating the aerial views and received data as discussed below.

At 155a, the process generates questions for assessing the individual elements of the risk management criteria for the property. In one embodiment, a question is created for each criteria element. For example, if an element is the age of a building, a generated question may be "what year was the building built?" If an element is an above ground pool, this could be asked, if the answer is yes, then more questions can be generated about its location, size and other issues.

At 155c, the process uses the aerial views and received data to provide answers to the generated questions. In one or more embodiments, the answers to the questions may be but are not limited to being provided by an operator at a workstation viewing the images and the data, an automated system analyzing the aerial views and received data, and one or more individuals viewing the aerial views and receive data according to a crowd sourcing model.

At 155e, the process receives questions to answer. In one non-limiting embodiment, an individual at a workstation is viewing the aerial images and the received data. However, in some embodiments, this process may be automated.

At 155g, the process evaluates data and aerial images to answer the received questions. In this embodiment, an operator at a workstation is viewing the aerial images, the received data and the received questions, and is answering the questions based on the operator's evaluation of the images and data.

At 155i, the process provides a confidence rating for answers to the questions. In one embodiment, the operator enters a confidence rating for each individual question answered. In another embodiment, the operator enters an overall confidence rating once all questions are answered.

At 155k, the process receives questions to answer. In one non-limiting embodiment, the aerial images and received data are analyzed by an automated system to determine the answers.

At 155m, the process uses graphical processing to analyze received aerial views to identify features of the property. In one non-limiting embodiment, a feature of the property may be a building, terrain, water feature, vegetation, or other characteristic of the property relevant to a risk management assessment.

At 155n, the process uses visual recognition, graphical analysis, and the like to identify features and conditions of the property to determine answers to the questions. For example, to identify roof wear or prior patch made to the roof by analyzing the pattern or color differences identified on the roof or to identify the condition of the skylight or window by using optical density analysis. In another example, to use visual analysis to determine the distance to the nearest water feature or to determine the style of a building, or to identify if a trampoline or swimming pool is located on the property.

At 155o, the process uses graphical processing to compare similar aerial views of the property taken at different times to determine answers to the questions. Examples include but are not limited to identifying the rate of deterioration of an outbuilding roof, the rate of growth of vegetation, whether any structures have been newly built or modified, whether damage to a structure has been sustained but unrepaired over time such as hailstorm damage, and the like.

At 155p, the process uses data processing to analyze data about neighboring properties to estimate answers to the questions. Examples include but are not limited to the age of surrounding buildings, the age of the neighborhood, the condition of surrounding property, and the like.

At 155q, the process uses statistical techniques to determine the confidence rating for answers to the questions. These techniques include but are not limited to analyzing the resolution of aerial views, any obstruction by trees of views to the buildings, age of data received indicating it may be out of date, and the like.

At 155r, the process receives questions to answer. In one non-limiting embodiment, the evaluation is performed using a crowd sourcing model, in which, for example a number of individuals view the aerial views and additional data, and answer the questions. The questions the evaluators would be asked will give significant information that affect the valuation of the property, the risk of loss and cost to replace certain structures. The evaluator may be asked to consider such as issues as the upkeep of the yard, whether they are one or more abandoned vehicles on the property, the presence of any pets, such as dogs or cats and other issues that may drastically affect the property value. In one embodiment, the evaluators would be provided access to images of the property over a range of time.

In one embodiment, the evaluator they would able to view current pictures of the property, pictures from 2-3 years prior, then 4-5 years prior, then 6-8 years prior, etc. The evaluators who are part of the crowd sourcing would be able to view the property modifications over time to inform them of the quality of their evaluations. For example, the evaluator would be able to obtain data regarding when the current owner bought the property, which would be supplied from the system that obtained the data from county and state property ownership records. The evaluator would then request images having dates from prior to the current owner and then after the current owner. The evaluator would review whether the condition of the property had improved significantly under the current owner or deteriorated under the current owner. For example, the evaluator might notice that a new fence has been built and that the yard is being well maintained. He may also notice a number of other features which indicate that the owner has kept the property in good condition and improved it significantly. He might also notice that a new tool shed has been built and other improvements made that are not reported on the county or state property records. He may notice that new siding was recently added and new storm proof, double pane windows installed. These would be significant factors to increase the quality of the property and its value, many of which would not be reported, or even obtainable by other methods.

The evaluator may be asked to look for such factors as the installation of burglar alarms, security lights, a sidewalk installed by the city, the addition of city lights near the home, and other factors will affect the risk of a claim on the property which would not show up on normal property report.

Similarly, the reviewer may notice that shortly after the current owner bought the property that a dog house was added in the back yard. He may also notice that the yard is being torn up, with because it is not maintained or a pet is destroying some of the landscape. In addition, the evaluator may be asked to look for the addition of a swimming pool. Recently, above ground pools have become quite popular and are often added, but these are not reported on property records of building permits, yet they present a significant increase in the risk of death or serious injury to a child. The evaluator will be able to look at pictures spaced every few years to compare the changes in the state of the property. This will give the evaluator addition data and information to make an informed evaluation about the current state of the home and whether it is improving or decreasing.

One series of questions the evaluator might be asked will directed to determining the honesty of the property owner regarding reports about his own property, which will be significant benefit to the insurance company that is doing the risk assessment. For example, the evaluator may obtain property specific data that has been supplied by the property owner that states whether a pool is present on the property, if a new fence has been built, if there is a security system that has been recently installed, if there are abandoned vehicles on the property and the like. The evaluator will then be asked the same questions about the property for which the owner has provided information. If the owner reported that there was no pool on the property and pictures show that shortly after he bought the property, he installed a pool and it has been there for few years, this will provide information about the integrity of the owner. Similar data can be checked to determine whether the photographs of the property match statements the owner has made about the property, which can used to evaluate the risk to the insurance company.

By the technique of viewing images of the property that span multiple years, the evaluator will be given questions to answer that will provide insights as to the risk to an insurance company to insure the property and also the true value of the property. Some factors, such as installing new windows, a new fence, new siding and maintaining the yard will indicate that the risk of certain types of claims is low and therefore the insurance company can better evaluate the premium to be charged and the value of the home. Other factors will indicate that the current occupant is a high risk or that the property is not well maintained and thus the insurance company may increase the premium. At 155s, the process identifies the evaluators that will receive the questions, the additional data, and aerial images, referred to an evaluator information packet. In one or more embodiments the evaluators may be but are not limited to the general public, volunteers, paid contractors, the property owner, property tenants, neighbors of the property, and the like.

At 155*t*, the process sends the questions, data, and aerial images to the evaluators. In one or more non-limiting embodiments, this may be done electronically via email, a Smartphone application, on paper, or the like.

At 155*u*, the process evaluates the data and aerial images to answer the questions. In one or more non-limiting embodiments, this may be done by an individual operator at a workstation, by an automated process, using crowd sourcing, or by a combination of each.

In a preferred embodiment for crowd sourcing, the process sends the evaluator information packet to the evaluators along with a deadline date for completing the property evaluation. Other people, master reviewers would review and evaluate the evaluators work, and make comments on the original evaluation, along with comments on the evaluators. These comments would be made public, which in one or more embodiments may refer to the pool of evaluators, a group of people interested in the result of the evaluation, the public at large, or some other group. The original evaluation and the assessment of the evaluation by the master reviewers would then be reviewed to determine whether the evaluation should be accepted as is or if the original evaluation should be modified. The master reviewer would be able to edit the evaluation by the evaluators. He would also have data to be able to determine whether the evaluator has an unacceptable bias and thus his comments should be edited or eliminated. Some of the basis by which the master reviewer would be able to evaluate the quality of the evaluators report are described below.

Once completed, after the master reviewer has completed his review and modification of the work of the evaluators and the crowd sourcing, the evaluation could be made public or provided on a private basis to insurance companies. In some embodiments, a master reviewer does not modify or even view the report and this step is omitted, but it is preferred in most embodiments.

In one embodiment, the property information provided to the evaluators should not contain any geographically identifiable information or other information that may be used to identify the individuals living in the building being evaluated. Thus, the evaluation is done unbiased since the evaluator can view details about the property, but does not know its physical location.

In one alternative, evaluators would be in the same geographic area as the property they are evaluating. According to one embodiment, the third party might, in some cases be selected based on living close to the same address as the property to be evaluated. The evaluation therefore might be done by a neighbor who lives across the street, on the same block or in the same general area. While such evaluations have data to be more accurate, there is significant risk of bias, either favorable or unfavorable to the property owner. Whether the evaluator had personal knowledge of the property on the owner being evaluated will be data that is given to the master reviewer. He will therefore take this into account whether to weight the evaluators report with a high confidence rating or a low confidence rating or ignore it completely.

At 155*v*, the process provides a confidence rating for answers to the questions. In one or more embodiments, the operator may enter either a confidence rating for each individual question answered, or an overall confidence rating once all questions are answered. Or, if using an automated process, statistical techniques may be used to determine the confidence rating.

At 155*w*, the process receives the answers from the evaluators. In one or more non-limiting embodiments, this may be done electronically, via email, a Smartphone application, on paper, or the like.

At 155*x*, the process assesses the accuracy of each evaluator for use in selecting future evaluators. In one or more embodiments, the assessment may take the form of, but not limited to, several techniques. In one non-limiting example, statistical techniques may be used to generate the most likely correct answer for each question answered by the evaluator and compare that answer to the evaluator's answer. In another non-limiting example, individuals may review the evaluations done by each evaluator and vote on the accuracy of the each evaluation.

Figure 1H:
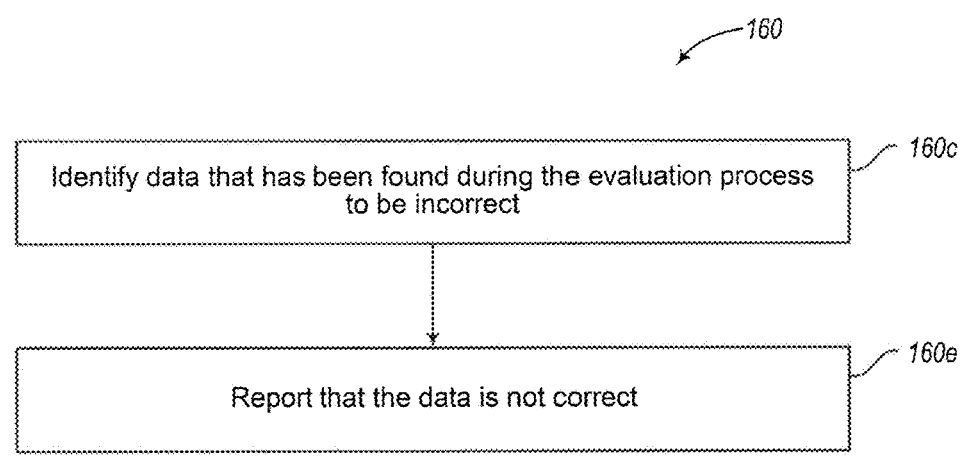
FIG. 1H is a flow diagram showing a method that may be included as a part of the provide additions, updates, and/or corrections to the data step of the method shown in FIG. 1D, according to one non-limiting illustrated embodiment.

FIG. 1H is a flow diagram showing a method 160 that may be included as part of providing additions, updates, and/or corrections to the data received step of the method shown in FIG. 1D, according to one non-limiting illustrated embodiment. While each of the steps shown in FIG. 1H contributes to the overall solution, each can be used independently or in various combinations to yield improvements in providing additions, updates, and/or corrections to the data received as discussed below.

At 160*c*, the process identifies data that has been found during the evaluation process to be incorrect. In one or more embodiments, examples of this data include but are not limited to images that are out of date, area estimates of buildings that are incorrect, number of listed outbuildings that is not correct, and the like. In one or more embodiments, the term "correct" may include a deviation within a certain tolerance level.

At 160*e*, the process reports to the source of the data that the data is not correct. In one or more embodiments, this may include but is not limited to notifying the source of the data (e.g. an insurance company) that the data is not correct, sending the source the correct data, updating the source with the correct data, and the like.

Figure 1I:
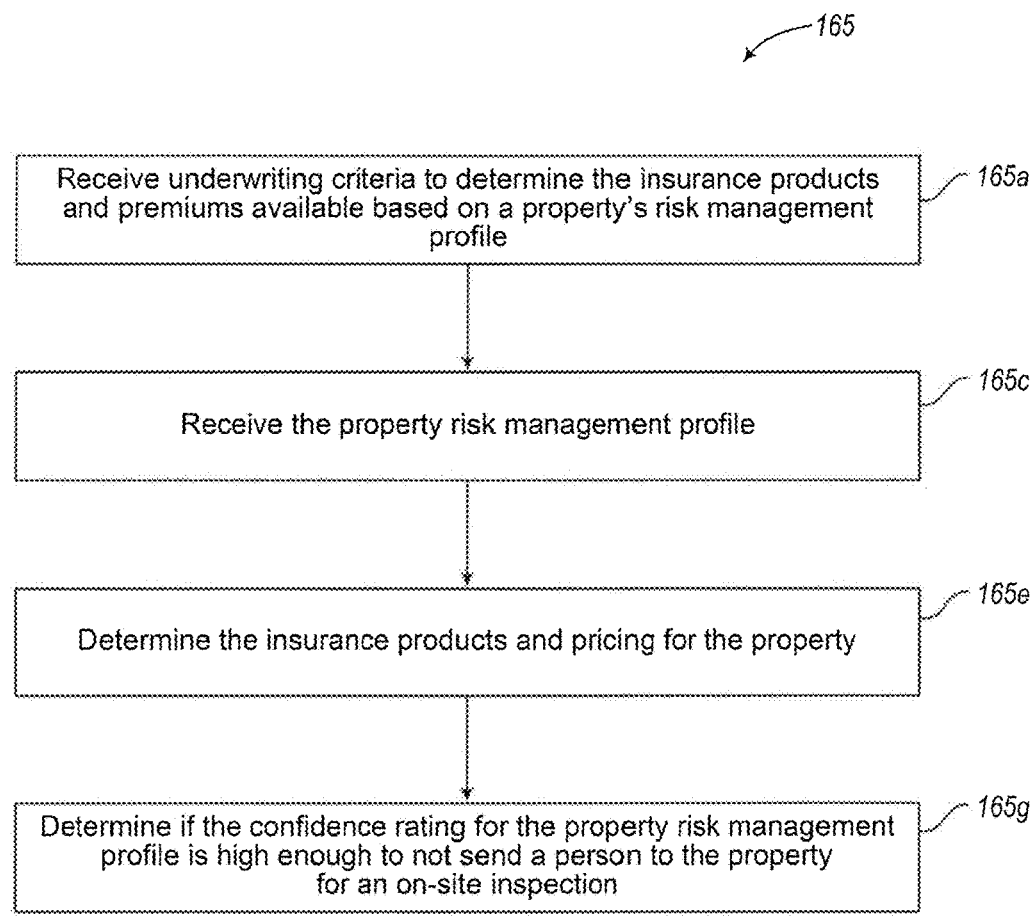
FIG. 1I is a flow diagram showing a method that may be included as a part of the receive underwriting criteria step of the method shown in FIG. 1D, according to one non-limiting illustrated embodiment.

FIG. 1I is a flow diagram showing a method 165 that may be included as part of the receiving underwriting criteria for insurance product offers and pricing for the property step of the method shown in FIG. 1D, according to one non-limiting illustrated embodiment. While each of the steps shown in FIG. 1I contributes to the overall solution, each can be used independently or in various combinations to yield improvements in estimating floor area measurements as discussed below.

At 165*a*, the process receives underwriting criteria to determine the insurance products and premiums available based on a property's risk assessment profile. Examples of this underwriting criteria include but are not limited to a list of the features of a property that corresponds to a particular insurance products offered by the company and the various conditions of the features of the property that affect premium cost of each insurance product.

At 165*c*, the process receives the property risk management profile. In one non-limiting embodiment, the property risk management profile is retrieved from a database containing property risk management profiles.

At 165*e*, the process determines the insurance products and pricing for the property. In one non-limiting embodiment, the process compares the features and conditions of the property found in the property risk management profile to the received underwriting criteria to determine what insurance products are available for the property and the premium cost of each insurance product.

At 165*g*, the process determines if the confidence rating for the property risk management profile is high enough to not send a person to the property for an on-site inspection. In one non-limiting embodiment, the confidence rating that is part of the properties risk management profile is compared with other factors including but not limited to the features of the property, the condition of the features of the property, the dollar cost of the insurance products being quoted, cost to send someone for an on-site inspection, and the like. A company may, based on the comparison, either choose to not send a person on-site and instead make the decision to issue the policy based solely on the analysis of remotely-gathered information in a process known as "desk underwriting" insurance products.

Figure 2:
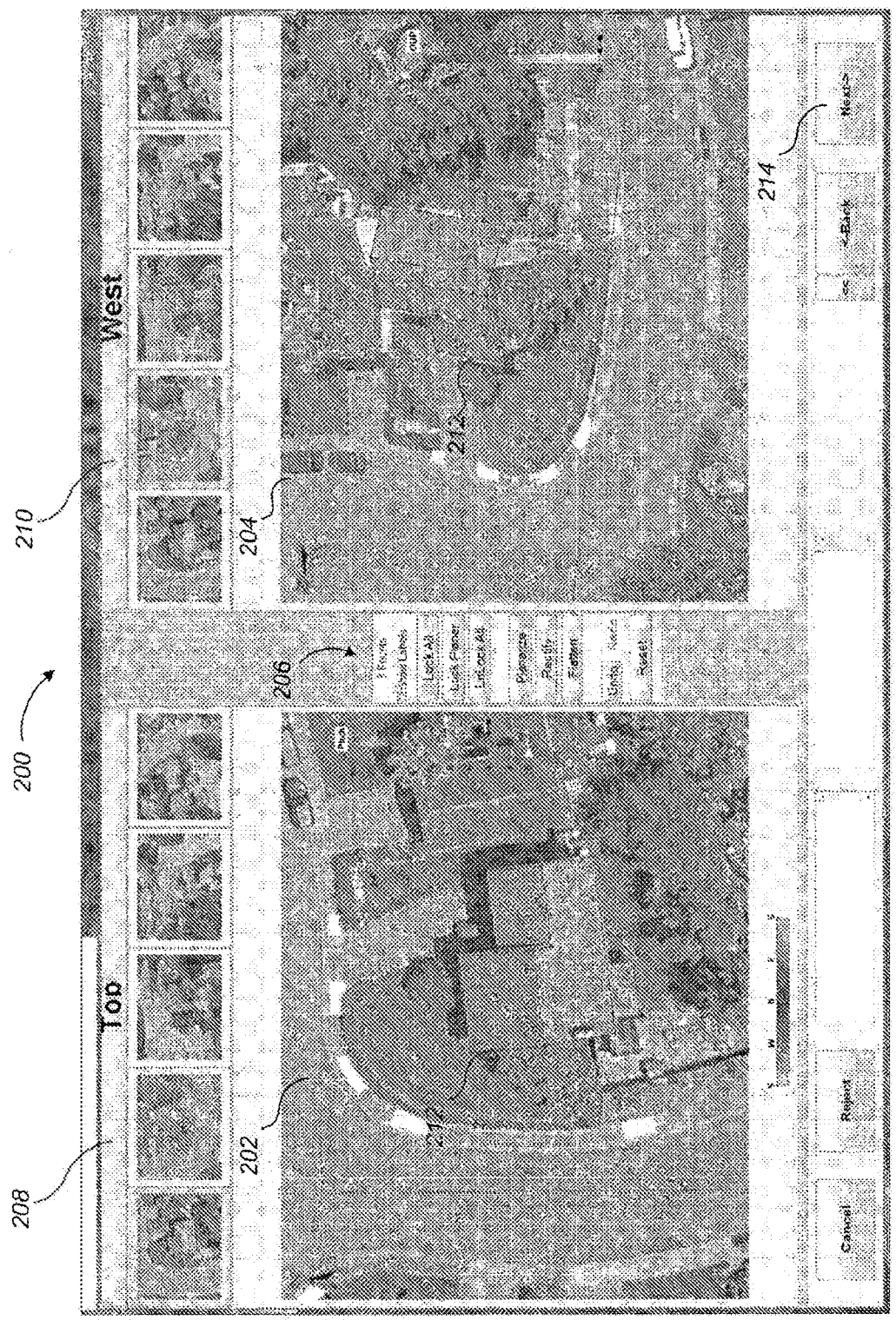
FIG. 2 is an example screenshot of a user interface of a system for generating floor area measurements, which may be used independently of, as part of, or integrated with the systems and methods for generating a risk management report described herein, showing roof sections annotated on an aerial image of the roof, according to one non-limiting illustrated embodiment.

FIG. 2 is an example screenshot of a user interface of a system for generating floor area measurements with roof sections annotated on an aerial image of the roof, according to one non-limiting illustrated embodiment. For example, the screenshots of FIGS. 2-8 are screenshots of the graphical user interface of the floor area measurement system which performs the processes described in FIGS. 1A-1C above.

Shown is a graphical user interface including two panels, one with an image of a building showing a top substantially orthogonal view 202 of the building and the other with an image of the building showing a top oblique view 204 of the same building. Also shown is an annotation 212, which is a line drawing of a three dimensional model of the roof. The annotation 212 is an adjustable graphical user interface element overlaid on the roof of the building in each image corresponding to the angle of view 202 and view 204 of the roof in each image. The annotation 212 also shows various planar sections of the roof as delineated by the roof features and roof lines, such as the ridge line, valley lines and roof eaves, etc. This annotation 212 is an interactive graphical user interface feature and may be manipulated by a user of the system to make various adjustments to roof features and characteristics for the purpose of generating roof measurements, such as those used in the processes shown in FIGS. 1A-1C and other embodiment described herein. These may be performed by user interaction with the annotation itself and/or various selectable controls 206.

Also shown are image selection bars 208 and 210 which display thumbnail or reduced-size images of various other images showing the building from other perspectives and view angles. Selection bar 208 is located above view 202. When a particular thumbnail image in selection bar 208 is selected, the image showing the current view 202 is replaced with that of the selected image. Similarly, selection bar 210 is located above view 204. When a particular thumbnail image in selection bar 210 is selected, the image showing the current view 204 is replaced with that of the selected image.

Figure 3:
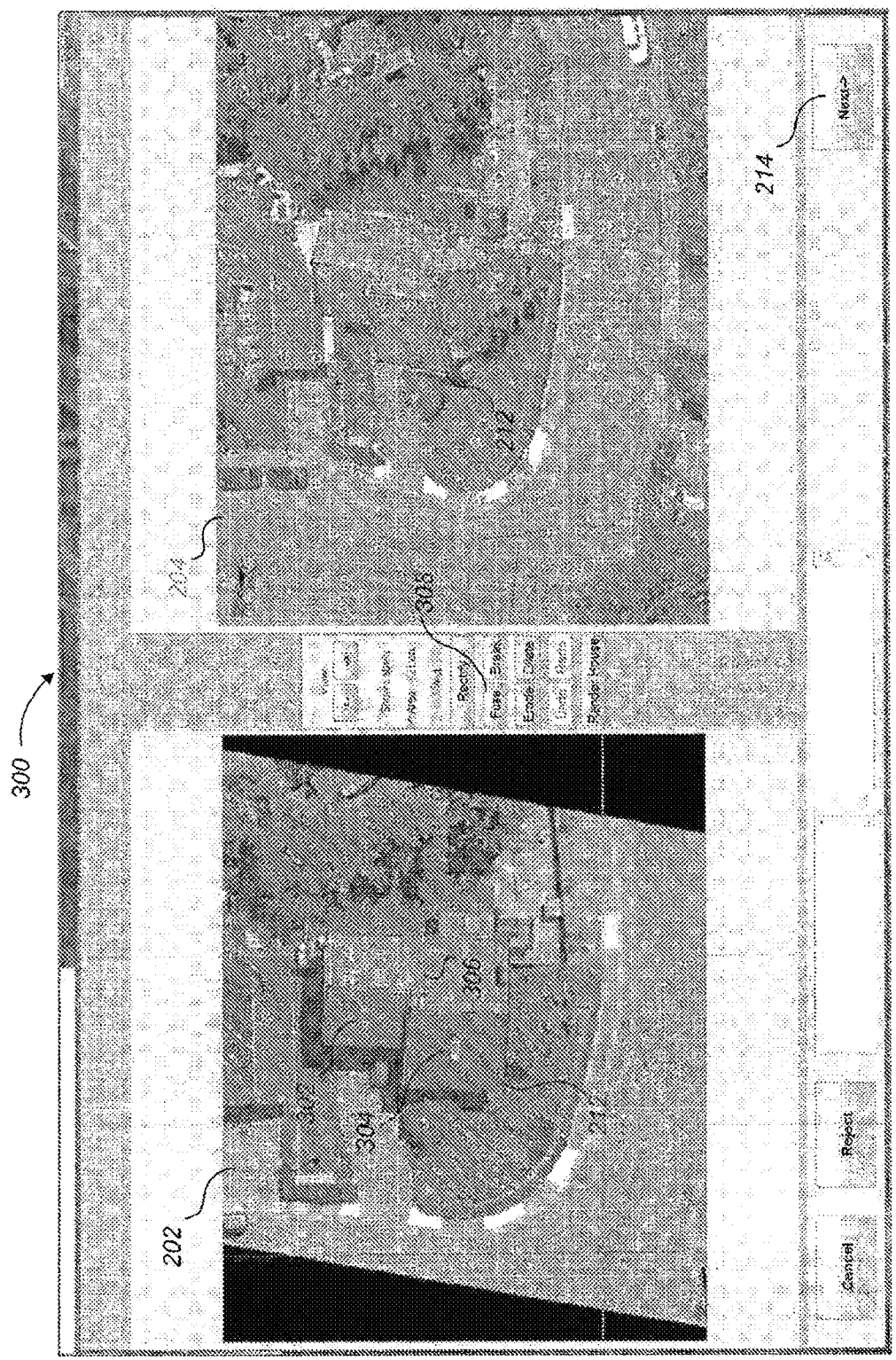
FIG. 3 is an example screenshot of a user interface of the system of FIG. 2 for generating floor area measurements with area measurements of roof sections annotated on an aerial image of the roof, according to one non-limiting illustrated embodiment.

FIG. 3 is an example screenshot 300 of a user interface of the system of FIG. 2 for generating floor area measurements with area measurements 302, 304 and 306 of roof sections annotated on an aerial image of the roof, according to one non-limiting illustrated embodiment. For example, when the user selects the "next button" 214 shown in FIG. 2, the floor area measurement estimation system calculates the areas 302, 304 and 306 of each roof section according to the roof annotation 212, as adjusted by the user, and displays these area values 302, 304 and 306 on the corresponding sections of the roof in the displayed image. Also shown is a "Fuse" button 308, the selection of which causes results to be displayed as shown in FIG. 4.

Figure 4:
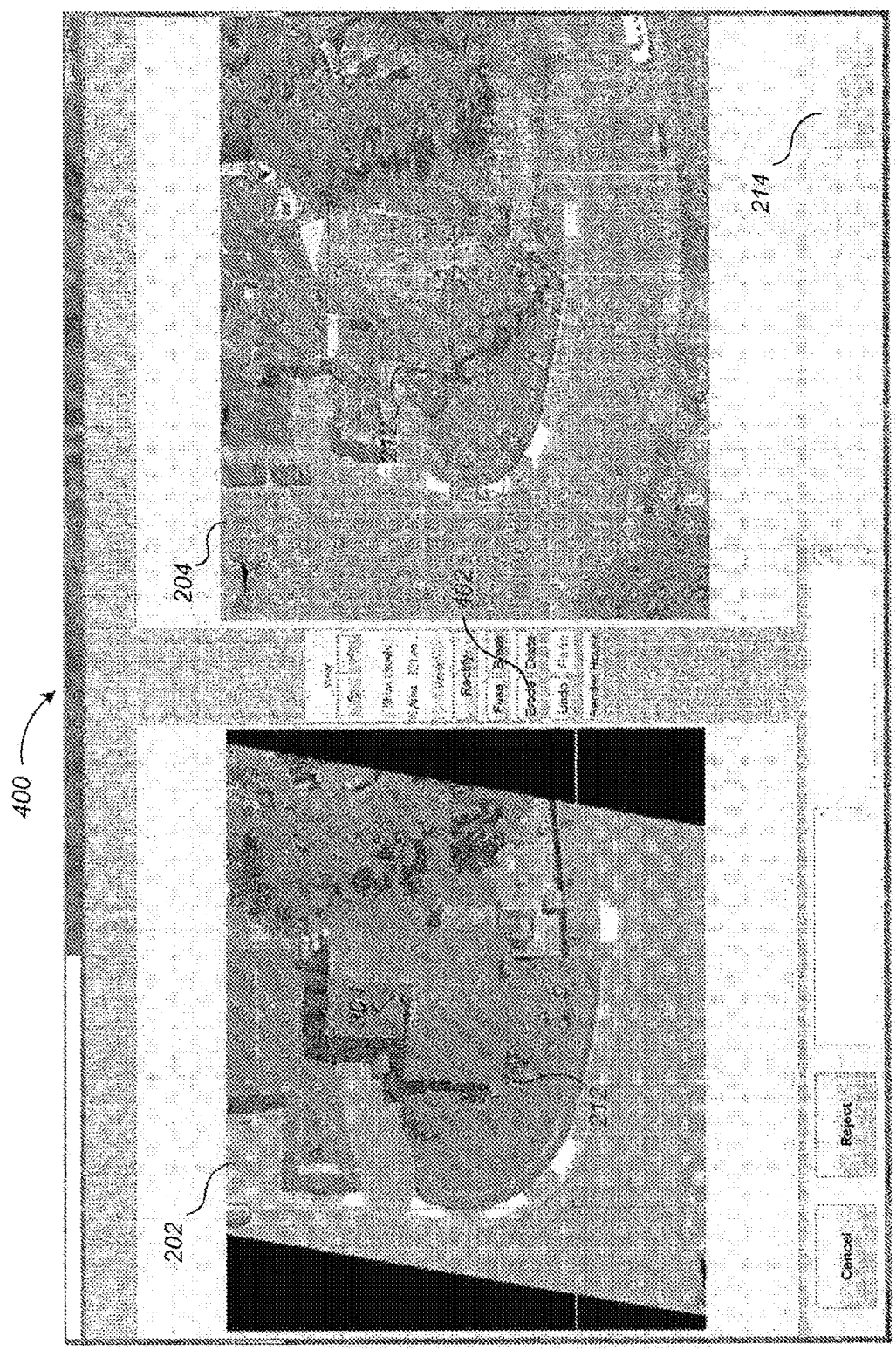
FIG. 4 is an example screenshot of a user interface of the system of FIG. 2 for generating floor area measurements showing the roof annotated with an estimated total roof area on which to base an estimated floor area measurement, such as that estimated in the method of FIGS. 1A-1C, according to one non-limiting illustrated embodiment.

FIG. 4 is an example screenshot 400 of a user interface of the system of FIG. 2 for generating floor area measurements showing the roof annotated with an estimated total roof area 402 on which to base an estimated floor area measurement, such as that estimated in the method of FIGS. 1A-1C, according to one non-limiting illustrated embodiment. For example, when the user selects the "Fuse" button 308 shown in FIG. 3, the floor area measurement estimation system may perform the acts 112 and 114 of the process shown in FIG. 1B to calculate an estimated total roof area of the roof by setting each section of the roof to a zero slope.

In this embodiment, the floor area measurement estimation system generates an adjusted roof model by adjusting the slope to substantially zero of the planar roof sections having areas 302, 304 and 306 shown in FIG. 3 in the three dimensional model of the roof represented by annotation 212. This may be performed in a variety of manners, including, for example, by removing particular roof features from the model represented by annotation 212 in FIG. 3 that would not be present in a flat roof with no slope. This could be considered "fusing" individual planar roof sections in the model into one flat roof section, such as by removing ridge lines or other features distinguishing individual planar roof sections instead of, or in addition to, adjusting a slope parameter or variable within the model to zero. This process results in the adjusted annotation 212 displayed by the system as shown in FIG. 4 without lines indicating roof features such as ridge lines associated the pitched roof. Thus, the system generates and provides roof edge measurements using the roof model as if the entire roof was flat with no slope, as shown by the annotation 212 representing the roof model in FIG. 4.

Although the screenshot of the graphical user interface 300 shows both the orthogonal view 202 and oblique view 204, in other embodiments, this action may be performed with just one initial aerial image of the building using and/or showing only the substantially orthogonal view 202 of the building since roof pitch need not be determined and can be assumed to be zero.

Figure 5:
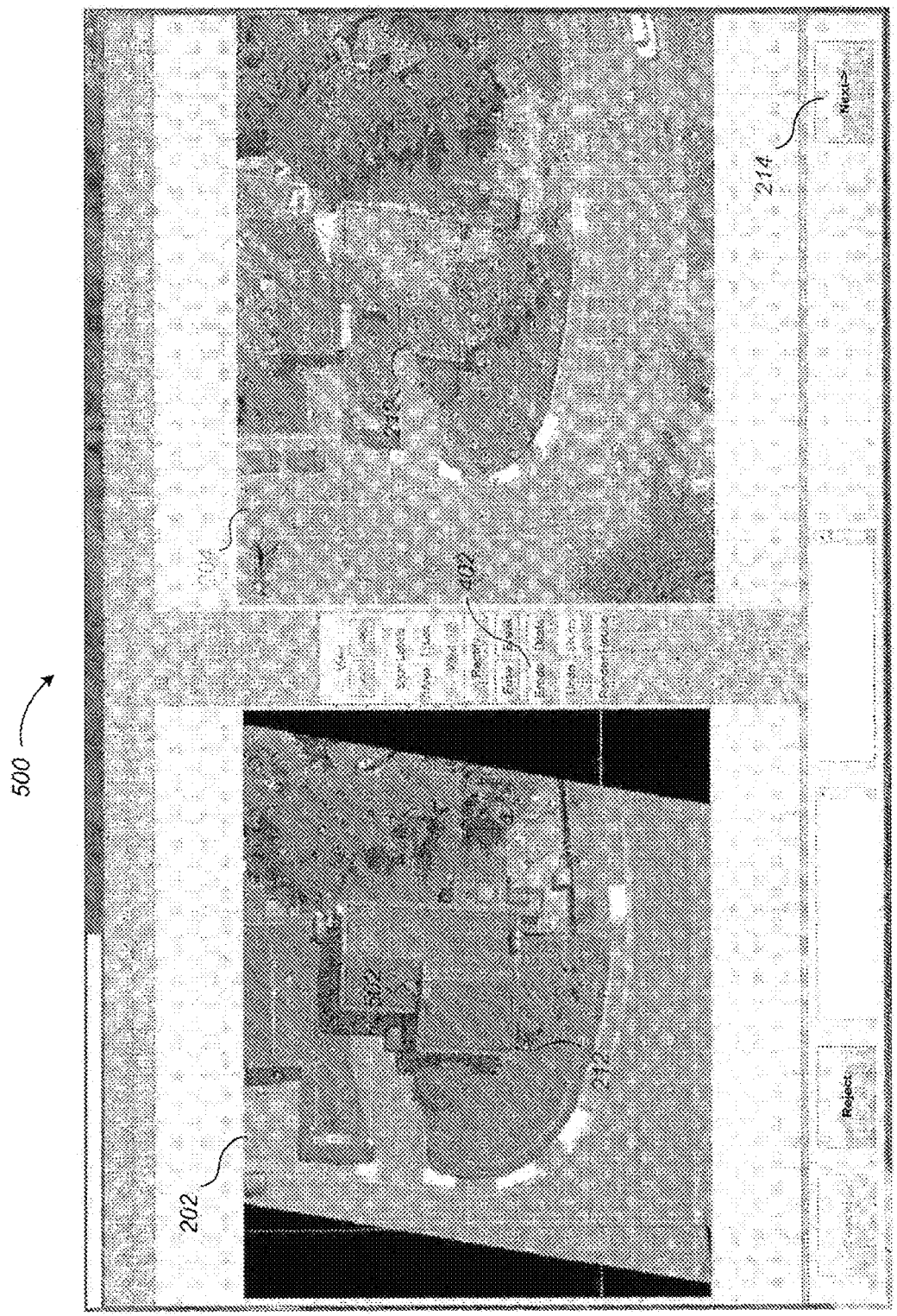
FIG. 5 is an example screenshot of a user interface of the system of FIG. 2 for generating floor area measurements showing the building annotated with an adjusted estimated floor area measurement, such as that estimated in the method of FIGS. 1A-1C, according to one non-limiting illustrated embodiment.

Also shown is an "Erode" button 402, the selection of which causes results to be displayed as shown in FIG. 5, as will be explained in conjunction with FIG. 5 below.

FIG. 5 is an example screenshot 500 of a user interface of the system of FIG. 2 for generating floor area measurements showing the building annotated with an adjusted estimated floor area measurement, such as that estimated in the method of FIGS. 1A-1C, according to one non-limiting illustrated embodiment. For example, when the user selects the "Erode" button 402 shown in FIG. 4, the floor area measurement estimation system will perform the acts 122 and 124 of the process shown in FIG. 1C to calculate an adjusted estimated total roof area of the roof by subtracting an amount from each section of the roof to account for an eave overhang distance.

In this embodiment, the floor area measurement estimation system subtracts an amount from one or more of the roof edge measurements in the roof model represented by annotation 212 corresponding to an estimated roof overhang over one or more walls of the building to obtain adjusted roof edge measurements. For example, each roof edge measurement may be reduced (i.e., "eroded") by 6 inches to 18 inches corresponding to an estimated roof overhang, which is selectable by a user of the floor area measurement estimation system. However, other lengths or ranges of lengths may be used.

The floor area measurement estimation system may also subtract an amount from one or more of the adjusted roof edge measurements in the roof model represented by annotation 212 corresponding to an estimated wall width to obtain adjusted roof edge measurements. For example, each roof edge measurement may be reduced (i.e., "eroded") by 6 inches to 18 inches corresponding to an estimated wall width, which is selectable by a user of the floor area measurement estimation system. However, other lengths or ranges of lengths may be used.

The amount of length subtracted from a line to obtain a more accurate measure of the internal footprint of the home will vary depending on the factor being subtracted for. If the factor being subtracted for is an eave, the value may be 2 feet, 3 feet, or another selected amount which may be a default value, such as 2 feet, or a value selected by an operator from seeing a second image of the home, which provides an oblique view of the overhang difference, which in some homes might be 4 feet. On the other hand, if the subtraction is for a wall thickness, the amount will usually be 6 inches or at most 10 inches. For a porch or deck, the amount might be 10 feet, 12 feet or some other value, based on an estimate of the true distance from an operator viewing one or more oblique images.

In some embodiments, each time a user selects the "erode" button 402, an additional adjustment shortening the lengths of the roof edges will be performed by the system. Note that the annotation 212 in FIG. 5 is now adjusted corresponding to the adjusted roof edge lengths such that the actual edges of the roof in the image shown in both the orthogonal view 202 and oblique view 204 extend beyond the borders of the annotation 212. The corresponding roof area measurement 502 is also therefore adjusted accordingly by the floor area measurement estimation system (e.g., from 2144 square feet down to 1855 square feet as shown in FIGS. 4 and 5, respectively).

Figure 6:
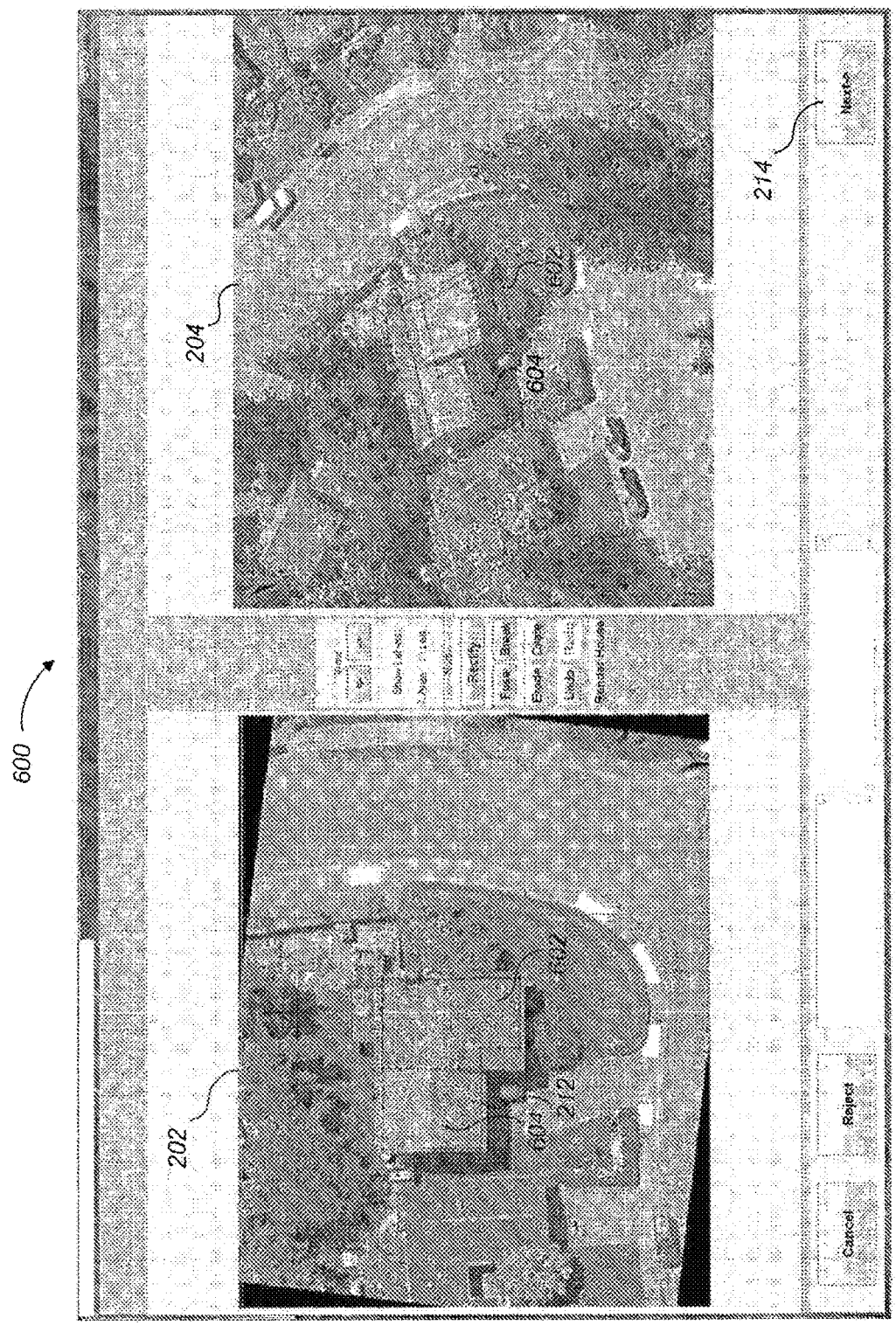
FIG. 6 is an example screenshot of a user interface of the system of FIG. 2 for generating floor area measurements showing the building annotated with adjusted estimated first and second floor area measurements, such as that estimated in the method of FIGS. 1A-1C, according to one non-limiting illustrated embodiment.

FIG. 6 is an example screenshot 600 of a user interface of the system of FIG. 2 for generating floor area measurements showing the building annotated with adjusted estimated first floor and second floor area measurements, such as that estimated in the method of FIGS. 1A-1C, according to one non-limiting illustrated embodiment. For example, the user may manipulate or otherwise adjust the annotation 212, or add additional annotations to represent multiple floors of the building as identified in the oblique view 204 of the building. Based on these adjustments, the floor area measurement estimation system may perform act 130 of the process shown in FIG. 1C to generate the estimated floor area measurement based on information received regarding a number of stories of the building. For example, the floor area measurement estimation system may receive information regarding how many stories the building has and regarding one or more sections of the roof below which one or more of the stories laterally extends. The system may then generate the estimated floor area measurement based on a total area of the one or more sections of the roof under which each of the stories extends and based on the generated estimated total roof area of the roof.

In the example embodiment shown in FIG. 6, shown is a first floor annotation 602 and a second floor annotation 604 that combined form annotation 212. The relationship between the first floor, second floor and roof can be seen form a different perspective in the oblique view 204 as the second floor annotation 604 shows that the second floor laterally extends substantially the entire length of the roof. However, the first floor annotation 602 shows that the first floor laterally extends about half way the length of the roof and the second floor due to the garage. The first floor annotation 602 and a second floor annotation 604 may be directly or indirectly manipulated and adjusted resulting in different area measurements of the floor represented by these annotations.

Also, first floor annotation 602 and second floor annotation 604 may be directly or indirectly manipulated and adjusted to account for spaces that are not to be included in the estimated floor area measurement. For example, these areas may be areas of the building that are not used for living inside the building or areas outside the building, including but not limited to: garages; attics; unfinished rooms above the garage or other unfinished spaces; covered balconies; patios, decks or porches, basements; crawl spaces; etc. This also may be performed in response to a user marking or otherwise identifying such areas on the first floor annotation 602 and second floor annotation 604, or otherwise adjusting the dimensions of the sides of the first floor annotation 602 and second floor annotation 604 to "notch" out or "cut" out such areas. In some embodiments, selectable graphical user interface items are provided representing such spaces. When selected an placed on the first floor annotation 602 and second floor annotation 604, a an area corresponding to a standard size and/or shape of such a space will be removed from the first floor annotation 602 and second floor annotation 604, and the floor area measurements will be adjusted accordingly.

For example, a selectable graphical user interface item representing a standard two-car garage may be selected by a user and placed in a position on the first floor annotation 604 overlaid on the image of the building corresponding to where a garage of the building is located. The floor area measurement estimation system will then subtract an area corresponding to the area of the standard two-car garage from the area of the first floor according to the position of the graphical user interface item representing the standard two-car garage on the first floor annotation 604.

Figure 7:
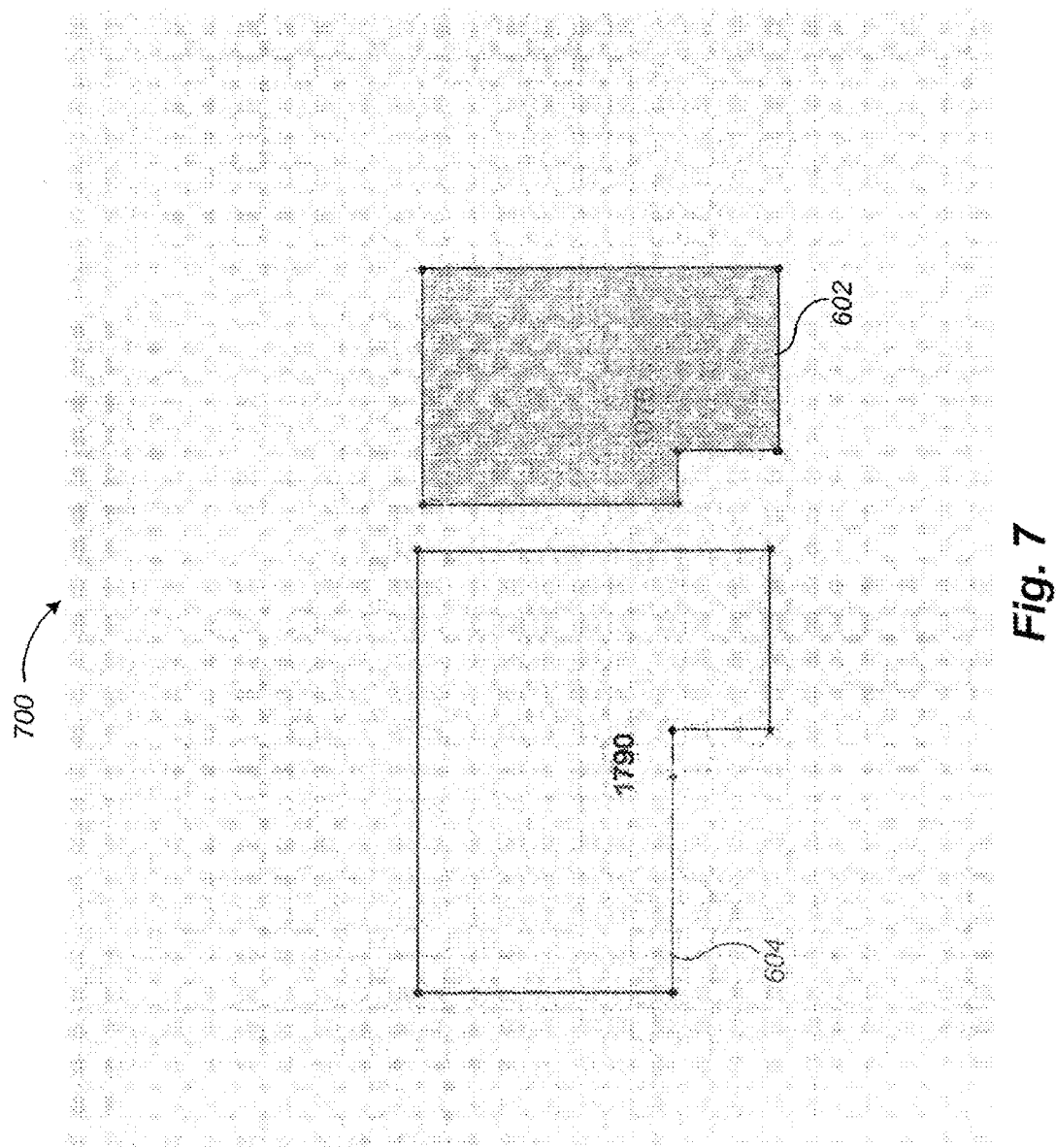
FIG. 7 is an example screenshot of a user interface of the system of FIG. 2 for generating floor area measurements showing a line drawing of a top plan view of each the first and second floor of the building annotated with corresponding floor area measurements, such as that estimated in the method of FIGS. 1A-1C, according to one non-limiting illustrated embodiment.

FIG. 7 is an example screenshot 700 of a user interface of the system of FIG. 2 for generating floor area measurements showing a line drawing of a top plan view of each the first and second floor of the building annotated with corresponding floor area measurements of the building shown in FIG. 6, such as that estimated in the method of FIGS. 1A-1C, according to one non-limiting illustrated embodiment. The line drawing represents the first floor annotation 602 and the second floor annotation 604 shown in FIG. 6. Note that the corresponding estimated floor areas are displayed on each annotation. These are adjusted by the floor area measurement estimation system upon manipulation of the corresponding first floor annotation 602 or second floor annotation 604 by the user.

Figure 8:
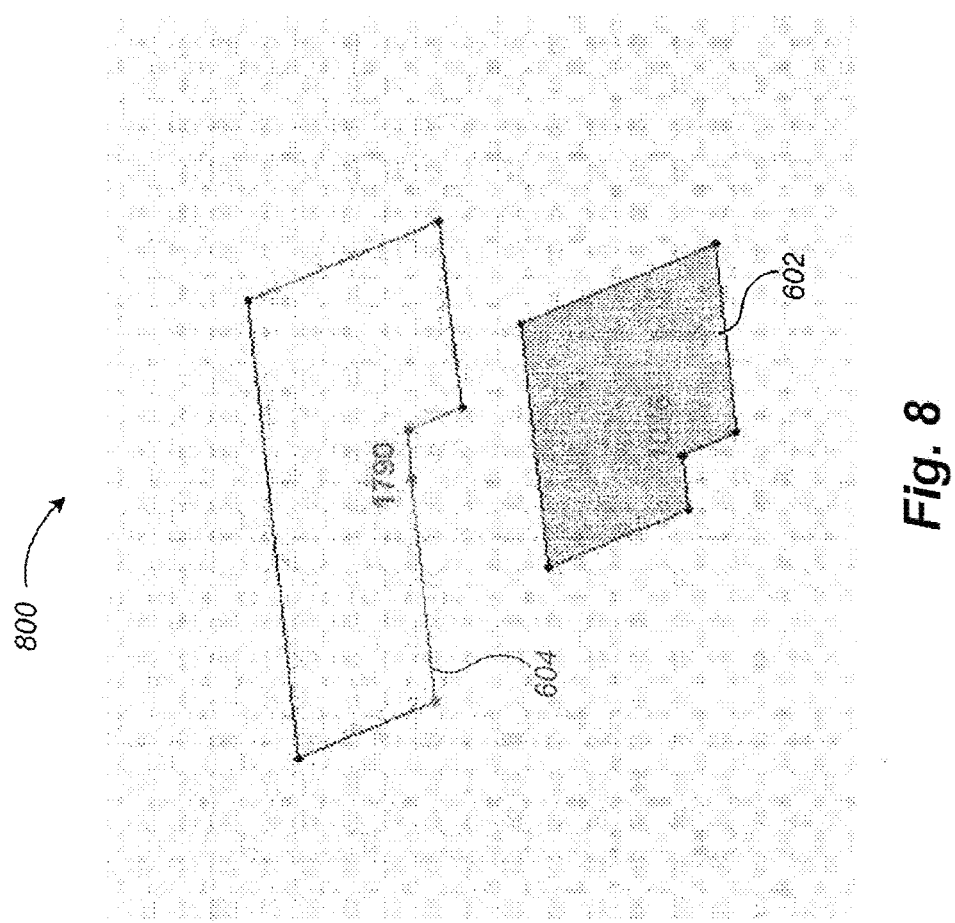
FIG. 8 is an example screenshot of a user interface of the system of FIG. 2 for generating floor area measurements showing a line drawing of a top perspective view of the first and second floor of the building annotated with corresponding floor area measurements, such as that estimated in the method of FIGS. 1A-1C, according to one non-limiting illustrated embodiment.

FIG. 8 is an example screenshot 800 of a user interface of the system of FIG. 2 for generating floor area measurements showing a line drawing of a top perspective view of the first and second floor of the building shown in FIG. 6 annotated with corresponding floor area measurements, such as that estimated in the method of FIGS. 1A-1C, according to one non-limiting illustrated embodiment. Shown in this manner in the graphical user interface of the floor area measurement estimation system, a user may manipulate the corresponding first floor annotation 602 and/or second floor annotation 604 and see the visual effects of the changes according to the positional relationships between the first and second floors corresponding to the oblique view 204 shown in FIG. 6.

Provided the example in FIG. 8, the total estimated floor area of the building is 2866 square feet (1076 square feet as noted on the first floor annotation 602 plus 1790 square feet as noted on the second floor annotation 604). Various reports may be generated showing the estimated areas of the various floors and/or the estimated total floor area of the building. For example, a report may be generated by the building floor area measurement estimation system or by using the data provided by the building floor area measurement estimation system that includes diagrams similar to the screenshots 700 and 800 shown in FIGS. 7 and 8, respectively either alone or overlaid on the corresponding images of the building shown in FIG. 6.

Figure 9:
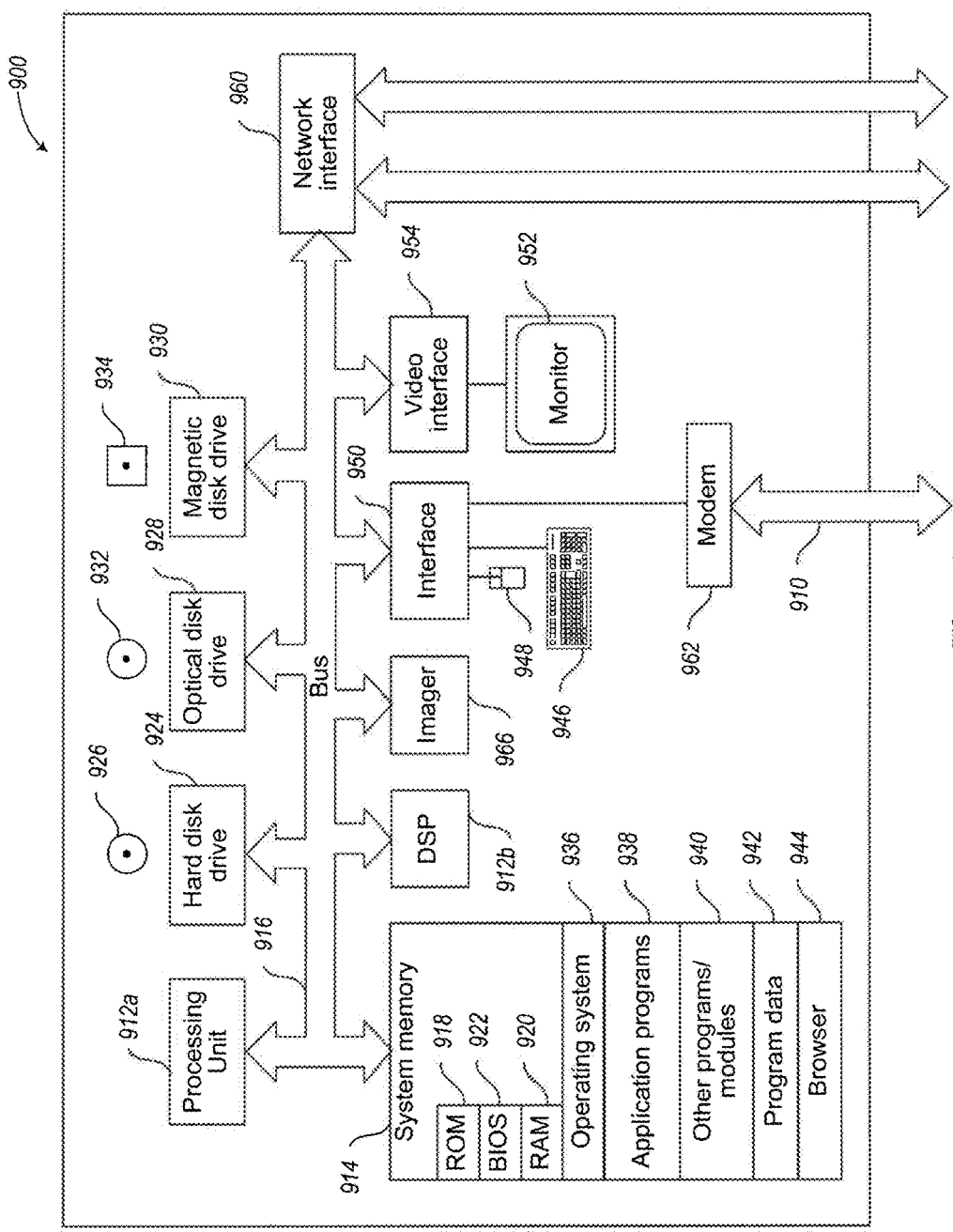
FIG. 9 is a schematic diagram of a computing environment in which systems and methods for estimation of building floor area and generating a risk management report may be implemented or of which they may be a part.

FIG. 9 is a schematic diagram of a computing environment in which systems and methods for estimation of building floor area may be implemented or of which they may be a part. For example, processes 100, 110 and 120 described above in conjunction with FIGS. 1A-1C may be performed or implemented by, for example, one or more software modules or components or any combination of suitable hardware, firmware or software components or devices including those that are a part of, stored in, or configure the computing environment of FIG. 9. Also, the graphical user interface functions and features may be performed or implemented by, for example, one or more software modules or components or any combination of suitable hardware, firmware or software components or devices including those that are a part of, stored in, or configure the computing environment of FIG. 9.

The computing environment 900 will at times be referred to in the singular herein, but this is not intended to limit the embodiments to a single device since in typical embodiments there may be more than one computer system or device involved. Unless described otherwise, the construction and operation of the various blocks shown in FIG. 9 are of conventional design. As a result, such blocks need not be described in further detail herein, as they will be understood by those skilled in the relevant art.

The computing environment 900 may include one or more processing units 912a, 912b (collectively 912), a system memory 914 and a system bus 916 that couples various system components including the system memory 914 to the processing units 912. The processing units 912 may be any logic processing unit, such as one or more central processing units (CPUs) 912a, digital signal processors (DSPs) 912b, digital video or audio processing units such as coder-decoders (codecs) or compression-decompression units, application-specific integrated circuits (ASICs), field programmable gate arrays (FPGAs), etc. The system bus 916 can employ any known bus structures or architectures, including a memory bus with memory controller, a peripheral bus, and a local bus. The system memory 914 includes read-only memory ("ROM") 918 and random access memory ("RAM") 920. A basic input/output system ("BIOS") 922, which can form part of the ROM 918, contains basic routines that help transfer information between elements within the computing environment 900, such as during start-up.

The computing environment 900 may include a hard disk drive 924 for reading from and writing to a hard disk 926 (including a solid state memory device), an optical disk drive 928 for reading from and writing to removable optical disks 932, and/or a magnetic disk drive 930 for reading from and writing to magnetic disks 934. The optical disk 932 can be a CD-ROM, while the magnetic disk 934 can be a magnetic floppy disk or diskette. The hard disk drive 924, optical disk drive 928 and magnetic disk drive 930 may communicate with the processing unit 912 via the system bus 916. The hard disk drive 924, optical disk drive 928 and magnetic disk drive 930 may include interfaces or controllers (not shown) coupled between such drives and the system bus 916, as is known by those skilled in the relevant art. The drives 924, 928 and 930, and their associated computer-readable storage media 926, 932, 934, may provide nonvolatile and non-transitory storage of computer readable instructions, data structures, program modules and other data for the computing environment 900. Although the depicted computing environment 900 is illustrated employing a hard disk 924, optical disk 928 and magnetic disk 930, those skilled in the relevant art will appreciate that other types of computer-readable storage media that can store data accessible by a computer may be employed, such as magnetic cassettes, flash memory, solid state drives, digital video disks ("DVD"), Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 912a.

Program modules can be stored in the system memory 914, such as an operating system 936, one or more application programs 938, other programs or modules 940 and program data 942. Application programs 938 may include instructions that cause the processor(s) 912 to perform generating digital roof models, generating roof and floor area measurements, and store and display input images or images generated by generating digital roof models and generating roof and floor area measurements, including the processes described herein. Other program modules 940 may include instructions for handling security such as password or other access protection and communications encryption. The system memory 914 may also include communications programs, for example, a Web client or browser 944 for permitting the computing environment 900 to access and exchange data including digital images, roof measurements and other building data with sources such as Web sites of the Internet, corporate intranets, extranets, or other networks and devices, as well as other server applications on server computing systems. The browser 944 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft of Redmond, Wash.

While shown in FIG. 9 as being stored in the system memory 914, the operating system 936, application programs 938, other programs/modules 940, program data 942 and browser 944 can be stored on the hard disk 926 of the hard disk drive 924, the optical disk 932 of the optical disk drive 928 and/or the magnetic disk 934 of the magnetic disk drive 930.

An operator can enter commands and information into the computing environment 900 through input devices such as a touch screen or keyboard 946 and/or a pointing device such as a mouse 948, and/or via a graphical user interface in order to receive, process, store and send data on which floor area measurement estimation has been or will be performed as described herein. Other input devices can include a microphone, joystick, game pad, tablet, scanner, etc. These and other input devices are connected to one or more of the processing units 912 through an interface 950 such as a serial port interface that couples to the system bus 916, although other interfaces such as a parallel port, a game port or a wireless interface or a universal serial bus ("USB") can be used. A monitor 952 or other display device is coupled to the system bus 916 via a video interface 954, such as a video adapter which may be configured to display images used by or generated by floor area measurement estimation as described herein. The computing environment 900 can include other output devices, such as speakers, printers, etc.

The computing environment 900 can operate in a networked environment using logical connections to one or more remote computers and/or devices. For example, the computing environment 900 can operate in a networked environment using logical connections to one or more other computing systems, mobile devices and other service providers or information servers that provide the digital images in various formats or by other electronic delivery methods. Communications may be via a wired and/or wireless network architecture, for instance wired and wireless enterprise-wide computer networks, intranets, extranets, telecommunications networks, cellular networks, paging networks, and other mobile networks.

Figure 10:
FIG. 10 is an example screenshot of a user interface of a system for generating floor area measurements which may be used independently of, as part of, or integrated with the systems and methods for generating a risk management report described herein, showing roof sections annotated on an aerial image of the roof, according to one non-limiting illustrated embodiment.

FIG. 10 is an example screenshot 702 of a user interface of a floor plan editor tool for generating floor area measurements, which may be used independently of, as part of, or integrated with the systems and methods for generating a risk management report described herein. In one embodiment, the tool consists of a floor plan editor 300, a facet label editor 302, and control buttons 304. The floor plan editor 300 consists of an approximately orthogonal view of the property 306 over which the software operator can draw shapes, such as rectangles, to outline the dimensions and area of different approximate floor areas of different sections of the house or building 308. The facet label editor 302 is a window that displays multiple aerial views of the property. In this example, the operator is looking at a West view which is indicated in area 310. Below this area there are a series of thumbnail images 314, with the current image being viewed highlighted 312. The highlighted image 312 indicates the expanded view of the image shown below 320. The operator, when drawing the floor areas 308, uses the multiple views of the property that are referenced by the thumbnail images 314 to determine the various features and facet types of the building for which the operator wants to estimate a floor area. An example of these facet types and features are listed in the facet label editor as facet type buttons 316. These facet types include, but are not limited to, footprint 316*a*, outbuilding 316*b*, garage 316*c*, first floor 316*d*, second floor 316*e*, third floor 316*f*, deck 316*g*, patio 316*h*, and porch 316*i*. The operator may select one of these buttons to associate one floor plan shape drawn on the building 308.

Control buttons 304 allow the operator to adjust floor plan shapes and choose different views of the property to show on the facet label editor 302. The operator can select the image 320 to display by using either the left arrow 318*a* or the right arrow 318*b* to move the selected thumbnail image, in this case image 312, to the desired image to be shown. Selecting different aerial images of the property taken at different angles allows the operator to better understand the structure of the building to determine the number of floors, the levels, garages, decks, patios, porches, or other features of the building. The erode button 330 allows a floor plan shape that is selected from among the number of floor plan shapes 308 to have its edges slightly reduced, for example, by 16 inches to 18 inches. Conversely, the dilate button 332 will enlarge the size of the selected shape by a small amount. The erode and dilate features are used as fine-tune adjustments by the operator to adjust the rectangle shape to the approximate floor plan of the building section that is being estimated. The checklist button 322 will take the user to the gathering property assessment screens described starting in FIG. 16. When the operator has finished drawing all the shapes and is satisfied with the drawings of the floor plan, the operator selects the finish button 326. To reject the changes and start over, the operator selects the reject button 324.

Figure 11:
FIG. 11 is an example screenshot of a user interface of the system of FIG. 10 for generating floor area measurements showing an aerial view used to identify floors and the roof section areas, dimensions, and levels annotated on which to base an estimated floor area measurement or a risk management report, such as that estimated in the method of FIGS. 1A-1I, according to one non-limiting illustrated embodiment.

FIG. 11 is an example screenshot 704 of the user interface of the system described in FIG. 10. Here, the operator has zoomed in, using the floor plan editor, on the image showing the top of the building being measured 306. In one embodiment, the operator uses a mouse to move cursor 336 to different locations over the house to draw rectangles that represents floor areas the operator wishes to measure. For example, if the operator wished to estimate the measurement of the deck 338, the operator would first select the deck facet types button 316*g*, then on the floor plan editor image 306 select the four corners that appear to the operator to be the corners of deck 338. Once the operator has completed this for all of the floor plan areas desired to be captured, the operator can go to the facet label editor thumbnail images 314 and select the top view, in this example by selecting thumbnail 340, which shows the top view of the building in the facet label editor overlaid with the different facet types as identified by the operator. In this example, the facet types are differentiated by different names, such as garage, footprint, first floor, second floor, deck, etc. and are also distinguished by color: magenta, beige, blue, dark blue, gray, etc. In addition, the dimensions and the areas associated with each facet type footprint also appear in the same color in the floor plan editor overlaid on the top-down image 306.

Figure 12:
FIG. 12 is an example screenshot of a user interface of the system of FIG. 10 for generating floor area measurements showing an aerial view used to identify floors and the roof section areas, dimensions, and levels annotated on which to base an estimated floor area measurement or a risk management report, such as that estimated in the methods of FIGS. 1A-1I, according to one non-limiting illustrated embodiment.

FIG. 12 is an example screenshot 706 of the user interface of the system from FIG. 10. In this example, the user has selected thumbnail 342, which is an oblique aerial view of the property facing east. The operator may use this view to verify the operator's choices of the different facet types for the floor areas.

Figure 13:
FIG. 13 is an example screenshot of a user interface of the system of FIG. 10 for generating floor area measurements showing an aerial view used to identify floors and the roof section areas, dimensions, and levels annotated on which to base an estimated floor area measurement or a risk management report, such as that estimated in the methods of FIGS. 1A-1I, according to one non-limiting illustrated embodiment.

FIG. 13 is an example screenshot 708 of the user interface of the system of FIG. 10. Here, the operator has selected thumbnail 344, which is a oblique aerial view of the property facing north, again to check whether the facet type selections for the floor area need any adjustment.

Figure 14:
FIG. 14 is an example screenshot of a user interface of the system of FIG. 10 for generating floor area measurements showing an aerial view used to identify floors and the roof section areas, dimensions, and levels annotated on which to base an estimated floor area measurement or a risk management report, such as that estimated in the methods of FIGS. 1A-1I, according to one non-limiting illustrated embodiment.

FIG. 14 is an example screenshot 710 of a user interface of the system of FIG. 10. Here, the operator has zoomed in further on the north oblique-facing image 348 to better check and review the operator's assessment of the features of the building.

Figure 15:
FIG. 15 is an example screenshot of a user interface of the system of FIG. 10 for generating floor area measurements showing an aerial view used to identify floors and the roof section areas, dimensions, and levels annotated on which to base an estimated floor area measurement or a risk management report, such as that estimated in the method of FIGS. 1A-1I, according to one non-limiting illustrated embodiment.

FIG. 15 is an example screenshot 712 of a user interface of the system of FIG. 10. Here, the operator has selected the top thumbnail 340 to review the final floor plan selections and facet type selections for any final changes. If the operator is satisfied with the floor plan, the operator selects the finish button 326.

Figure 16:
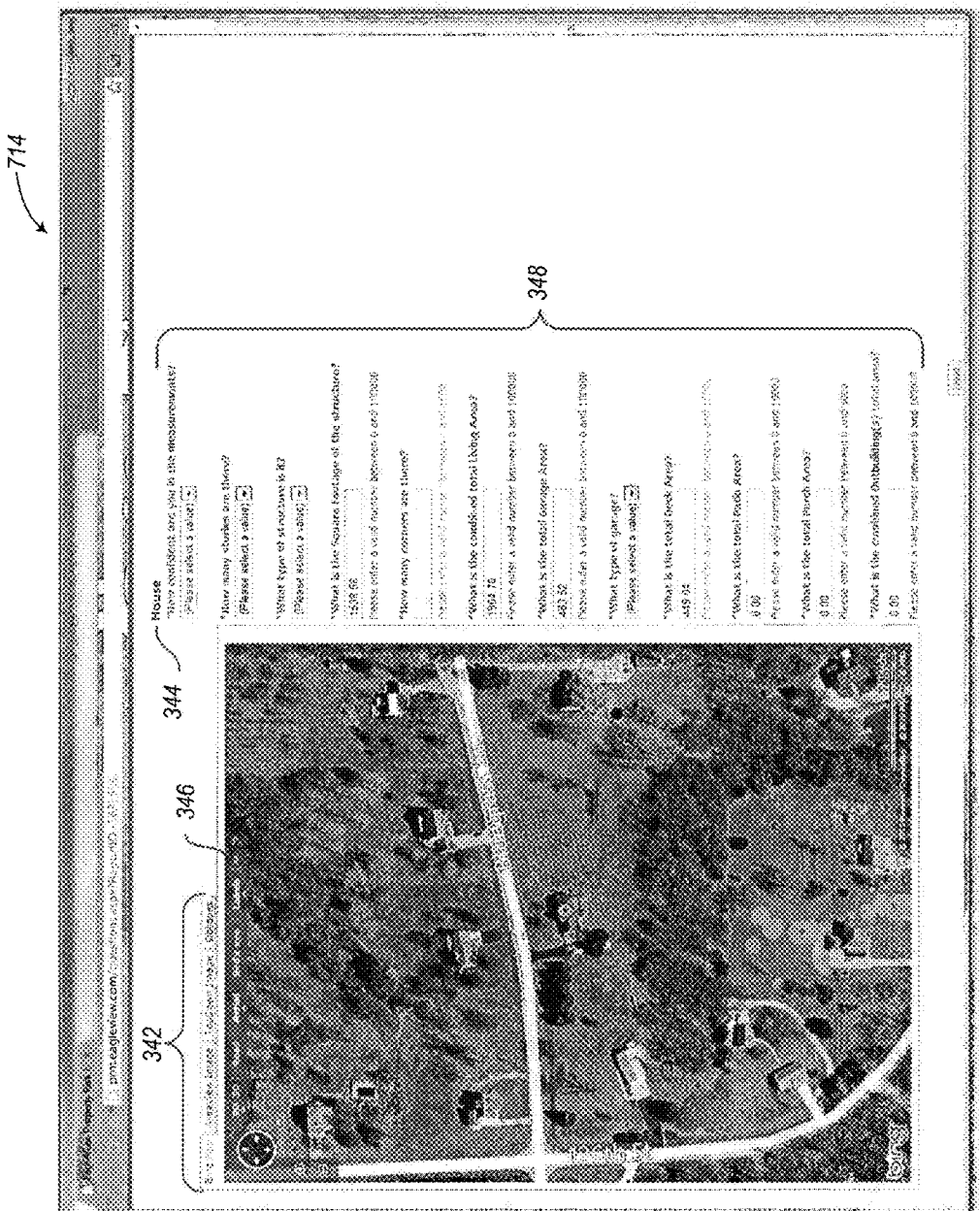
FIG. 16 is an example screenshot of a user interface of a system for gathering property risk assessment data using one or more aerial images of the property, which may be used independently of, as part of, or integrated with the systems and methods for generating a risk management report described herein, according to one non-limiting illustrated embodiment.

FIG. 16 is an example screenshot 714 of a user interface of a system for gathering property assessment data for a property and the buildings on the property, which may be used independently of, as part of, or integrated with the systems and methods for generating a risk management report described herein, according to one non-limiting illustrated embodiment. For example, the screenshots of FIGS. 16-21 are screenshots of the graphical user interface of the gathering property assessment data, which performs the processes described in FIGS. 1A-1I above.

Shown is a graphical user interface including two panels, one with an image of the property 346, and one with a series of questions pertaining to the property to be answered 348. In some embodiments, the answers may be provided by other data sources, or by the operator in viewing the pictures of the property in panel 346.

In some embodiments the panel 346 may display various images of the property which can be viewed by selecting a tab 342. The available images may come from different sources, may be of different perspectives (e.g. top-down versus oblique), and may have different image manipulation methods, for example viewing an image in Bing vs. Google. The operator can select a view of 342 and use the image displayed to answer questions 348 about the property. In screen 714, the questions 348 have to do with a house on the property. In this example, the operator is asked a series of questions to be answered based on the operator's visual assessment of the property from the given aerial images. For example, the number of stories in the house, the type of structure, the number of corners, and total living area information of the structure, which can be either estimated or taken from the floor plan editor tool.

Figure 17:
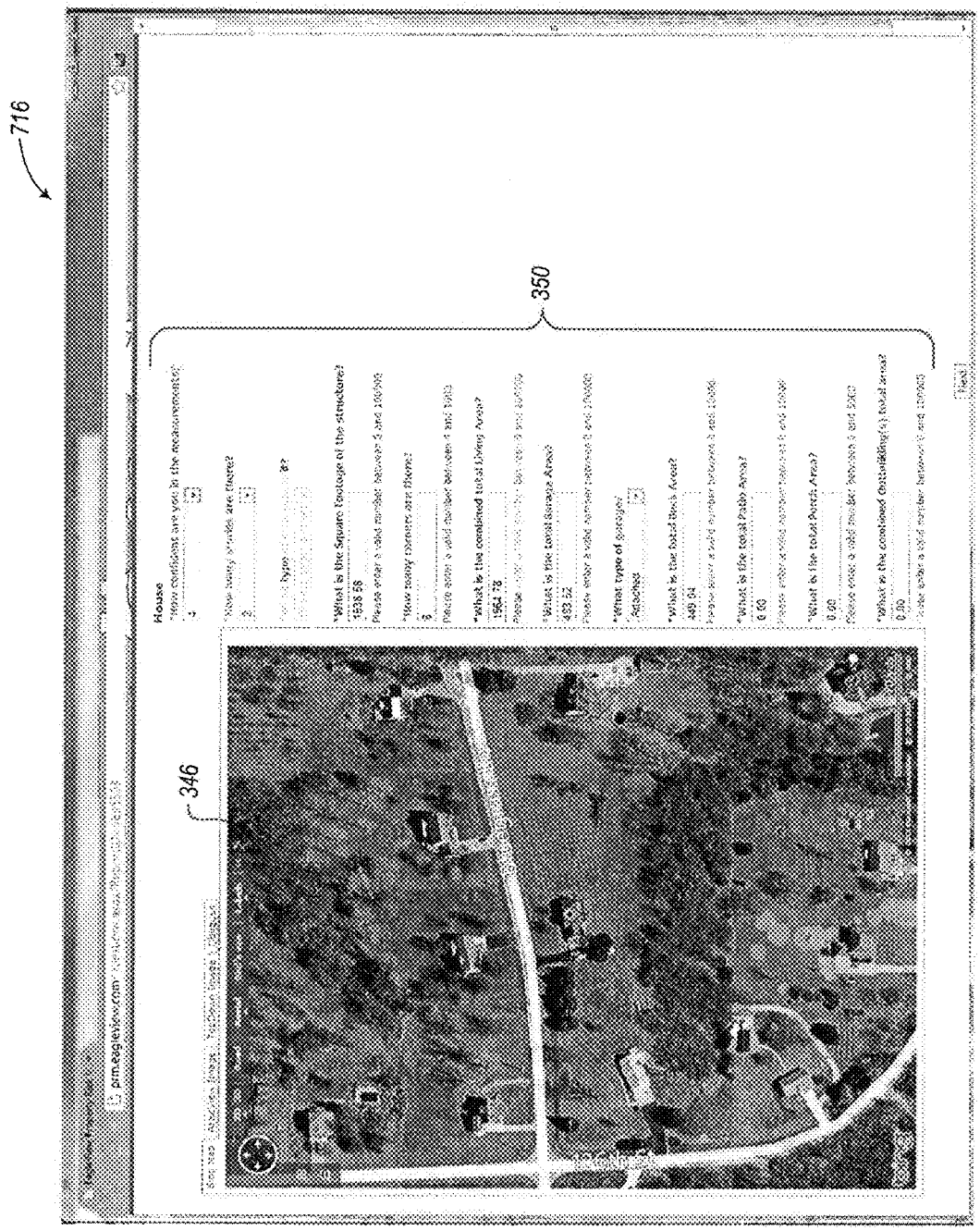
FIG. 17 is an example screenshot of a user interface of the system of FIG. 16 for gathering property risk assessment data, such as that described in the method of FIGS. 1A-1I, according to one non-limiting illustrated embodiment.

FIG. 17 is an example screenshot 716 of a user interface of the system for FIG. 16 for gathering property assessment data, according to one non-limiting illustrated embodiment. In this example, additional questions 350 regarding the house on the property have been answered by the operator.

Figure 18:
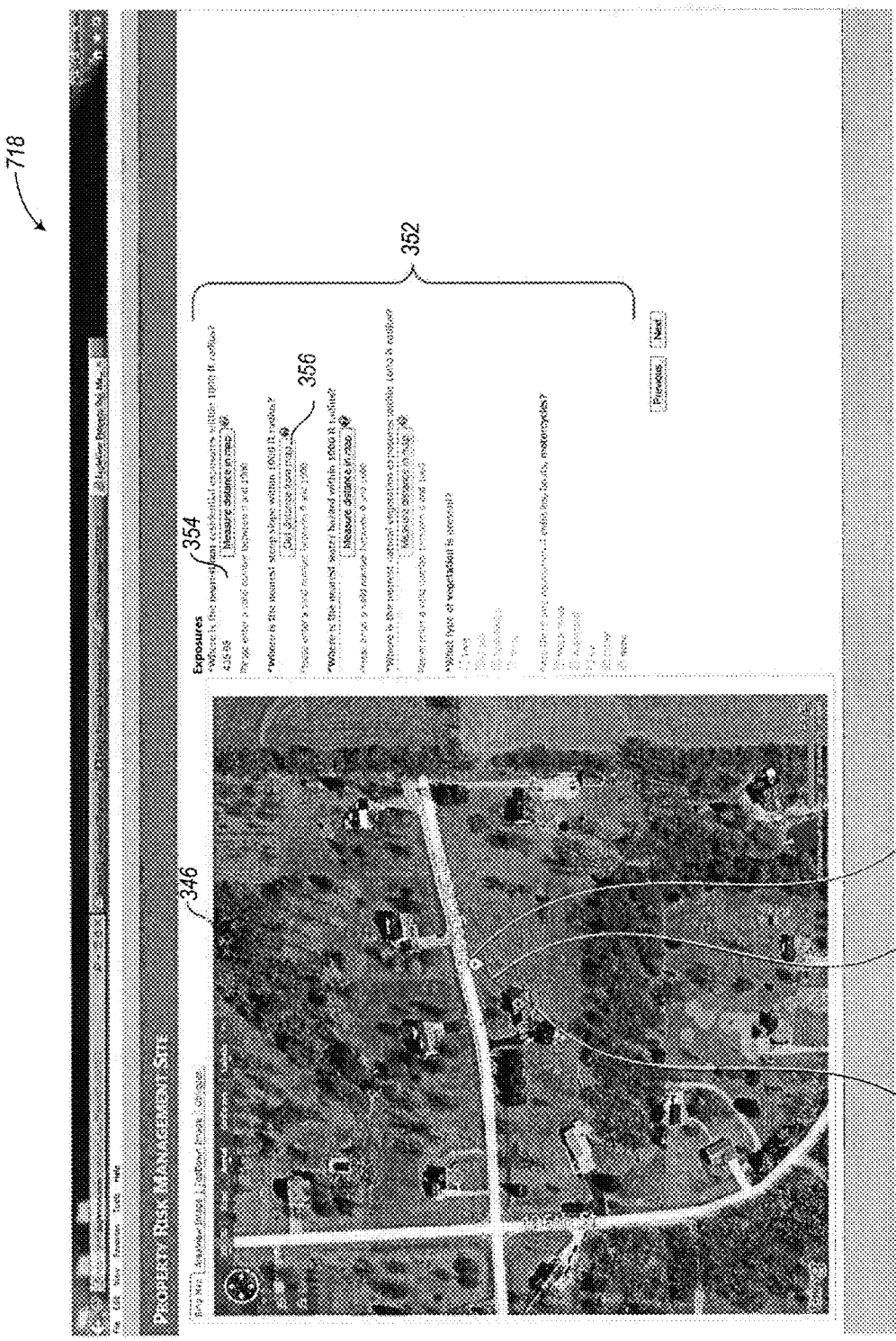
FIG. 18 is an example screenshot of a user interface of the system of FIG. 16 for gathering property assessment data, using measurement tools to estimate distance, such as that described in the method of FIGS. 1A-1I, according to one non-limiting illustrated embodiment.

FIG. 18 is an example screenshot 718 of a user interface of the system of FIG. 16 for gathering property assessment data according to one non-limiting embodiment. Here, the operator is asked for data regarding exposures to the property and to the house 352, for example, the nearest nonresidential exposures, nearest steep slope, nearest water hazard, nearest natural vegetation exposure. In this example, the operator may either estimate and type the number directly into the answer area 354, or the operator can use the get distance tool by clicking 356. When the operator uses the get distance tool, in one embodiment the system presents the operator an image of the property and surrounding area 346 as well as a marker indicating the location of the property that is being evaluated 358. The system displays a marker 360 which can be moved within the image to indicate the location that the distance should be measured to. Line 362 connects the marker showing the location of the property 358 to the floating marker that the user is able to place at the location of the exposure to which the distance needs to be determined.

Figure 19:
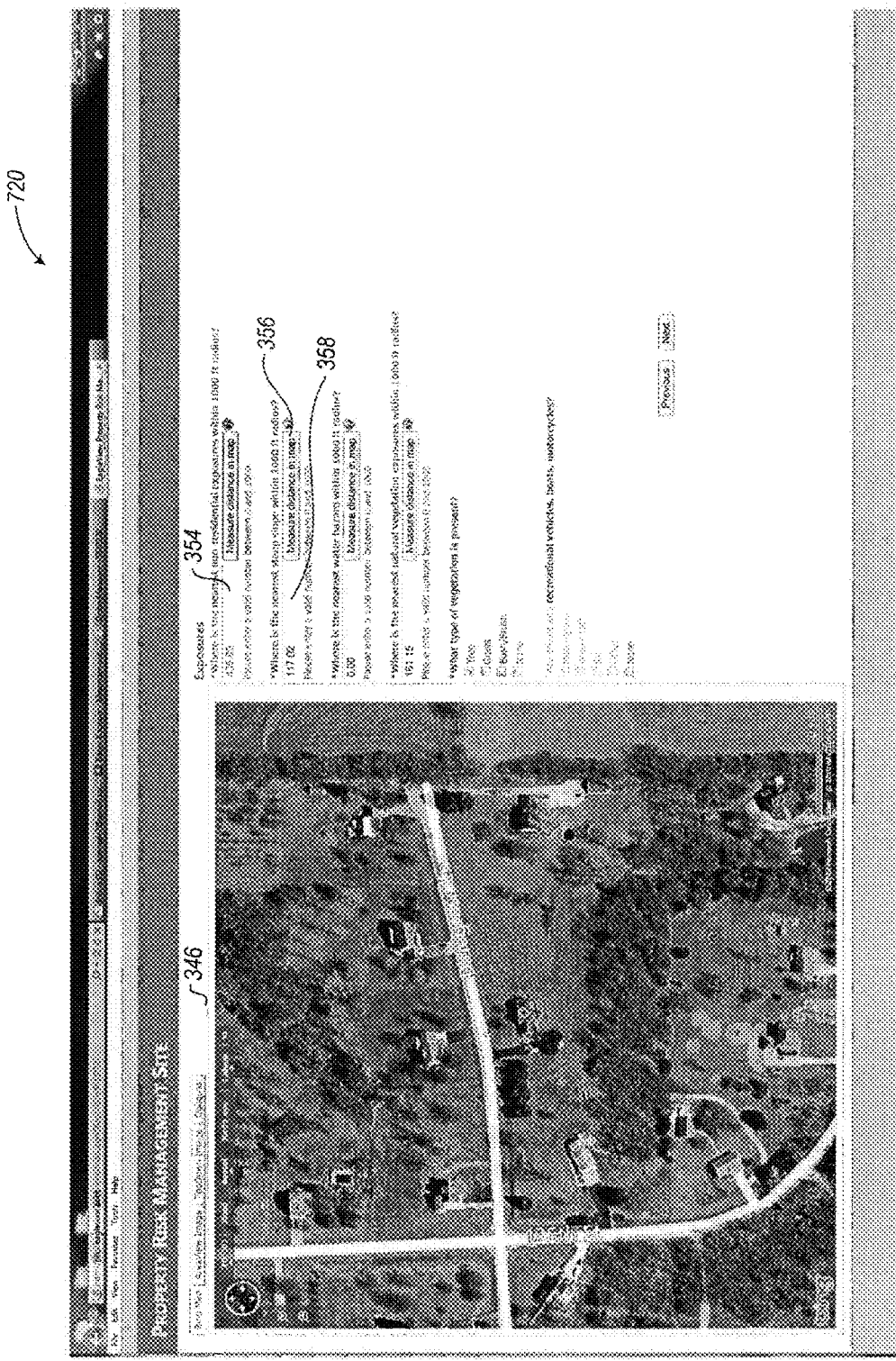
FIG. 19 is an example screenshot of a user interface of the system of FIG. 16 for gathering property risk assessment data, showing data entered from other sources, such as that described in the method of FIGS. 1A-1I, according to one non-limiting illustrated embodiment.

FIG. 19 is an example screenshot 720 of a user interface of the system of FIG. 16 for gathering property assessment data according to one non-limiting illustrated embodiment. Screen 720 shows the results of using the get distance tool which was selected by pressing button 356 in screen 718. In this example, the tool estimated the distance based on the top-down image scale 346, and put the result in answer box 358. In addition to measuring the distance, the operator is asked to identify the type of vegetation present around the property and also if there are any recreational vehicles, boats or motorcycles on the property.

Figure 20:
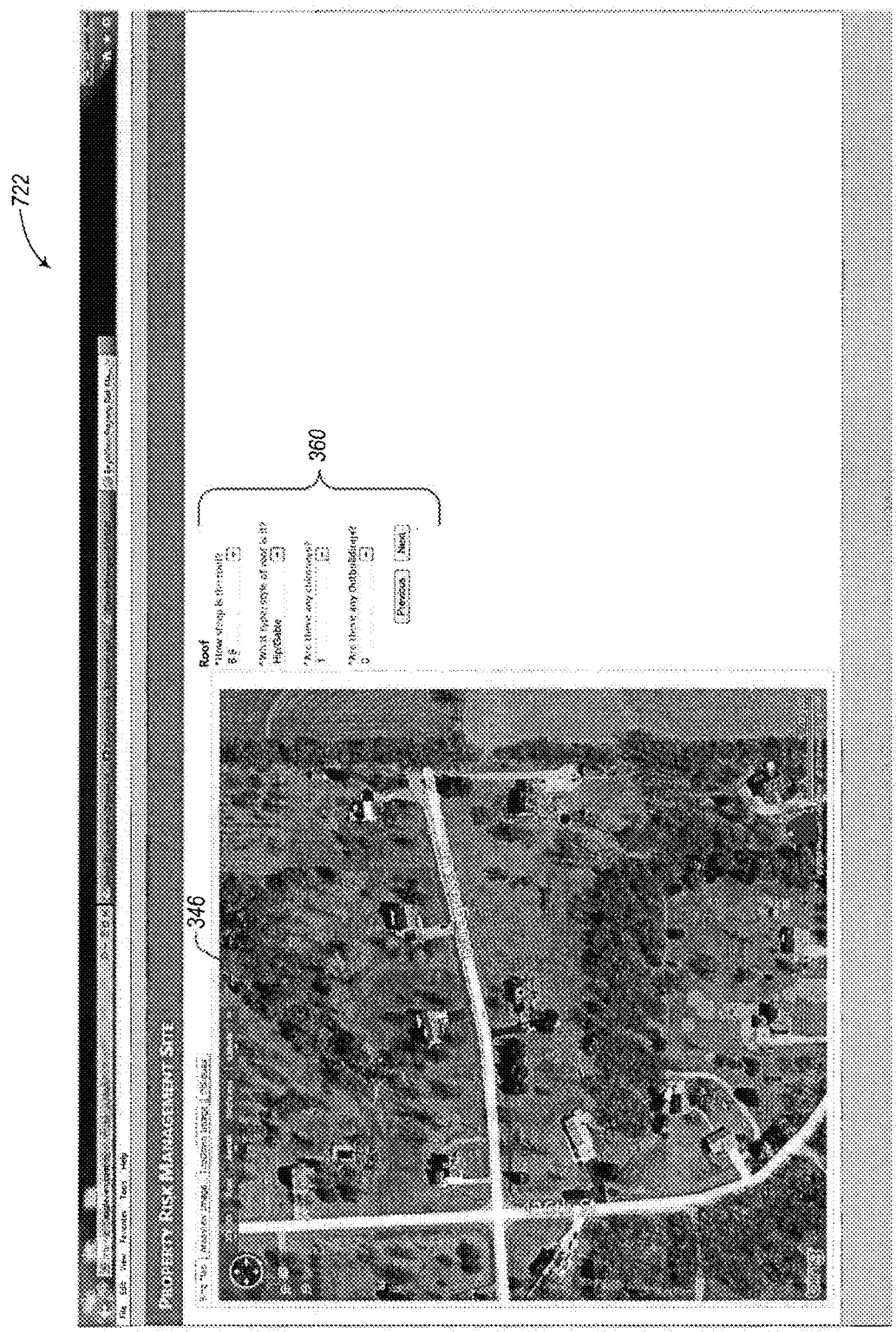
FIG. 20 is an example screenshot of a user interface of the system of FIG. 16 for gathering property risk assessment data, including roof characteristics, such as that estimated in the method of FIGS. 1A-1I, according to one non-limiting illustrated embodiment.

FIG. 20 is an example screenshot 722 of a user interface for of the system of FIG. 16 for gathering property assessment data according to one non-limiting illustrated embodiment. In this example, the operator is asked about roof characteristics including how steep the roof is, the pitch of the roof (estimate), the type or style of the roof, for example, a hip or gabled roof versus a flat roof, the number of chimneys in the house, and the number of outbuildings on the property 360.

Figure 21:
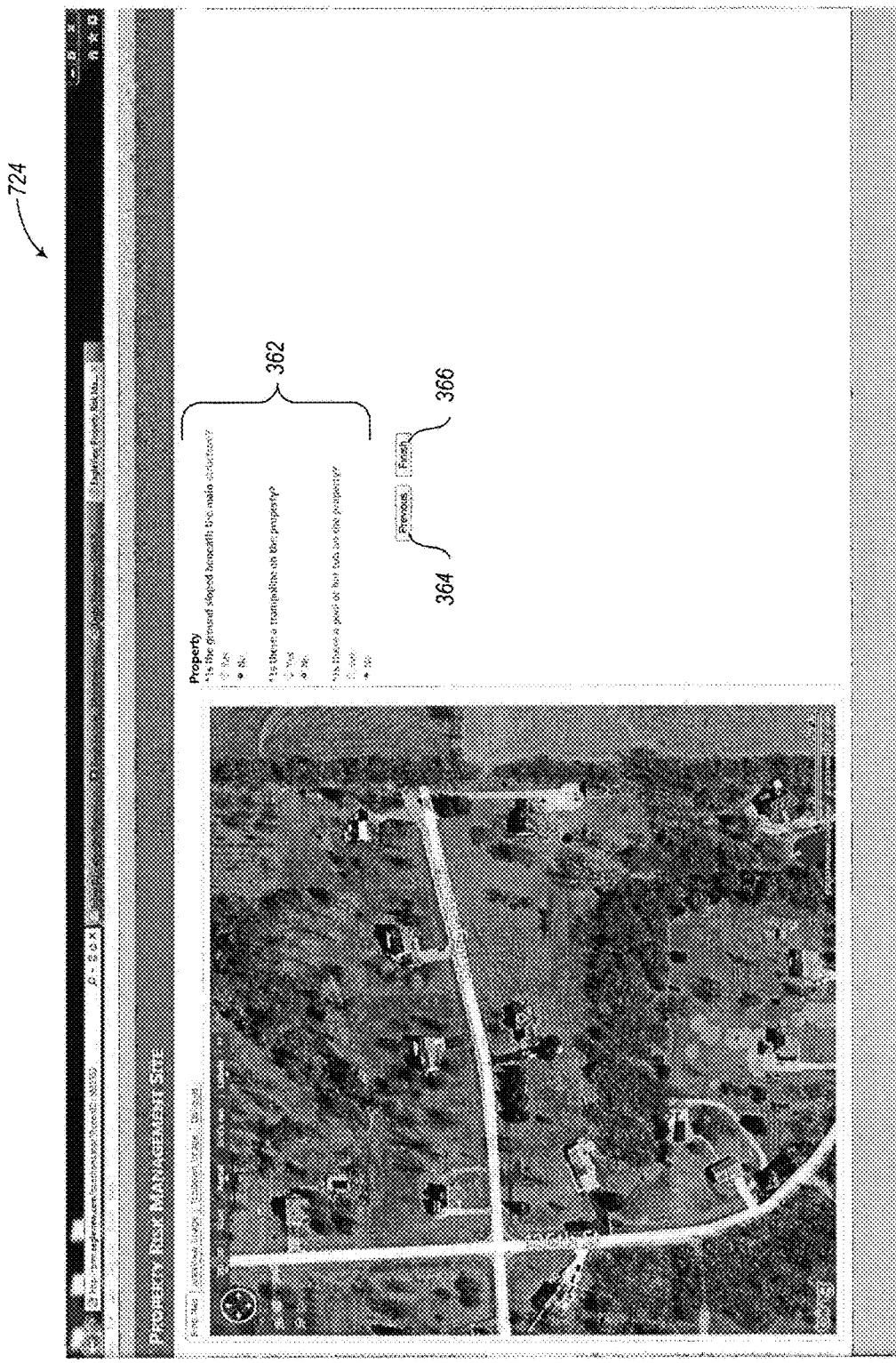
FIG. 21 is an example screenshot of a user interface of the system of FIG. 16 for gathering property risk assessment data including property ground characteristics, such as that described in the method of FIGS. 1A-1I, according to one non-limiting illustrated embodiment.

FIG. 21 is an example screenshot 724 of a user interface of the system of FIG. 16 for gathering property assessment data according to one non-limiting illustrated embodiment. In this example, the operator is asked for additional information on the property 362. For example, ground slope beneath the main structure on the property, whether there is a trampoline on the property, and whether there is a pool or hot-tub on the property. In this example, the operator is able to go back to previous screens by selecting previous button 364. Otherwise, if the operator is finished with the property assessment data, the operator selects the finish button 366.

FIG. 22 is an example page of a report 726 of a property risk management report according to one non-limiting illustrated embodiment. FIGS. 22-29 are examples of the presentation of data which is received from the processes described in FIGS. 1A-1F. This example shows a top-down view of the property 368, a title of the report 370, the type of report 372, in this case a custom residential report, a report date, property address, and insurance policy number related to the property, if available. Finally, the example includes the name and address of the individual or company for which the report was prepared 374.

FIG. 23 is an example page 728 of a property risk management report example of FIG. 22, according to one non-limiting illustrated embodiment. This example page shows, the date of the report, report details including a report number, an insurance policy number that is related, if any, the renewal date of the insurance policy related, if any, the date of the photo, and the geocoded location, for example, in latitude and longitude, of where the property exists. In addition, a building summary is presented which includes the year built, the number of stories, and the estimated living area, whether or not there is a garage, and whether the garage is attached.

FIG. 24 is an example page 730 of a property risk management report of FIG. 22, according to one non-limiting illustrated embodiment. This example page contains a top view or orthogonal view 380 of the property.

FIG. 25, is an example page 732 of a property risk management report of FIG. 22, according to one non-limiting illustrated embodiment. This example page shows two orthogonal views of the property: a north view 382, and a south view 384.

FIG. 26 is an example page 734 of a property risk management report of FIG. 22, according to one non-limiting illustrated embodiment. This example page shows two additional aerial oblique views of the property: an east view 386, and a west view of the property 388.

Figure 27:
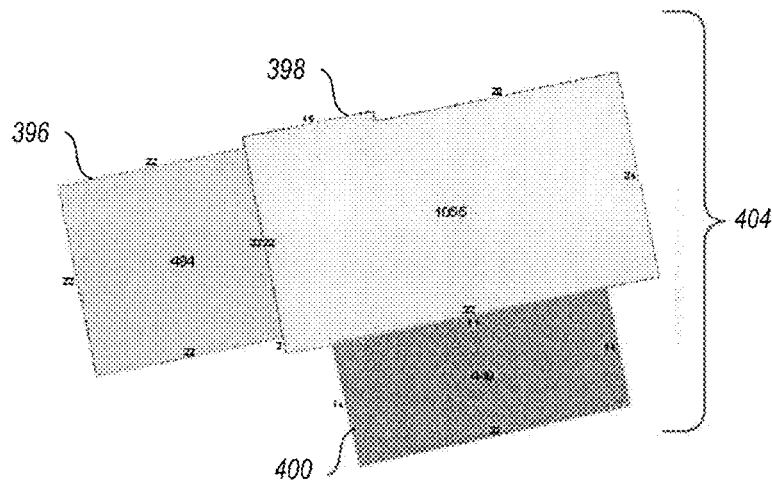
FIG. 27 is an example page of a report to provide floor area and property risk assessment data, including the dimensions and the area for different sections of a floor of a building, such as that estimated in the method of FIGS. 1A-1I, according to one non-limiting illustrated embodiment.

FIG. 27 is an example page 736 of a property risk management report, according to one non-limiting illustrated embodiment. The example page includes total estimated living area 390, number of stories 392, and an indicator of the floor level 393 and the area and dimension diagram of the features for that floor in diagram form 404. A color-coded key 394 is used to identify the different features of the floor diagram 404 being shown. The example of this report has a color key 394 for each feature area, which corresponds to colors of the features shown in diagram 404, namely the living area 398 in light blue, the garage area 396 in peach, the deck area 400 in maroon, etc. In addition, there is a compass rose 402 to orient the position of the buildings on the property.

Figure 28:
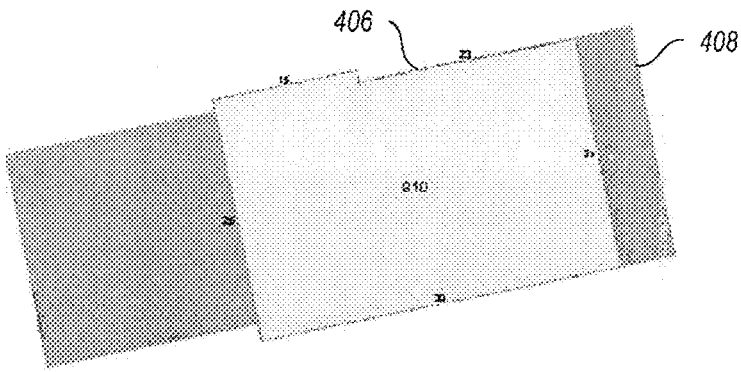
FIG. 28 is an example page of a report to provide floor area and property risk assessment data, including dimensions and area by sections for a particular floor of a building, such as that estimated in the method of FIGS. 1A-1F, according to one non-limiting illustrated embodiment.

FIG. 28 is an example page 738 of a property risk management report of FIG. 22, according to one non-limiting illustrated embodiment. This example page describes the second floor and shows the dimensions and area for the living area in light blue 406 and the footprint in grey 408.

FIG. 29 is an example page 740 of a property risk management report of FIG. 22, according to one non-limiting illustrated embodiment. This examples page includes a confidence rating 410 that allows the operator in the gathering property assessment data tool discussed above to indicate the operator's level of confidence in the ratings and estimations given for the property. Structural observations 412 include year built, number of stories, type of family structure, footprint, number of corners, estimated total living area, garage area, garage type, deck area, patio area, porch area, estimated roof pitch, roof shape, number of chimneys, outbuilding count, outbuilding total area, basement area, finished basement area, basement type, basement description. Property observations 413 include whether there is a building permit, whether an EagleView roof report was completed, whether an EagleView wall report was completed, property distance to a commercial exposure, property distance to a steep slope, property distance to a water hazard, property distance to vegetation, type of vegetation, cross-sell identification, slope on property, existence of a trampoline, swimming pool/hot tub, the location of the nearest responding fire station, the type of responding fire station, property distance of the responding fire station, and whether the structure is owner occupied.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computing system for generating an estimated floor area measurement, the computing system comprising:
   one or more processor;
   a non-transitory memory;
   computer executable instructions for floor area measurement estimation stored on the non-transitory memory and that, when executed, cause the one or more processor to:
      receive a first aerial image of a building having a roof, and a second aerial image of the building from at least one image file database, the first aerial image representing a top-down view of the top of the building, the second aerial image representing a view from a different angle than the top-down view of the building;
      generate, a three-dimensional computer model of the roof, by analyzing the first aerial image and the second aerial image;
      determine a total number of stories the building has using the second aerial image of the building;
      determine, based at least in part on the determined total number of stories of the building and the three-dimensional computer model, an estimated floor area measurement of the building; and
      output a floor area measurement report having floor area data thereon, the floor area data including the estimated floor area measurement.

2. The computing system of claim 1 wherein the generating the estimated floor area measurement includes:
   calculating roof edge measurements assuming each section of the roof has no slope regardless of an actual slope of each section of the roof;
   using the roof edge measurements to calculate an estimated total roof area of the roof assuming each section of the roof has no slope; and
   generating the estimated floor area measurement based on the calculated estimated total roof area of the roof.

3. The computing system of claim 2 wherein the generating the estimated floor area measurement further comprises:
   subtracting an amount from one or more of the roof edge measurements corresponding to an estimated roof overhang over one or more walls of the building to obtain adjusted roof edge measurements; and
   generating the estimated floor area measurement based on the adjusted roof edge measurements.

4. The computing system of claim 2 wherein the generating the estimated floor area measurement further comprises:
   subtracting an amount from one or more of the adjusted roof edge measurements corresponding to an estimated wall width to obtain adjusted roof edge measurements; and
   generating the estimated floor area measurement based on the adjusted roof edge measurements.

5. The computing system of claim 1, wherein the generating the estimated floor area measurement includes:
   receiving information regarding one or more sections of the roof below which one or more of the stories laterally extends;
   generating an estimated total roof area of the roof assuming each section of the roof has no slope regardless of an actual slope of each of the roof sections; and
   generating the estimated floor area measurement based on a total area of the one or more sections of the roof under which the one or more of the stories laterally extends and the generated estimated total roof area of the roof.

6. The computing system of claim 1, wherein the computer executable instructions for floor area measurement estimation, when executed, further cause the one or more processor to generate and deliver a floor area measurement estimate report that includes one or more aerial images of the building annotated with numerical values that indicate the corresponding estimated floor area measurement.

7. The computing system of claim 6, wherein the computer executable instructions for floor area measurement estimation, when executed, further cause the one or more processor to generate and deliver a floor area measurement estimate report that is annotated with a floor area measurement and one or more of: slope, area, and length of edges of at least some of a plurality of planar roof sections of the roof.

8. The computing system of claim 1, wherein the computer executable instructions for floor area measurement estimation, when executed, further cause the one or more processor to deliver the floor area measurement estimate as part of a report including a plurality of floor area measurement estimates for a plurality of buildings in response to a request for a plurality of estimates from a single entity.

9. A non-transitory computer-readable medium whose contents enable a computing system to generate an estimated floor area measurement, by performing a method comprising:
   receiving a first and a second aerial image of a building having a roof, the first aerial image being a top-down view of the building and the second aerial image being a view from a different angle than the top-down view such that each of the aerial images providing a different view of the roof of the building;

correlating the first aerial image with the second aerial image;

determining a total number of stories the building has using the second aerial image of the building;

generating, based at least in part on the correlation between the first and second aerial images, a three-dimensional model of the roof that includes a plurality of planar roof sections that each have a corresponding slope, area, and edges;

generating an adjusted roof model by adjusting a slope of the planar roof sections in the three-dimensional model of the roof to zero;

obtaining an estimated total roof area measurement based on the adjusted roof model; and generating, based at least in part on the estimated total roof area measurement and the determined total number of stories, an estimated floor area measurement of the building.

10. The non-transitory computer-readable medium of claim 9, wherein the generating the estimated floor area measurement of the building includes:

subtracting an amount from one or more of roof edge measurements obtained from the adjusted roof model corresponding to an estimated roof overhang over one or more walls of the building to obtain adjusted roof edge measurements; and generating the estimated floor area based on the adjusted roof edge measurements.

11. The non-transitory computer-readable medium of claim 9, wherein the contents further enable a computing system to deliver the estimated floor area in response to a request.

12. A floor area measurement report produced by a process comprising:

receiving a first aerial image of a building, and a second aerial image of the building from at least one image file database, the first aerial image representing a top-down view of the top of the building, the second aerial image representing a view from a different angle than the top-down view of the building;

generating a computer model of a roof of the building based on the first aerial image, and the second aerial image;

determining a total number of stories the building has using the second aerial image of the building;

generating, based at least in part on the generated computer model, and the total number of stories of the building, an estimated floor area measurement of the building; and electronically communicating the estimated floor area measurement.

13. The floor area measurement report of claim 12 wherein the generating the estimated floor area measurement includes:

receiving information regarding one or more sections of the roof below which one or more of the stories laterally extends;

generating an estimated total roof area of the roof assuming each section of the roof has no slope regardless of an actual slope of each of the roof sections; and generating the estimated floor area measurement based on a total area of the one or more sections of the roof under which the one or more of the stories laterally extends and the generated estimated total roof area of the roof.

* * * * *